United States Patent
Hattori et al.

(10) Patent No.: US 9,076,495 B2
(45) Date of Patent: Jul. 7, 2015

(54) REPRODUCING APPARATUS, REPRODUCING METHOD, COMPUTER PROGRAM, PROGRAM STORAGE MEDIUM, DATA STRUCTURE, RECORDING MEDIUM, RECORDING DEVICE, AND MANUFACTURING METHOD OF RECORDING MEDIUM

(75) Inventors: Shinobu Hattori, Tokyo (JP); Motoki Kato, Kanagawa (JP)

(73) Assignee: Sony Corporation, Tokyo (JP)

( * ) Notice: Subject to any disclaimer, the term of this patent is extended or adjusted under 35 U.S.C. 154(b) by 1718 days.

(21) Appl. No.: 11/484,078

(22) Filed: Jul. 11, 2006

(65) Prior Publication Data
US 2007/0172195 A1 Jul. 26, 2007

(30) Foreign Application Priority Data

Jul. 15, 2005 (JP) ................................. 2005-206997
May 29, 2006 (JP) ................................. 2006-147981

(51) Int. Cl.
| | |
|---|---|
| H04N 5/93 | (2006.01) |
| H04N 5/765 | (2006.01) |
| H04N 5/78 | (2006.01) |
| H04N 5/92 | (2006.01) |
| H04N 7/12 | (2006.01) |
| H04N 7/173 | (2011.01) |

(Continued)

(52) U.S. Cl.
CPC ............ *G11B 27/329* (2013.01); *G11B 27/034* (2013.01); *G11B 2220/2541* (2013.01); *G11B 2220/2562* (2013.01)

(58) Field of Classification Search
USPC .................... 386/285, 286, 323, 337, E9.013, 386/E9.054, 231, 240, 284; 348/E5.005, 348/E5.009, E5.014, E5.1, E5.108, E7.023; 380/269; 455/414.1, 414.3; 700/94; 710/68; 725/131; 369/275.1; 714/823, 714/42; 375/240.01, 240.12
See application file for complete search history.

(56) References Cited

U.S. PATENT DOCUMENTS 4,956,808 A * 9/1990 Aakre et al. .................... 710/68
6,683,911 B1 1/2004 Inoue (Continued)

FOREIGN PATENT DOCUMENTS

| EP | 1 130 595 A1 | 9/2001 |
|---|---|---|
| EP | 0 617 537 B1 | 3/2003 |

(Continued)

*Primary Examiner* — Thai Tran
*Assistant Examiner* — Syed Hasan
(74) *Attorney, Agent, or Firm* — Robert J. Depke; The Chicago Technology Law Group, LLC

(57) ABSTRACT

A reproducing apparatus includes a playback data acquisition unit for acquiring playback data containing encoded stream data, a decoding unit for decoding the stream data, a mixing unit for mixing data to be mixed, different from the stream data, with the stream data decoded by the decoding unit, and a selecting unit for selecting between supplying the stream data to the decoding unit and outputting the stream data, and a control unit for controlling the selecting unit. The control unit acquires, from the playback data acquired by the playback data acquisition unit, determination information indicating whether the playback data contains the data to be mixed with the stream data, and controls the selecting unit to output the stream data if the determination information determines that the playback data contains no data to be mixed and if data processed by the playback data processing unit is output as encoded data.

12 Claims, 59 Drawing Sheets

(51) Int. Cl.
*G06F 13/12* (2006.01)
*G06F 17/00* (2006.01)
*G11B 7/24* (2013.01)
*G11B 27/32* (2006.01)
*G11B 27/034* (2006.01)

(56) References Cited

U.S. PATENT DOCUMENTS

| | | |
|---|---|---|
| 6,714,826 B1 * | 3/2004 | Curley et al. .................. 700/94 |
| 7,801,930 B2 * | 9/2010 | So et al. ........................ 707/823 |
| 7,835,625 B2 | 11/2010 | Hashimoto et al. |
| 2002/0057849 A1 * | 5/2002 | Senda .......................... 382/284 |
| 2004/0126095 A1 * | 7/2004 | Tsumagari et al. ............. 386/95 |
| 2004/0179818 A1 * | 9/2004 | Ando et al. ..................... 386/69 |
| 2004/0264566 A1 * | 12/2004 | Kato et al. ............... 375/240.01 |
| 2005/0105892 A1 * | 5/2005 | Sugimura et al. .............. 386/95 |
| 2005/0213941 A1 * | 9/2005 | Taira et al. ..................... 386/95 |
| 2005/0245243 A1 * | 11/2005 | Zuniga ...................... 455/414.3 |
| 2006/0188223 A1 | 8/2006 | Ikeda et al. |

FOREIGN PATENT DOCUMENTS

| | | | | | |
|---|---|---|---|---|---|
| JP | 06-253331 | | 9/1994 | | |
| JP | 07-095300 | | 4/1995 | | |
| JP | 08-055427 | | 2/1996 | | |
| JP | 3268630 | | 5/1998 | | |
| JP | 11-213558 | | 8/1999 | | |
| JP | 2000-165802 | | 6/2000 | | |
| JP | 2001-268572 | | 9/2001 | | |
| JP | 2002-152051 | | 5/2002 | | |
| JP | 2002-162995 | | 6/2002 | | |
| JP | 2003-018035 A | * | 1/2003 | ............... | H04B 1/16 |
| JP | 3416034 | | 4/2003 | | |
| JP | 2003-173629 | | 6/2003 | | |
| JP | 2003244641 A | * | 8/2003 | ............... | H04N 5/92 |
| JP | 2004-328450 | | 11/2004 | | |
| JP | 2004-533748 | | 11/2004 | | |
| JP | 2005-020242 | | 1/2005 | | |
| JP | 2005-079945 | | 3/2005 | | |
| JP | 2005-114813 | | 4/2005 | | |
| JP | 2008-108419 | | 5/2008 | | |
| JP | 4251298 | | 4/2009 | | |
| JP | 4674618 | | 4/2011 | | |
| WO | WO 02-07772 A2 | | 1/2002 | | |
| WO | WO 2004-049710 A1 | | 6/2004 | | |
| WO | WO 2004-066303 | | 8/2004 | | |
| WO | WO 2006-080460 | | 8/2006 | | |

\* cited by examiner

FIG. 9

| Syntax | No. of bits | Mnemonic |
|---|---|---|
| index_bdmv { | | |
|   type_indicator | 8*4 | bslbf |
|   version_number | 8*4 | bslbf |
|   Indexes_start_address | 32 | uimsbf |
|   reserved_for_future_use | 224 | bslbf |
|   AppInfoBDMV() | | |
|   for (i=0; i<N1; i++) { | | |
|     padding_word | 16 | bslbf |
|   } | | |
|   Indexes() | | |
|   for (i=0; i<N2; i++) { | | |
|     padding_word | 16 | bslbf |
|   } | | |
| } | | |

FIG. 10

| Syntax | No. of bits | Mnemonic |
|---|---|---|
| indexes() { | | |
|   length | 32 | uimsbf |
|   FirstPlayback() { | | |
|     reserved_for_future_use | 32 | bslbf |
|     FirstPlayback_mobj_id_ref | 16 | uimsbf |
|   } | | |
|   TopMenu() { | | |
|     reserved_for_future_use | 32 | bslbf |
|     TopMenu_mobj_id_ref | 16 | uimsbf |
|   } | | |
|   number_of_Titles | 16 | uimsbf |
|   for(title_id=0; | | |
|     title_id<number_of_Titles; | | |
|     title_id++{ | | |
|     Title[title_id]() { | | |
|       Title_playback_type[title_id] | 1 | uimsbf |
|       Title_access_type[title_id] | 2 | uimsbf |
|       reserved_for_future_use | 29 | bslbf |
|       Title_mobj_id_ref[title_id] | 16 | uimsbf |
|     } | | |
|   } | | |
| } | | |

FIG. 11

| Syntax | No. of bits | Mnemonic |
|---|---|---|
| indexes() { | | |
|   length | 32 | uimsbf |
|   FirstPlayback() { | | |
|     reserved_for_future_use | 32 | bslbf |
|     FirstPlayback_mobj_id_ref | 16 | uimsbf |
|   } | | |
|   TopMenu() { | | |
|     reserved_for_future_use | 32 | bslbf |
|     TopMenu_mobj_id_ref | 16 | uimsbf |
|   } | | |
|   number_of_Titles | 16 | uimsbf |
|   for(title_id=0; | | |
|     title_id<number_of_Titles; | | |
|     title_id++{ | | |
|     Title[title_id]() { | | |
|       Title_playback_type[title_id] | 1 | uimsbf |
|       Title_access_type[title_id] | 2 | uimsbf |
|       is_MixApp | 1 | uimsbf |
|       reserved_for_future_use | 28 | bslbf |
|       Title_mobj_id_ref[title_id] | 16 | uimsbf |
|     } | | |
|   } | | |
| } | | |

FIG. 12

| Syntax | No. of bits | Mnemonic |
|---|---|---|
| indexes() { | | |
|   length | 32 | uimsbf |
|   FirstPlayback() { | | |
|     reserved_for_future_use | 32 | bslbf |
|     FirstPlayback_mobj_id_ref | 16 | uimsbf |
|   } | | |
|   TopMenu() { | | |
|     reserved_for_future_use | 32 | bslbf |
|     TopMenu_mobj_id_ref | 16 | uimsbf |
|   } | | |
|   number_of_Titles | 16 | uimsbf |
|   for(title_id=0; | | |
|     title_id<number_of_Titles; | | |
|     title_id++{ | | |
|     Title[title_id]() { | | |
|       Title_playback_type[title_id] | 1 | uimsbf |
|       Title_access_type[title_id] | 2 | uimsbf |
|       is_MixApp_1 | 1 | uimsbf |
|       is_MixApp_2 | 1 | uimsbf |
|       reserved_for_future_use | 27 | bslbf |
|       Title_mobj_id_ref[title_id] | 16 | uimsbf |
|     } | | |
|   } | | |
| } | | |

FIG. 13

| Syntax | No. of bits | Mnemonic |
|---|---|---|
| xxxxx.mpls { | | |
|     type_indicator | 8*4 | bslbf |
|     version_number | 8*4 | bslbf |
|     PlayList_start_address | 32 | uimsbf |
|     PlayListMark_start_address | 32 | uimsbf |
|     ExtensionData_start_address | 32 | uimsbf |
|     reserved_for_future_use | 160 | bslbf |
|     AppInfoPlayList() | | |
|     for(i=0; i<N1; i++) { | | |
|         padding_word | 16 | bslbf |
|     } | | |
|     PlayList() | | |
|     for(i=0; i<N2; i++) { | | |
|         padding_word | 16 | bslbf |
|     } | | |
|     PlayListMark() | | |
|     for(i=0; i<N3; i++) { | | |
|         padding_word | 16 | bslbf |
|     } | | |
|     ExtensionData() | | |
|     for(i=0; i<N4; i++) { | | |
|         padding_word | 16 | bslbf |
|     } | | |
| } | | |

FIG. 14

| Syntax | No. of bits | Mnemonic |
|---|---|---|
| AppInfoPlayList() { | | |
|   length | 32 | uimsbf |
|   reserved_for_future_use | 8 | bslbf |
|   PlayList_playback_type | 8 | bslbf |
|   if(PlayList_playback_type==2\|\|PlayList_playback_type==3) { | | |
|     playback_count | 16 | uimsbf |
|   }else{ | | |
|     reserved_for_future_use | 16 | bslbf |
|   } | | |
|   UO_mask_table() | | |
|   PlayList_random_access_flag | 1 | bslbf |
|   Is_MixApp | 1 | bslbf |
|   lossless_may_bypass_mixer_flag | 1 | bslbf |
|   reserved_for_future_use | 13 | bslbf |
| } | | |

FIG. 15

| Syntax | No. of bits | Mnemonic |
|---|---|---|
| AppInfoPlayList() { | | |
|   length | 32 | uimsbf |
|   reserved_for_future_use | 8 | bslbf |
|   PlayList_playback_type | 8 | bslbf |
|   if(PlayList_playback_type==2\|\|PlayList_playback_type==3) { | | |
|     playback_count | 16 | uimsbf |
|   }else{ | | |
|     reserved_for_future_use | 16 | bslbf |
|   } | | |
|   UO_mask_table() | | |
|   PlayList_random_access_flag | 1 | bslbf |
|   lossless_may_bypass_mixer_flag | 1 | bslbf |
|   reserved_for_future_use | 13 | bslbf |
| } | | |

FIG. 16

PlayList-Syntax

| Syntax | No. of bits | Mnemonic |
|---|---|---|
| PlayList() { | | |
|   length | 32 | uimsbf |
|   reserved_for_future_use | 16 | bslbf |
|   number_of_PlayItems | 16 | uimsbf |
|   number_of_SubPaths | 16 | uimsbf |
|   for (PlayItem_id=0; | | |
|     PlayItem_id<number_of_PlayItems; | | |
|     PlayItem_id++) { | | |
|     PlayItem() | | |
|   } | | |
|   for (SubPath_id= 0; | | |
|     SubPath_id<number_of_SubPaths; | | |
|     SubPath_id++) { | | |
|     SubPath() | | |
|   } | | |
| } | | |

FIG. 17

PlayList-Syntax

| Syntax | No. of bits | Mnemonic |
|---|---|---|
| PlayList() { | | |
|   length | 32 | uimsbf |
|   is_MixApp | 1 | uimsbf |
|   reserved_for_future_use | 15 | bslbf |
|   number_of_PlayItems | 16 | uimsbf |
|   number_of_SubPaths | 16 | uimsbf |
|   for (PlayItem_id=0; | | |
|     PlayItem_id<number_of_PlayItems; | | |
|     PlayItem_id++) { | | |
|     PlayItem() | | |
|   } | | |
|   for (SubPath_id= 0; | | |
|     SubPath_id<number_of_SubPaths; | | |
|     SubPath_id++) { | | |
|     SubPath() | | |
|   } | | |
| } | | |

FIG. 18

PlayList-Syntax

| Syntax | No. of bits | Mnemonic |
|---|---|---|
| PlayList() { | | |
|     length | 32 | uimsbf |
|     is_MixApp_1 | 1 | uimsbf |
|     is_MixApp_2 | 1 | uimsbf |
|     reserved_for_future_use | 14 | bslbf |
|     number_of_PlayItems | 16 | uimsbf |
|     number_of_SubPaths | 16 | uimsbf |
|     for (PlayItem_id=0; | | |
|         PlayItem_id<number_of_PlayItems; | | |
|         PlayItem_id++) { | | |
|         PlayItem() | | |
|     } | | |
|     for (SubPath_id= 0; | | |
|         SubPath_id<number_of_SubPaths; | | |
|         SubPath_id++) { | | |
|         SubPath() | | |
|     } | | |
| } | | |

FIG. 19

SubPath-Syntax

| Syntax | No. of bits | Mnemonic |
|---|---|---|
| SubPath() { | | |
|   length | 32 | uimsbf |
|   reserved_for_future_use | 8 | bslbf |
|   SubPath_type | 8 | uimsbf |
|   reserved_for_future_use | 15 | uimsbf |
|   is_repeat_SubPath | 1 | bslbf |
|   reserved_for_future_use | 8 | bslbf |
|   number_of_SubPlayItems | 8 | uimsbf |
|   for(i=0;i< number_of_SubPlayItems;i++) { | | |
|     SubPlayItem(i) | | |
|   } | | |
| } | | |

FIG. 20

| SubPath_type | | |
|---|---|---|
| SubPath_type | Meaning | |
| 0 | reserved | |
| 1 | reserved | |
| 2 | Audio presentation path of the Browsable slideshow (The audio presentation path using the SubPath is not synchronized with the main path using PlayItems in the PlayList.) | |
| 3 | Interactive graphics presentation menu (The interactive graphics menu using the SubPath is not synchronized with the main path using PlayItems in the PlayList.) | |
| 4 | Text subtitle presentation path (The text subtitle presentation path using the SubPath is synchronized with the main path using PlayItems in the PlayList.) | |
| 5 | 2nd Audio Presentation path (The 2nd Audio Presentation path using the SubPath is synchronized with the main path using PlayItems in the PlayList.) | |
| 6 | 2nd Video Presentation path (The 2nd Video Presentation path using the SubPath is synchronized with the main path using PlayItems in the PlayList.) | |
| 7-255 | reserved | |

FIG. 21

SubPlayItem(i)-Syntax

| Syntax | No. of bits | Mnemonic |
|---|---|---|
| SubPlayItem(i) { | | |
|     length | 16 | uimsbf |
|     Clip_Information_file_name[0]    //subclip_entry_id=0 | 8*5 | bslbf |
|     Clip_codec_identifier[0] | 8*4 | bslbf |
|     reserved_for_future_use | 31 | bslbf |
|     is_multi_Clip_entries | 1 | bslbf |
|     ref_to_STC_id[0] | 8 | uimsbf |
|     SubPlayItem_IN_time | 32 | uimsbf |
|     SubPlayItem_OUT_time | 32 | uimsbf |
|     sync_PlayItem_id | 16 | uimsbf |
|     sync_start_PTS_of_PlayItem | 32 | uimsbf |
|     if(is_multi_Clip_entries==1b) { | | |
|         reserved_for_future_use | 8 | bslbf |
|         num_of_Clip_entries | 8 | uimsbf |
|         for(subclip_entry_id=1;//Note:Entries after subclip_entry_id=0 | | |
|         subclip_entry_id<num_of_Clip_entries;subclip_entry_id ++) { | | |
|             Clip_Information_file_name[subclip_entry_id] | 8*5 | bslbf |
|             Clip_codec_identifier[subclip_entry_id] | 8*4 | bslbf |
|             ref_to_STC_id[subclip_entry_id] | 8 | uimsbf |
|             reserved_for_future_use | 8 | bslbf |
|         } | | |
|     } | | |
| } | | |

FIG. 22

PlayItem-Syntax

| Syntax | No.of bits | Mnemonic |
|---|---|---|
| PlayItem() { | | |
|     length | 16 | uimsbf |
|     Clip_Information_file_name[0] | 8*5 | bslbf |
|     Clip_codec_identifier[0] | 8*4 | bslbf |
|     reserved_for_future_use | 11 | bslbf |
|     is_multi_angle | 1 | bslbf |
|     connection_condition | 4 | uimsbf |
|     ref_to_STC_id[0] | 8 | uimsbf |
|     IN_time | 32 | uimsbf |
|     OUT_time | 32 | uimsbf |
|     UO_mask_table() | | |
|     PlayItem_random_access_mode | 8 | uimsbf |
|     still_mode | 8 | uimsbf |
|     if(still_mode==0x1) { | | |
|         still_time | 16 | uimsbf |
|     }else{ | | |
|         reserved | 16 | bslbf |
|     } | | |
|     if(is_multi_angle==1b) { | | |
|         number_of_angles | 8 | uimsbf |
|         reserved_for_future_use | 7 | bslbf |
|         is_seamless_angle_change | 1 | uimsbf |
|         for(angle_id = 1; //Note: angles after angle_id=1 | | |
|           angle_id<number_of_angles; angle_id++) { | | |
|             Clip_Information_file_name[angle_id] | 8*5 | bslbf |
|             Clip_codec_identifier[angle_id] | 8*4 | bslbf |
|             ref_to_STC_id[angle_id] | 8 | uimsbf |
|             reserved_for_future_use | 16 | bslbf |
|         } | | |
|     } | | |
|     STN_table() | | |
| } | | |

FIG. 23

PlayItem-Syntax

| Syntax | No. of bits | Mnemonic |
|---|---|---|
| PlayItem() { | | |
|     length | 16 | uimsbf |
|     Clip_Information_file_name[0] | 8*5 | bslbf |
|     Clip_codec_identifier[0] | 8*4 | bslbf |
|     is_MixApp | 1 | uimsbf |
|     reserved_for_future_use | 10 | bslbf |
|     is_multi_angle | 1 | bslbf |
|     connection_condition | 4 | uimsbf |
|     ref_to_STC_id[0] | 8 | uimsbf |
|     IN_time | 32 | uimsbf |
|     OUT_time | 32 | uimsbf |
|     UO_mask_table() | | |
|     PlayItem_random_access_mode | 8 | uimsbf |
|     still_mode | 8 | uimsbf |
|     if(still_mode==0x1) { | | |
|         still_time | 16 | uimsbf |
|     } else { | | |
|         reserved | 16 | bslbf |
|     } | | |
|     if(is_multi_angle==1<sub>b</sub>) { | | |
|         number_of_angles | 8 | uimsbf |
|         reserved_for_future_use | 7 | bslbf |
|         is_seamless_angle_change | 1 | uimsbf |
|         for(angle_id = 1; //Note: angles after angle_id=1 | | |
|             angle_id<number_of_angles; angle_id++) { | | |
|                 Clip_Information_file_name[angle_id] | 8*5 | bslbf |
|                 Clip_codec_identifier[angle_id] | 8*4 | bslbf |
|                 ref_to_STC_id[angle_id] | 8 | uimsbf |
|                 reserved_for_future_use | 16 | bslbf |
|         } | | |
|     } | | |
|     STN_table() | | |
| } | | |

FIG. 24

PlayItem-Syntax

| Syntax | No. of bits | Mnemonic |
|---|---|---|
| PlayItem() { | | |
|     length | 16 | uimsbf |
|     Clip_Information_file_name[0] | 8*5 | bslbf |
|     Clip_codec_identifier[0] | 8*4 | bslbf |
|     is_MixApp_1 | 1 | uimsbf |
|     is_MixApp_2 | 1 | uimsbf |
|     reserved_for_future_use | 9 | bslbf |
|     is_multi_angle | 1 | bslbf |
|     connection_condition | 4 | uimsbf |
|     ref_to_STC_id[0] | 8 | uimsbf |
|     IN_time | 32 | uimsbf |
|     OUT_time | 32 | uimsbf |
|     UO_mask_table() | | |
|     PlayItem_random_access_mode | 8 | uimsbf |
|     still_mode | 8 | uimsbf |
|     if(still_mode==0x1) { | | |
|         still_time | 16 | uimsbf |
|     }else{ | | |
|         reserved | 16 | bslbf |
|     } | | |
|     if(is_multi_angle==1b) { | | |
|         number_of_angles | 8 | uimsbf |
|         reserved_for_future_use | 7 | bslbf |
|         is_seamless_angle_change | 1 | uimsbf |
|         for(angle_id = 1; //Note: angles after angle_id=1 | | |
|         angle_id<number_of_angles; angle_id++) { | | |
|             Clip_Information_file_name[angle_id] | 8*5 | bslbf |
|             Clip_codec_identifier[angle_id] | 8*4 | bslbf |
|             ref_to_STC_id[angle_id] | 8 | uimsbf |
|             reserved_for_future_use | 16 | bslbf |
|         } | | |
|     } | | |
|     STN_table() | | |
| } | | |

FIG. 25

| STN_table() Syntax | No. of bits | Mnemonic |
|---|---|---|
| STN_table() { | | |
|     length | 16 | uimsbf |
|     reserved_for_future_use | 16 | bslbf |
|     number_of_video_stream_entries | 8 | uimsbf |
|     number_of_audio_stream_entries | 8 | uimsbf |
|     number_of_audio_stream2_entries | 8 | uimsbf |
|     number_of_PG_textST_stream_entries | 8 | uimsbf |
|     number_of_IG_stream_entries | 8 | uimsbf |
|     reserved_for_future_use | 64 | bslbf |
|     for (video_stream_id=0;<br>        video_stream_id < number_of_video_stream_entries;<br>        video_stream_id++) { | | |
|         stream_entry() | | |
|         stream_attribute() | | |
|     } | | |
|     for (audio_stream_id=0;<br>        audio_stream_id < number_of_audio_stream_entries;<br>        audio_stream_id++) { | | |
|         stream_entry() | | |
|         stream_attributes() | | |
|     } | | |
|     for (audio_stream_id2=0;<br>        audio_stream_id2 < number_of_audio_stream2_entries;<br>        audio_stream_id2++) { | | |
|         stream_entry() | | |
|         stream_attributes() | | |
|     } | | |
|     for (PG_textST_stream_id=0;<br>        PG_textST_stream_id < number_of_PG_textST_stream_entries;<br>        PG_txtST_stream_id++) { | | |
|         stream_entry() | | |
|         stream_attribute() | | |
|     } | | |
|     for (IG_stream_id=0;<br>        IG_stream_id < number_of_IG_stream_entries;<br>        IG_stream_id++) { | | |
|         stream_entry() | | |
|         stream_attribute() | | |
|     } | | |
| } | | |

FIG. 26

| Syntax | No. of bits | Mnemonic |
|---|---|---|
| Stream_entry() | | |
| stream_entry(id) { | | |
|     length | 8 | uimsbf |
|     type | 8 | uimsbf |
|     if(type==1) { | | |
|         ref_to_stream_PID_of_mainClip | 16 | uimsbf |
|         reserved_for_future_use | 48 | Bslbf |
|     }else if(type==2) { | | |
|         ref_to_SubPath_id | 8 | Uimsbf |
|         ref_to_subClip_entry_id | 8 | Uimsbf |
|         ref_to_stream_PID_of_subClip | 16 | |
|         reserved_for_future_use | 32 | bslbf |
|     } | | |
| } | | |

FIG. 27 stream_attribute()

| Syntax | No. of bits | Mnemonic |
|---|---|---|
| stream_attribute() { | | |
|     length | 8 | uimsbf |
|     stream_coding_type | 8 | bslbf |
|     if (stream_coding_type==0x02) { | | |
|         video_format | 4 | bslbf |
|         frame_rate | 4 | bslbf |
|         aspect_ratio | 4 | bslbf |
|         reserved_for_future_use | 4 | bslbf |
|     } else if (stream_coding_type==0x80 \|\| <br>         stream_coding_type==0x81 \|\| <br>         stream_coding_type==0x82) { | | |
|         audio_presentation_type | 4 | bslbf |
|         sampling_frequency | 4 | bslbf |
|         audio_language_code | 8*2 | bslbf |
|         reserved_for_future_use | 8 | bslbf |
|     } else if (stream_coding_type==0x90) { <br>         // Presentation graphics stream | | |
|         PG_language_code | 8*2 | bslbf |
|     } else if (stream_coding_type==0x91) { <br>         // Interactive graphics stream | | |
|         IG_language_code | 8*2 | bslbf |
|     } else if (stream_coding_type==0x92) { <br>         // Text subtitle stream | | |
|         character_code | 8 | bslbf |
|         textST_language_code | 8*2 | bslbf |
|     } | | |
| } | | |

FIG. 28 stream_coding_type

| stream_coding_type | Meaning |
|---|---|
| 0x02 | MPEG-2 video stream |
| 0x80 | HDMV LPCM audio |
| 0x81 | Dolby AC-3 audio |
| 0x82 | dts audio |
| 0x90 | Presentation graphics stream |
| 0x91 | Interactive graphics stream |
| 0x92 | Text subtitle stream |
| other values | reserved |

FIG. 29 video_format

| video_format | Meaning | Video standard |
|---|---|---|
| 0 | reserved | |
| 1 | 480i | ITU-R BT.601-4 |
| 2 | 576i | ITU-R BT.601-4 |
| 3 | 480p | SMPTE 293M |
| 4 | 1080i | SMPTE 274M |
| 5 | 720p | SMPTE 296M |
| 6 | 1080p | SMPTE 274M |
| 7 - 14 | reserved | |

FIG. 30 frame_rate

| frame_rate | Meaning [Hz] |
|---|---|
| 0 | reserved |
| 1 | 24 000/1001 (23.976...) |
| 2 | 24 |
| 3 | 25 |
| 4 | 30 000/1001 (29.97...) |
| 5 | reserved |
| 6 | 50 |
| 7 | 60 000/1001 (59.94...) |
| 8-15 | reserved |

FIG. 31 aspect_ratio

| aspect_ratio | Meaning |
|---|---|
| 0 | reserved |
| 1 | reserved |
| 2 | 4:3 display aspect ratio |
| 3 | 16:9 display aspect ratio |
| 4-15 | reserved |

FIG. 32 audio_presentation_type

| audio_presentation_type | Meaning |
|---|---|
| 0 | reserved |
| 1 | single mono channel |
| 2 | dual mono channel |
| 3 | stereo (2-channel) |
| 4 | reserved |
| 5 | reserved |
| 6 | multi-channel |
| 7-15 | reserved |

FIG. 33 sampling_frequency

| sampling_frequency | Meaning |
|---|---|
| 0 | reserved |
| 1 | 48 kHz |
| 2 | reserved |
| 3 | reserved |
| 4 | 96 kHz |
| 5 -15 | reserved |

FIG. 34

Character code

| Character code value | Character set | Character Encoding scheme |
|---|---|---|
| 0x00 | reserved | |
| 0x01 | Unicode V1.1 (ISO 10646-1) | UTF8 |
| 0x02 | Unicode V1.1 (ISO 10646-1) | UTF16 big endian |
| 0x03 | Shift JIS (Japanese) | |
| 0x04 | KSC 5601-1987 including KSC 5653 for Roman character (Korean) | |
| 0x05 | GB18030-2000 (Chinese) | |
| 0x06 | GB2312 (Chinese) | |
| 0x07 | BIG5 (Chinese) | |
| Others | Reserved | |

FIG. 35

```
─────────── STREAM NO. TABLE ───────────

A_SN=1: AUDIO 2
         A_SN=2: AUDIO 1
         A_SN=3: AUDIO 3

A_SN2=1: AUDIO 4
         A_SN2=2: AUDIO 5
```

FIG. 36

| Syntax | No. of bits |
|---|---|
| sound. bdmv { | |
|     type_indicator | 8*4 |
|     version_number | 8*4 |
|     SoundData_start_address | 32 |
|     reserved_for_future_use | 224 |
|     SoundIndex () | |
|     for(i=0; i<L1; i++) { | |
|         padding_word | 16 |
|     } | |
|     SoundData () | |
|     for(i=0; i<L2; i++) { | |
|         padding_word | 16 |
|     } | |
| } | |

| FIG. 37A | FIG. 37B |

FIG. 37B

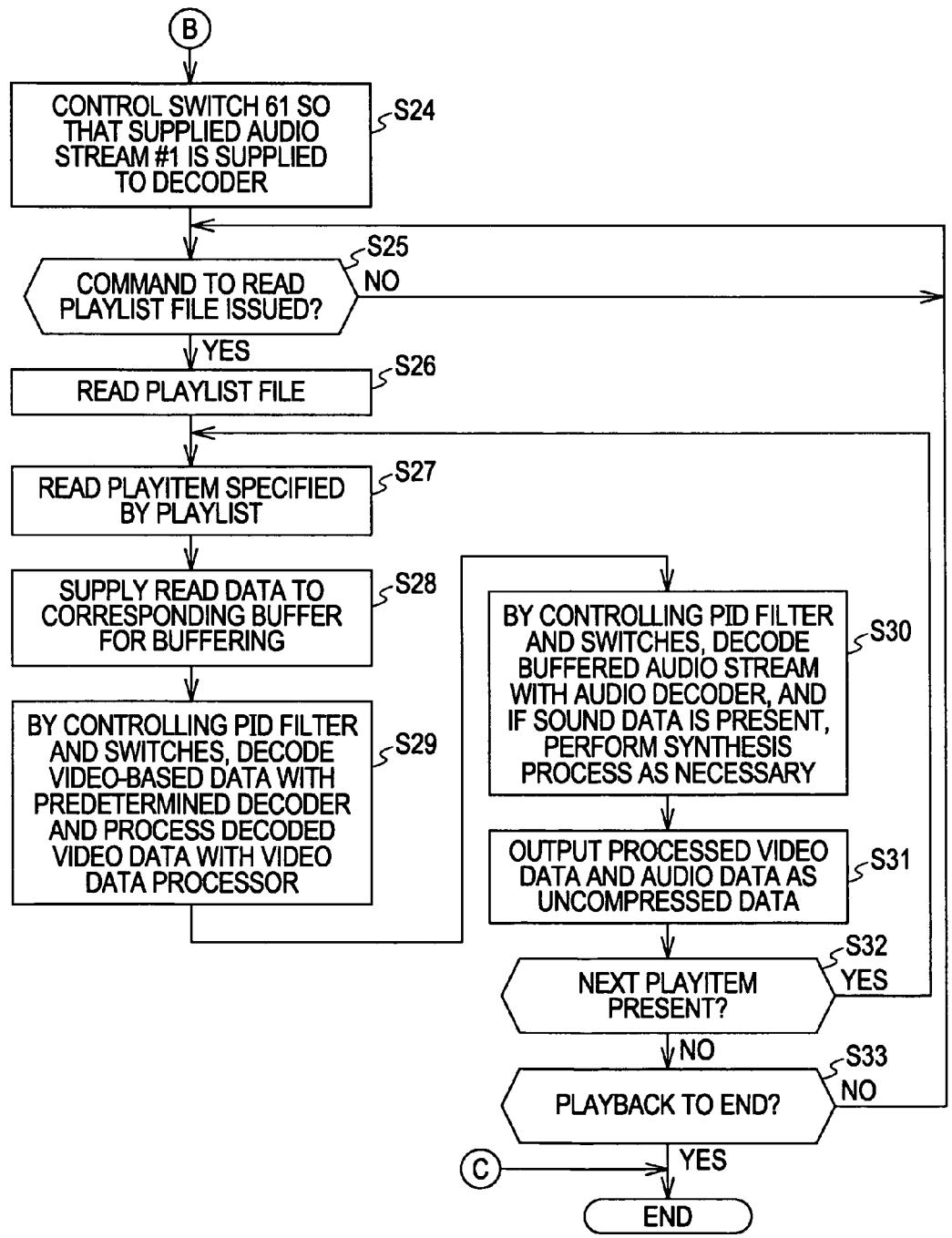

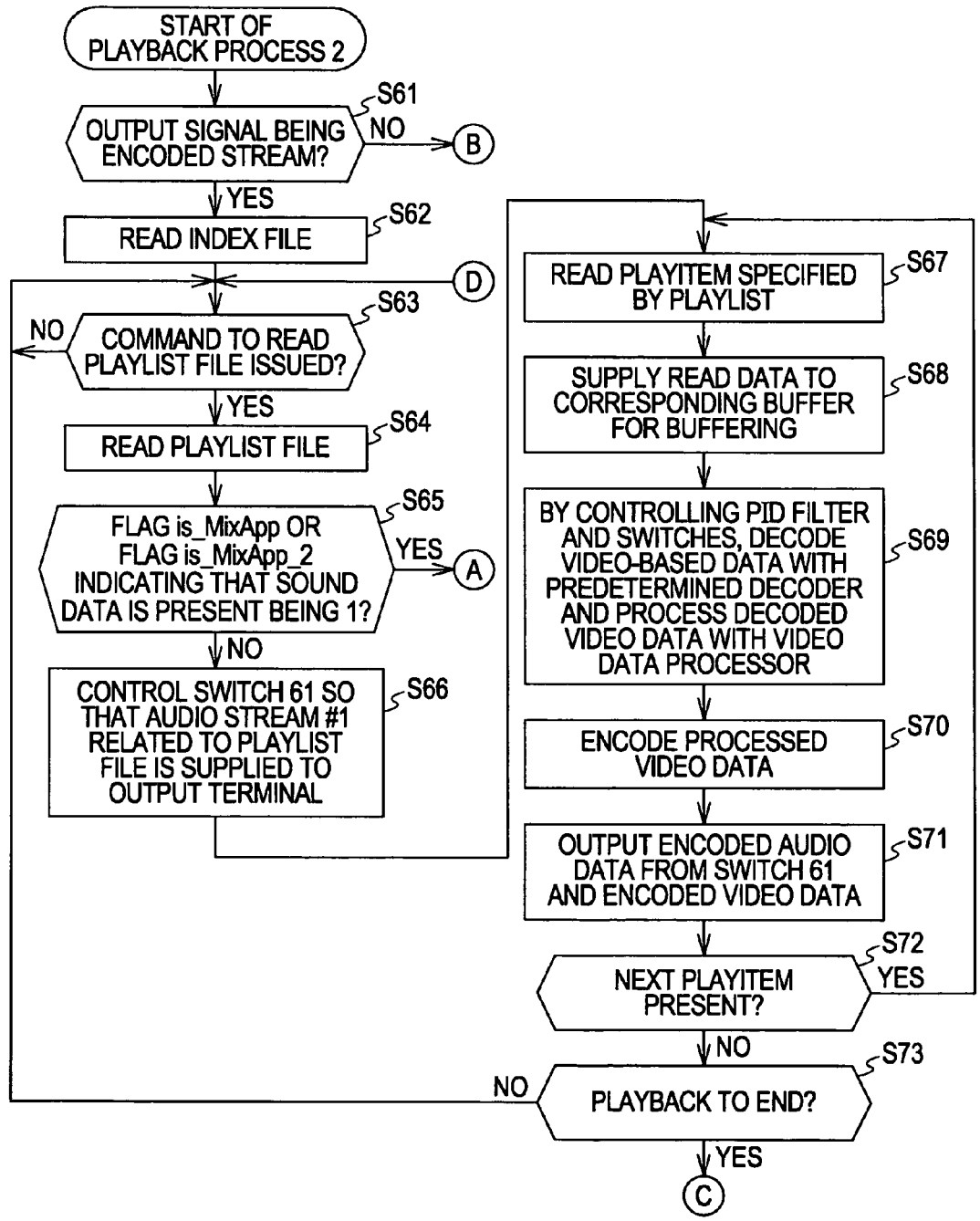

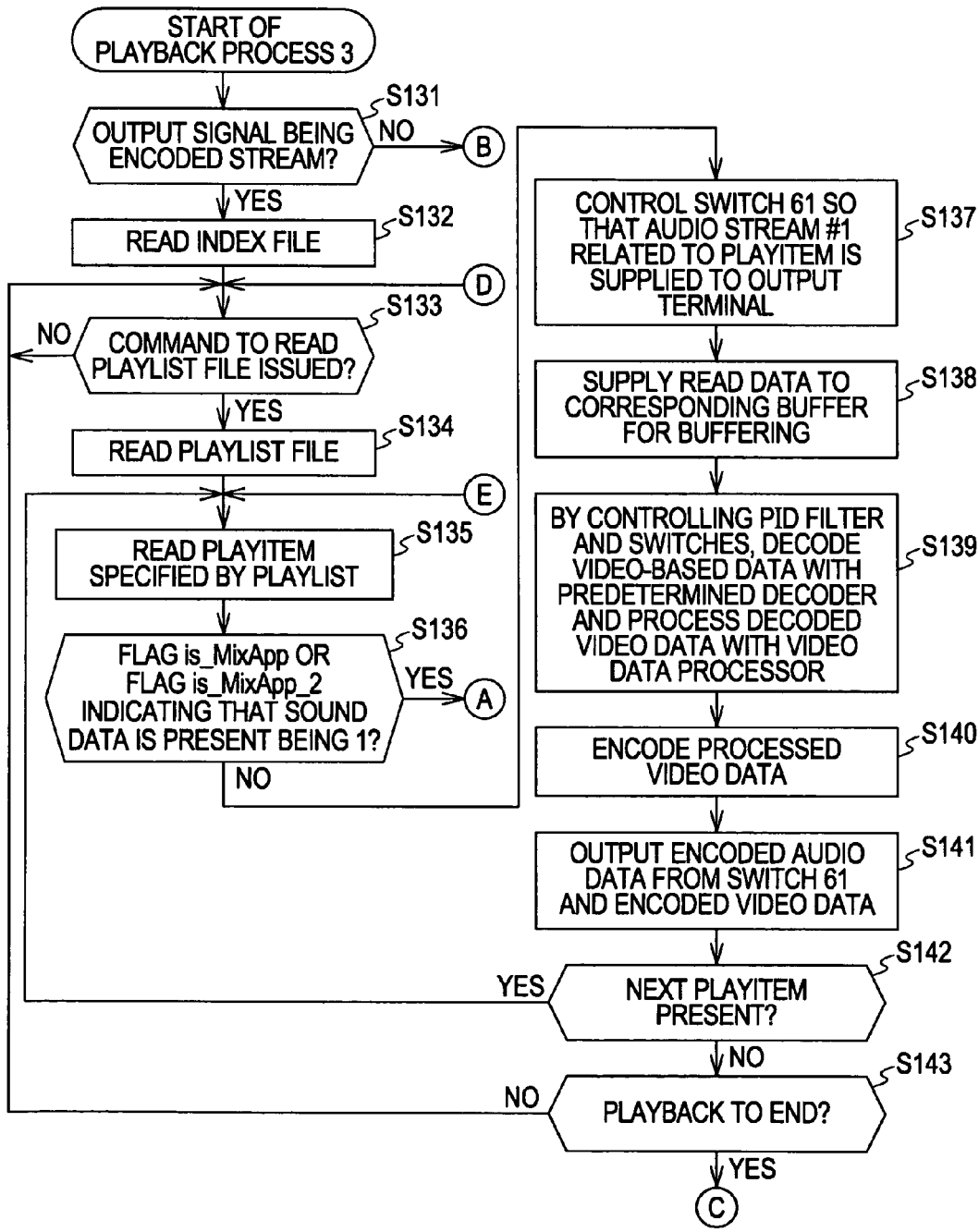

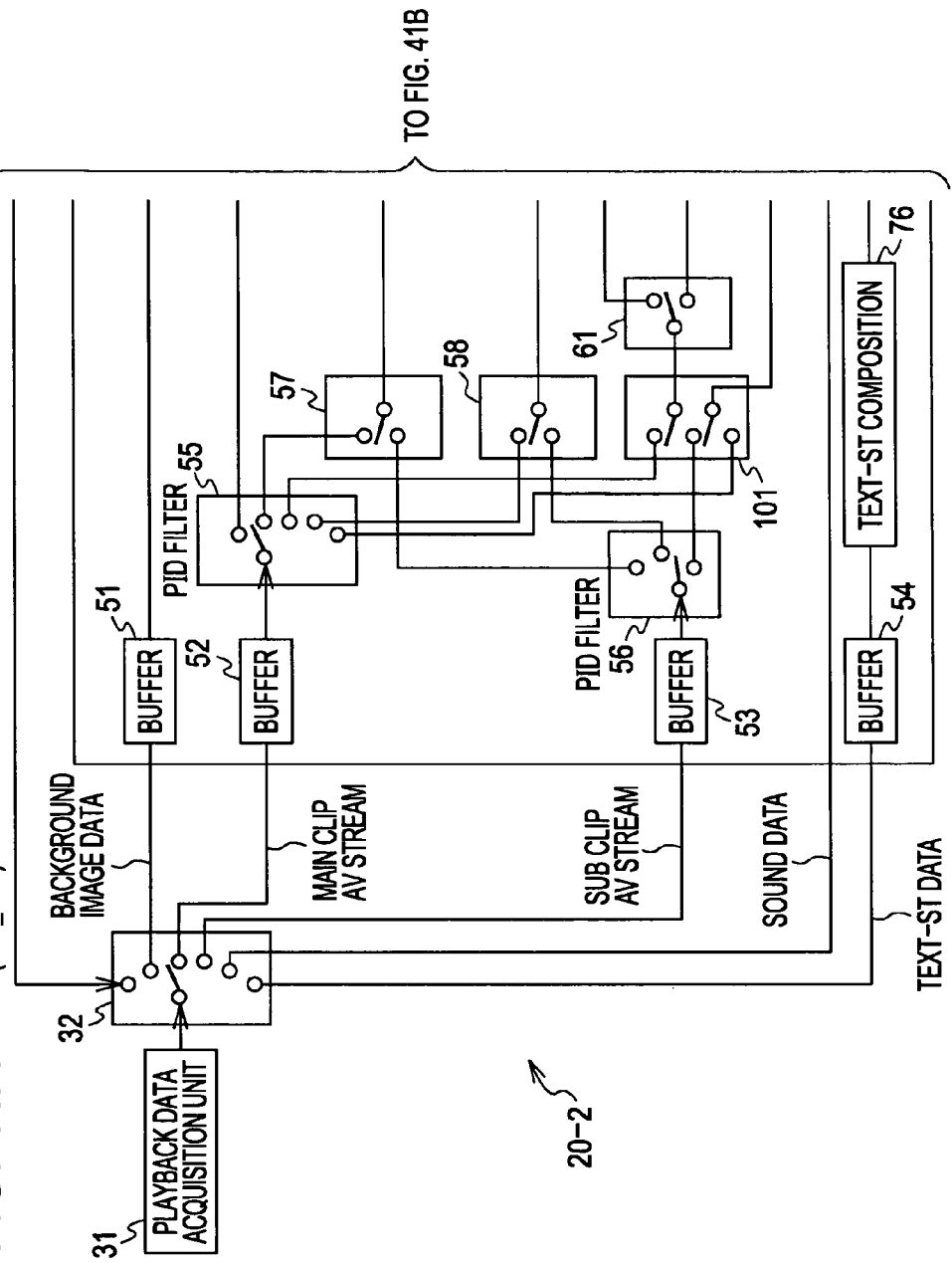

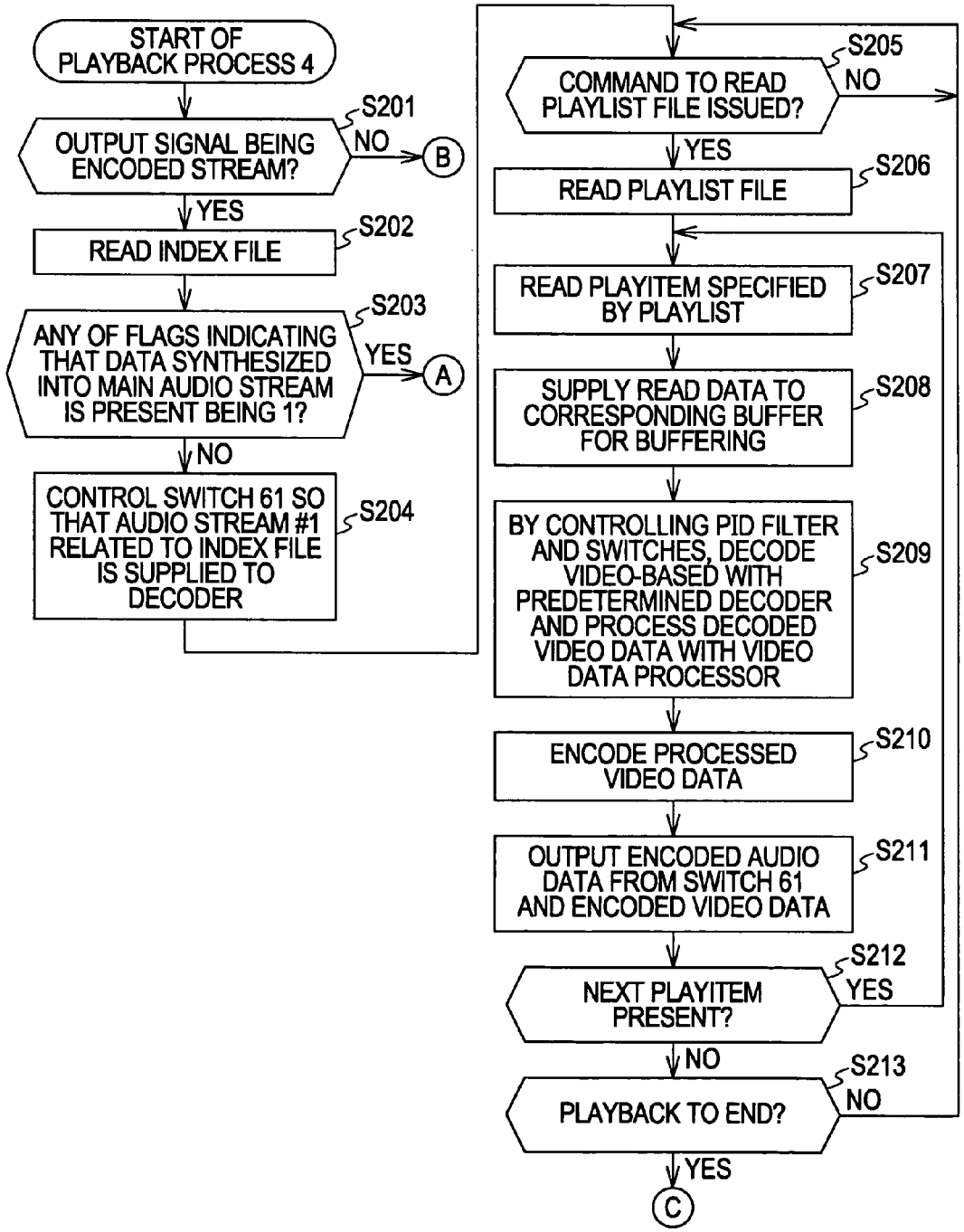

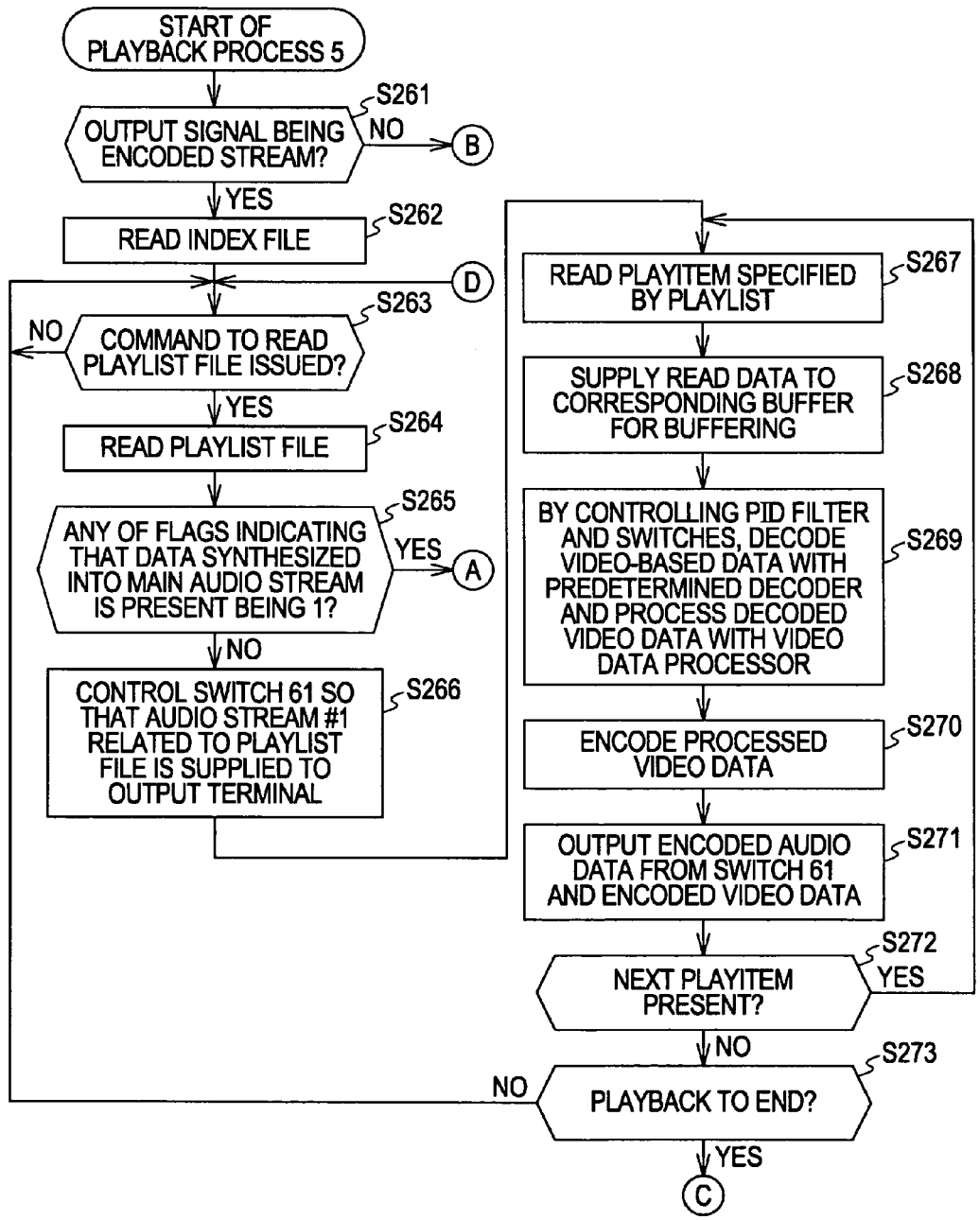

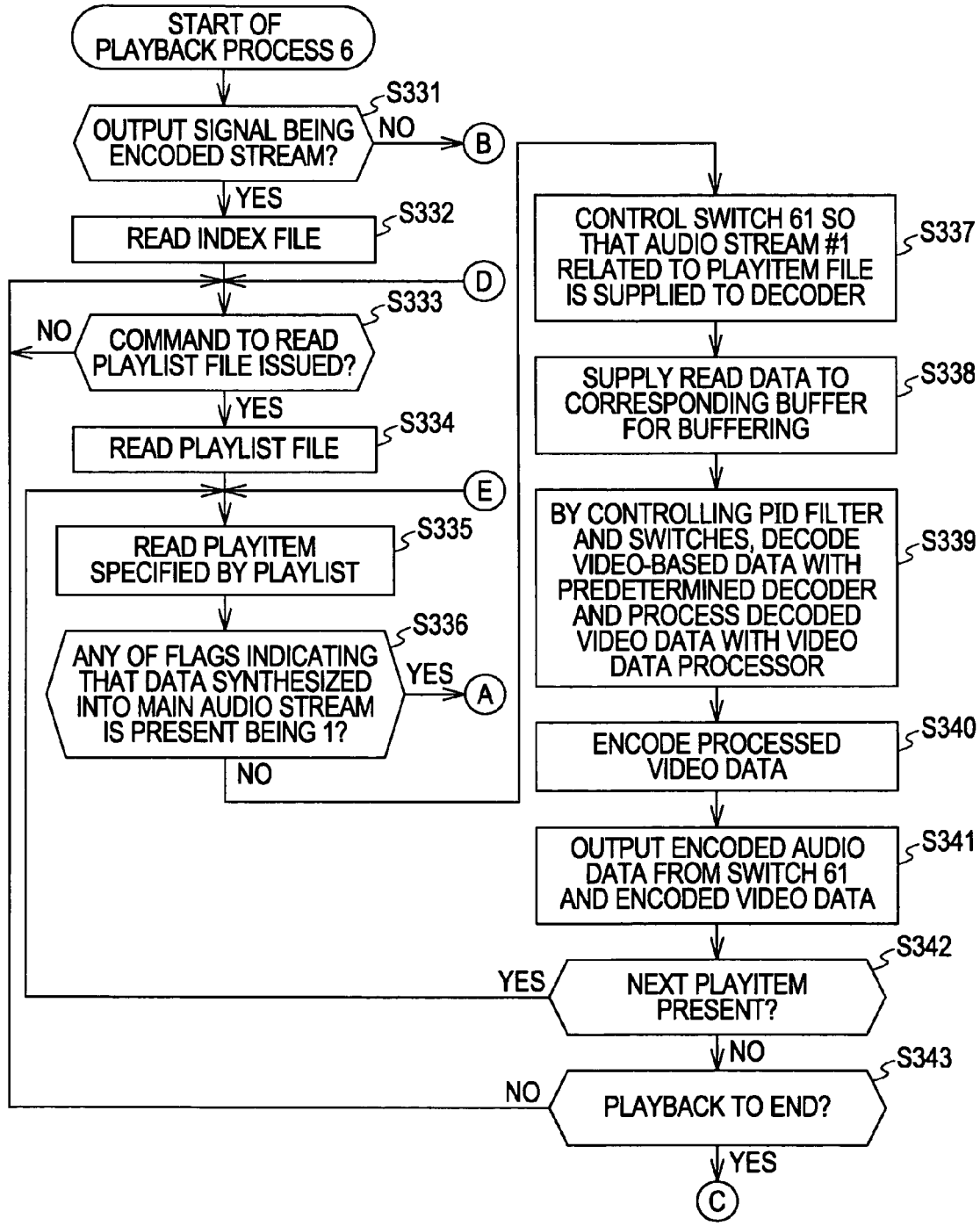

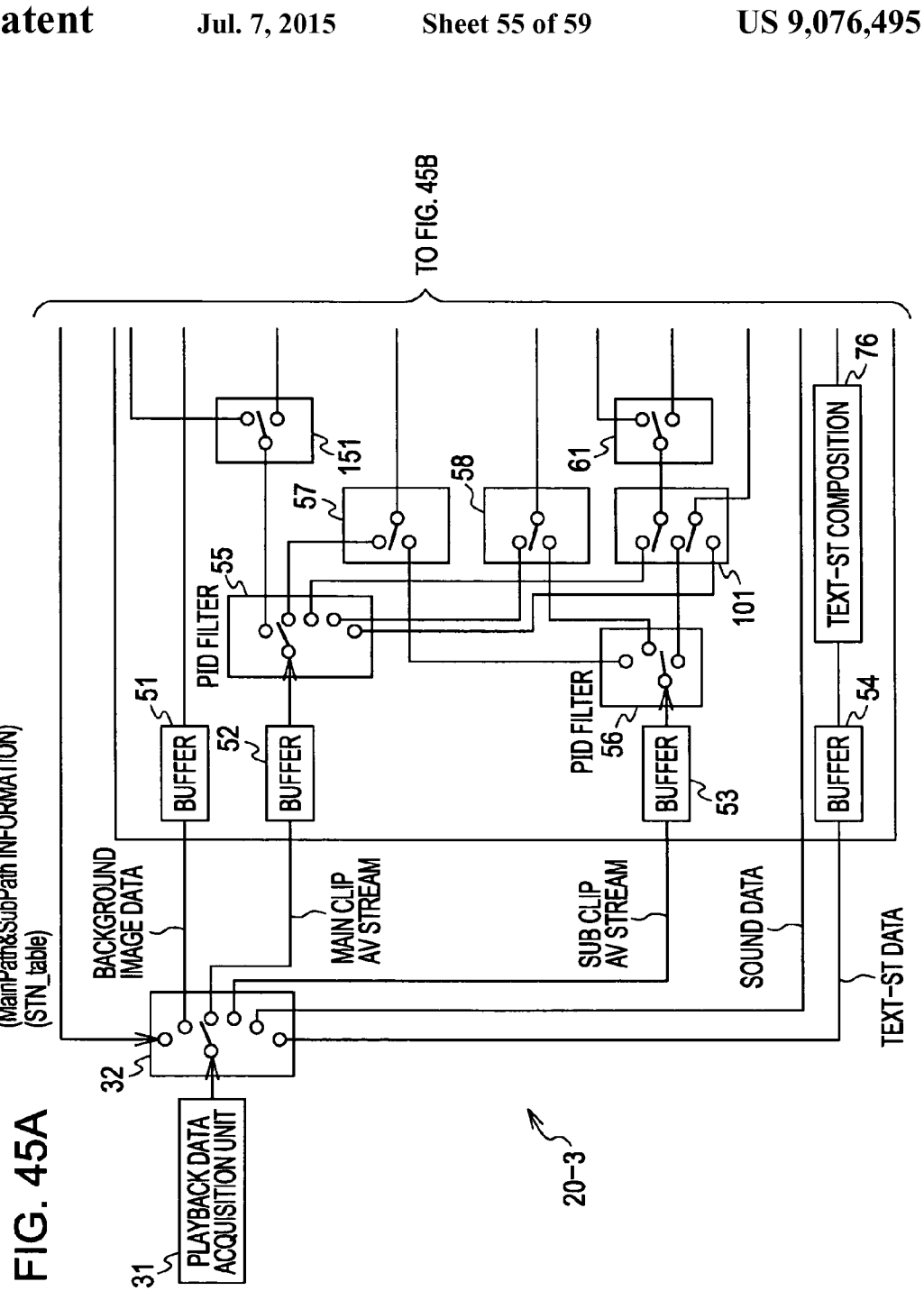

FIG. 45B

REPRODUCING APPARATUS, REPRODUCING METHOD, COMPUTER PROGRAM, PROGRAM STORAGE MEDIUM, DATA STRUCTURE, RECORDING MEDIUM, RECORDING DEVICE, AND MANUFACTURING METHOD OF RECORDING MEDIUM

CROSS REFERENCES TO RELATED APPLICATIONS

The present invention contains subject matter related to Japanese Patent Application JP 2005-206997 filed in the Japanese Patent Office on Jul. 15, 2005, and Japanese Patent Application JP 2006-147981 filed in the Japanese Patent Office on May 29, 2006, the entire contents of which are incorporated herein by reference.

BACKGROUND OF THE INVENTION

1. Field of the Invention

The present invention relates to a reproducing apparatus, a reproducing method, a computer program, a program storage medium, a data structure, a recording medium, a recording device and a method of manufacturing the recording medium. In particular, the present invention relates to a reproducing apparatus, a reproducing method, a computer program, a program storage medium, a data structure, a recording medium, a recording device and a method of manufacturing the recording medium for appropriate use in mixing playback audio data.

2. Description of the Related Art

Japanese Unexamined Patent Application Publication No. 2005-20242 discloses a technique to simultaneously view different contents. In this technique, image data of a plurality of contents are decoded and then mixed into uncompressed video data. The uncompressed video data is then digital-to-analog (D/A) converted, output to a video output terminal, and then displayed on an external display device.

In the disclosed technique, to mix video data, each pieces of compressed (encoded) video data needs to be decoded, and then mixed into uncompressed video data. This process must be performed not only on the video data but also on audio data. To mix the audio data, uncompressed audio data is required.

Output data must be encoded depending on a function of an output destination apparatus or a connection method with the output destination apparatus.

For example, main audio data may be mixed with another audio data, and the output mixed audio data may be encoded data. Such a process is described below with reference to FIG. 1.

A first audio data acquisition unit 11 acquires first audio data in the encoded form read and supplied from an optical disk, and then supplies the first audio data to a decoder 12. The first audio data is a content that is continuously reproduced. The decoder 12 decodes the encoded (compressed) data supplied by the first audio data acquisition unit 11, and then supplies the uncompressed first audio data to a mixer 14.

A second audio data acquisition unit 13 acquires-uncompressed second audio data, and then supplies the second audio data to the mixer 14. Upon receipt of the uncompressed second audio data from the second audio data acquisition unit 13, the mixer 14 mixes the second audio data with the uncompressed first audio data supplied from the decoder 12, and supplies the mixed audio data to an encoder 15.

The encoder 15 encodes the supplied audio data, and then supplies the encoded audio data to a digital interface 16. The digital interface 16 transmits the supplied audio data to another apparatus via a predetermined network.

SUMMARY OF THE INVENTION

The uncompressed second audio data may or may not be present for the content. More specifically, depending on the content, the second audio data acquisition unit 13 is designed not to acquire the uncompressed second audio data. Alternatively, the second audio data is prepared for a predetermined portion of the content, and the second audio data acquisition unit 13 acquires only the predetermined portion of the second audio data. If the uncompressed second audio data is not supplied by the second audio data acquisition unit 13, the mixer 14 supplies to the encoder 15 the uncompressed first audio data from the decoder 12.

The apparatus of FIG. 1 may output both contents, namely, one content into which the first audio data as a main playback output and the second audio data are mixed, and the other content containing the first audio data without the second audio data. Alternatively, the apparatus of FIG. 1 uses the predetermined portion of the second audio data. Conventional reproducing apparatuses cannot determine whether the second audio data is to be mixed (whether the second audio data is present).

In the known reproducing apparatuses, the content is decoded and re-encoded regardless of whether the first audio data is mixed with the second audio data, and without paying attention to a portion where no second audio data is mixed. Since the first audio data is always decoded and then re-encoded, sound quality is degraded.

The above-described disclosed technique for mixing the video data to output encoded data may have the same problem. More specifically, if a reproducing apparatus for mixing the video data cannot detect the presence or absence of another data to be mixed with main output video data, the main output video data is always decoded and re-encoded, thereby suffering from video quality degradation.

It is thus desirable to mix data as necessary to prevent data degradation as much as possible.

In accordance with one embodiment of the present invention, a reproducing apparatus includes a playback data acquisition unit for acquiring playback data containing encoded stream data, a decoding unit for decoding the stream data, a mixing unit for mixing data to be mixed, different from the stream data, with the stream data decoded by the decoding unit, and a selecting unit for selecting between supplying the stream data to the decoding unit and outputting the stream data, and a control unit for controlling the selecting unit, wherein the control unit acquires, from the playback data acquired by the playback data acquisition unit, determination information indicating whether the playback data contains the data to be mixed with the stream data, and controls the selecting unit to output the stream data if the determination information determines that the playback data contains no data to be mixed and if data processed by the playback data processing unit is output as encoded data.

The playback data acquired by the playback data acquisition unit may include one predetermined file containing data corresponding to a title of the playback data, and the control unit may acquire the determination information from the predetermined file.

The playback data acquired by the playback data acquisition unit may include at least one predetermined file containing information indicating a playback order of the playback data, and the control unit may acquire the determination information from the predetermined file.

The playback data acquired by the playback data acquisition unit may include at least one unit of first data and at least one unit of second data associated with the first data, the first data being information indicating a playback order of the playback data, and the second data being information indicating a playback period of data reproduced in accordance with the playback order controlled by the first data, and the control unit may acquire the determination information from the second data.

In accordance with one embodiment of the present invention, each of a reproducing method of a reproducing apparatus for reproducing data and outputting the reproduced data, a program for causing a computer to perform a playback process and the program stored on a program storage medium, includes steps of acquiring, from playback data containing encoded stream data, determination information indicating whether the playback data contains data to be mixed with the stream data, determining based on the acquired determination information whether the playback data contains the data to be mixed with the stream data, and outputting the stream data if the determination information indicates that the playback data does not contain the data to be mixed with the stream data and if the reproduced data output from the reproducing apparatus is encoded data.

In accordance with one embodiment of the present invention, a data structure of data to be reproduced by a reproducing apparatus, or data stored on a recording medium includes first information for managing a playback order of stream data, wherein the first information contains second information, different from the stream data and related to the presence or absence of data to be mixed with the stream data.

In accordance with one embodiment of the present invention, a recording device for recording, onto a recording medium, data replayable on a reproducing apparatus, includes an acquisition unit for acquiring data having a data structure including first information for managing a playback order of stream data, the first information containing second information, different from the stream data and related to the presence or absence of data to be mixed with the stream data, and a recording unit for recording, onto the recording medium, the data acquired by the acquisition unit.

In accordance with one embodiment of the present invention, a method of manufacturing a recording medium recording data replayable on a reproducing apparatus, includes steps of generating data having a data structure including first information for managing a playback order of stream data, the first information containing second information, different from the stream data and related to the presence or absence of data to be mixed with the stream data, and recording the generated data onto the recording medium.

The determination information indicating whether the playback data contains the data to be mixed with the stream data is acquired from the playback data containing the encoded stream data. The determination information is thus used to determine whether the playback data contains the data to be mixed with the stream data. If the playback data does not contain the data to be mixed with the stream data, and if the data output from the reproducing apparatus is encoded data, the stream data is output.

The data of the above data structure or the data stored on the recording medium contains the first information managing the playback order of the stream data, and the first information contains the second information different from the stream data and related to the presence or absence of the data to be mixed.

The recording device acquires the data containing the first information for managing the playback order of the stream data, the first information containing the second information different from the stream data and related to the presence or absence of the data to be mixed, and records the acquired data thereon.

The method of manufacturing the recording medium recording data replayable on the reproducing apparatus, includes steps of generating data having a data structure including first information for managing a playback order of stream data, the first information containing second information, different from the stream data and related to the presence or absence of data to be mixed with the stream data, and recording the generated data onto the recording medium.

Network refers to a mechanism that allows two apparatuses interconnected to each other to convey information from one to the other apparatus. The apparatuses communicating via the network may be independent apparatuses or may be internal blocks forming one apparatus.

Communication refers to wireless communication, wired communication, or a combination of wireless communication and wired communication. In the case of the combination of wireless communication and wired communication, wireless communication may be performed in one area and wired communication may be performed in the other area. Furthermore, wired communication is performed from a first apparatus to a second apparatus, and then wireless communication is performed from the second apparatus to a third apparatus.

In accordance with one feature of the present invention, the stream data is reproduced. In particular, if it is determined that the playback data contains no data to be mixed with the stream data, and if the output data is encoded data, the stream data is output without being decoded and re-encoded.

In accordance with another feature of the present invention, the data provided has the data structure including the first information managing the playback order of the stream data, and the first data further contains the second data, different from the stream data and related to the presence or absence of the data to be mixed. The reproducing apparatus having acquired the data having such a data structure can output the stream data without the need for decoding and re-encoding the stream data if the playback data contains no data to be mixed with the stream data and if the output data is encoded data.

BRIEF DESCRIPTION OF THE DRAWINGS

FIG. 9 illustrates a syntax of index.bdmv;
FIG. 10 illustrates a syntax of indexes;
FIG. 11 illustrates a syntax of indexes;
FIG. 12 illustrates a syntax of indexes;
FIG. 13 illustrates a data structure of a PlayList file;
FIG. 14 illustrates a syntax of AppInfoPlayList ( );
FIG. 15 illustrates a syntax of AppInfoPlayList ( );

FIG. 16 illustrates a syntax of PlayList ( );
FIG. 17 illustrates a syntax of PlayList ( );
FIG. 18 illustrates a syntax of PlayList ( );
FIG. 19 illustrates a syntax of SubPath ( );
FIG. 20 illustrates a syntax of SubPath_type;
FIG. 21 illustrates a syntax of SubPlayItem (i);
FIG. 22 illustrates a syntax of PlayItem ( );
FIG. 23 illustrates a syntax of PlayItem ( );
FIG. 24 illustrates a syntax of PlayItem ( );
FIG. 25 illustrates a syntax of STN_table ( );
FIG. 26 illustrates a syntax of stream_entry;
FIG. 27 illustrates a syntax of stream_attribute ( );
FIG. 28 illustrates stream_coding_type;
FIG. 29 illustrates video_format;
FIG. 30 illustrates frame_rate;
FIG. 31 illustrates aspect_ratio;
FIG. 32 illustrates audio_presentation_type;
FIG. 33 illustrates sampling_frequency;
FIG. 34 illustrates character code;
FIG. 35 illustrates an example of a stream number table representing the relationship between an audio signal presented to a user and a caption signal;
FIG. 36 illustrates a syntax of sound.bdmv;
FIG. 45 is a block diagram illustrating a third structure of reproducing apparatus in accordance with one embodiment of the present invention.

DESCRIPTION OF THE PREFERRED EMBODIMENTS

Figure 1:
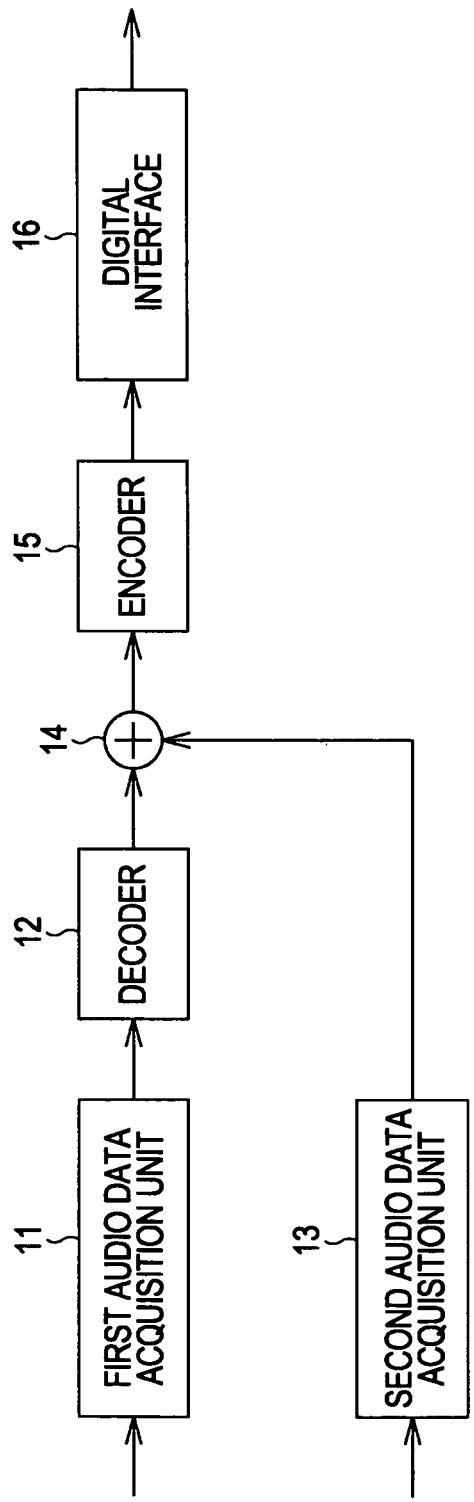
FIG. 1 illustrates a known audio mixing process.

Before describing an embodiment of the present invention, the correspondence between the features of the invention and the specific elements disclosed in an embodiment of the present invention is discussed below. This description is intended to assure that embodiments supporting the claimed invention are described in this specification. Thus, even if an element in the following embodiments is not described as relating to a certain feature of the present invention, that does not necessarily mean that the element does not relate to that feature of the invention. Conversely, even if an element is described herein as relating to a certain feature of the invention, that does not necessarily mean that the element does not relate to other features of the invention.

Figure 45B:
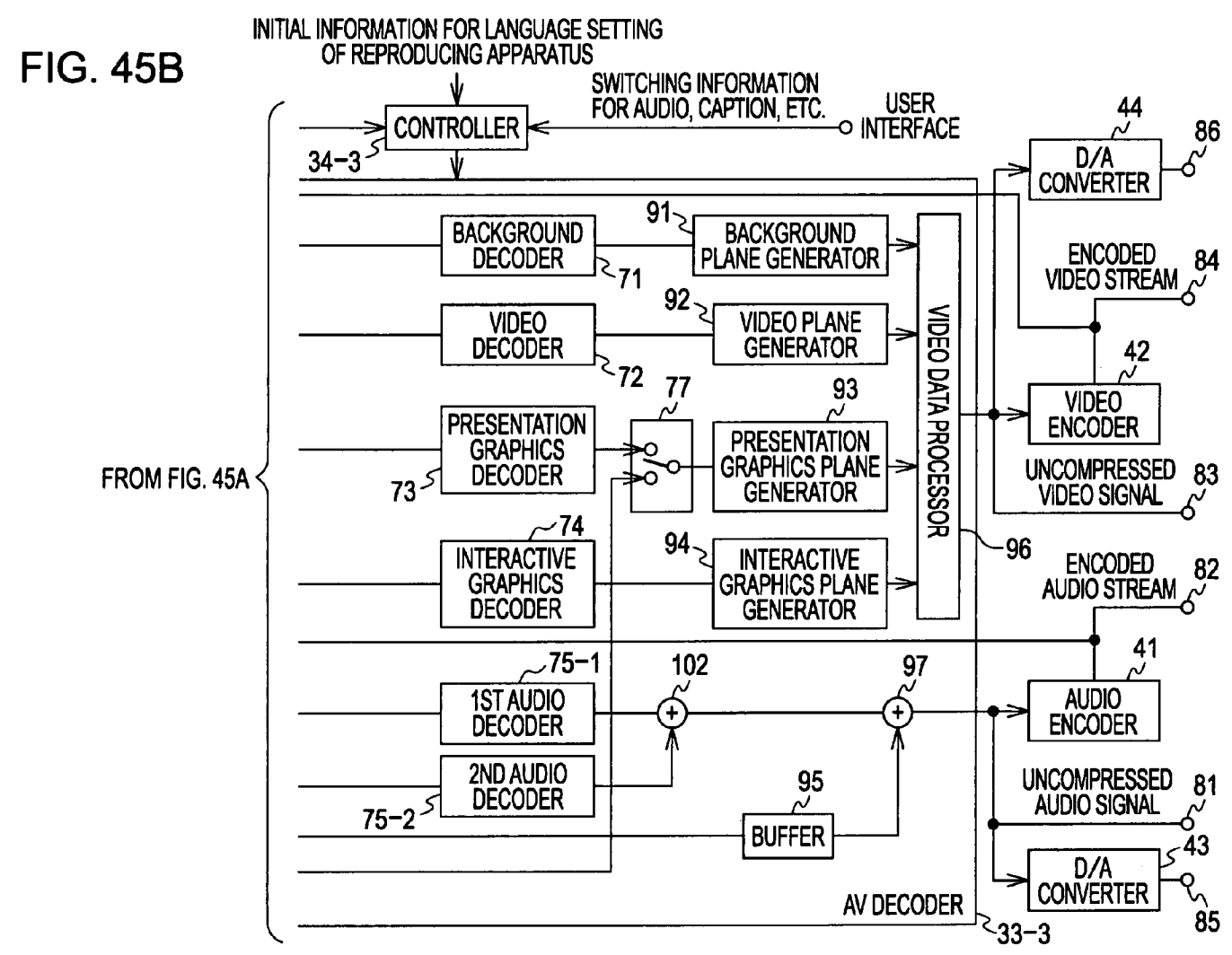

A reproducing apparatus in one embodiment of the present invention (for example, one of reproducing apparatus 20-1 of FIG. 37, reproducing apparatus 20-2 of FIG. 41, and reproducing apparatus 20-3 of FIG. 45) includes a playback data acquisition unit (for example, playback data acquisition unit 31 of each of FIGS. 37, 41, of 45) for acquiring playback data containing encoded stream data (for example, audio stream #1 or video stream decoded by video decoder 72 of FIG. 45), a decoding unit (for example, audio decoder 75 of FIG. 37 or audio decoder 75-1 of one of FIGS. 41 and 45) for decoding the stream data, a mixing unit (for example, mixer 97 of one of FIGS. 37, 41, and 45 or mixer 102 of one FIGS. 41 and 45) for mixing data to be mixed (for example, one of sound data, sound stream #1, another video stream to be mixed with a video stream decoded by video decoder 72, and video data), different from the stream data, with the stream data decoded by the decoding unit, a selecting unit (for example, switch 61 of FIGS. 37, 41, and 45) for selecting between supplying the stream data to the decoding unit and outputting the stream data, and a control unit (for example, one of controller 34-1 of FIG. 37, controller 34-2 of FIG. 41, and controller 34-3 of FIG. 45) for controlling the selecting unit, wherein the control unit acquires, from the playback data acquired by the playback data acquisition unit, determination information (for example, is_MixApp, is_MixApp_1 or is_MixApp_2) indicating whether the playback data contains the data to be mixed with the stream data, and controls the selecting unit to output the stream data if the determination information determines that the playback data contains no data to be mixed and if data processed by the playback data processing unit is output as encoded data.

In the reproducing apparatus, the playback data acquired by the playback data acquisition unit includes one predetermined file (for example, Index file) containing data corresponding to a title of the playback data, and the control unit acquires the determination information from the predetermined file.

In the reproducing apparatus, the playback data acquired by the playback data acquisition unit includes at least one predetermined file (for example, XXXXX.mpls corresponding to PLAYLIST file of FIG. 8) containing information (for example, PlayList) indicating a playback order of the playback data, and the control unit acquires the determination information from the predetermined file.

In the reproducing apparatus, the playback data acquired by the playback data acquisition unit includes at least one unit of first data (for example, PlayList) and at least one unit of second data (for example, PlayItem) associated with the first data, the first data being information indicating a playback order of the playback data, and the second data being information indicating a playback period of data reproduced in accordance with the playback order controlled by the first data, and the control unit acquires the determination information from the second data.

Figure 39B:
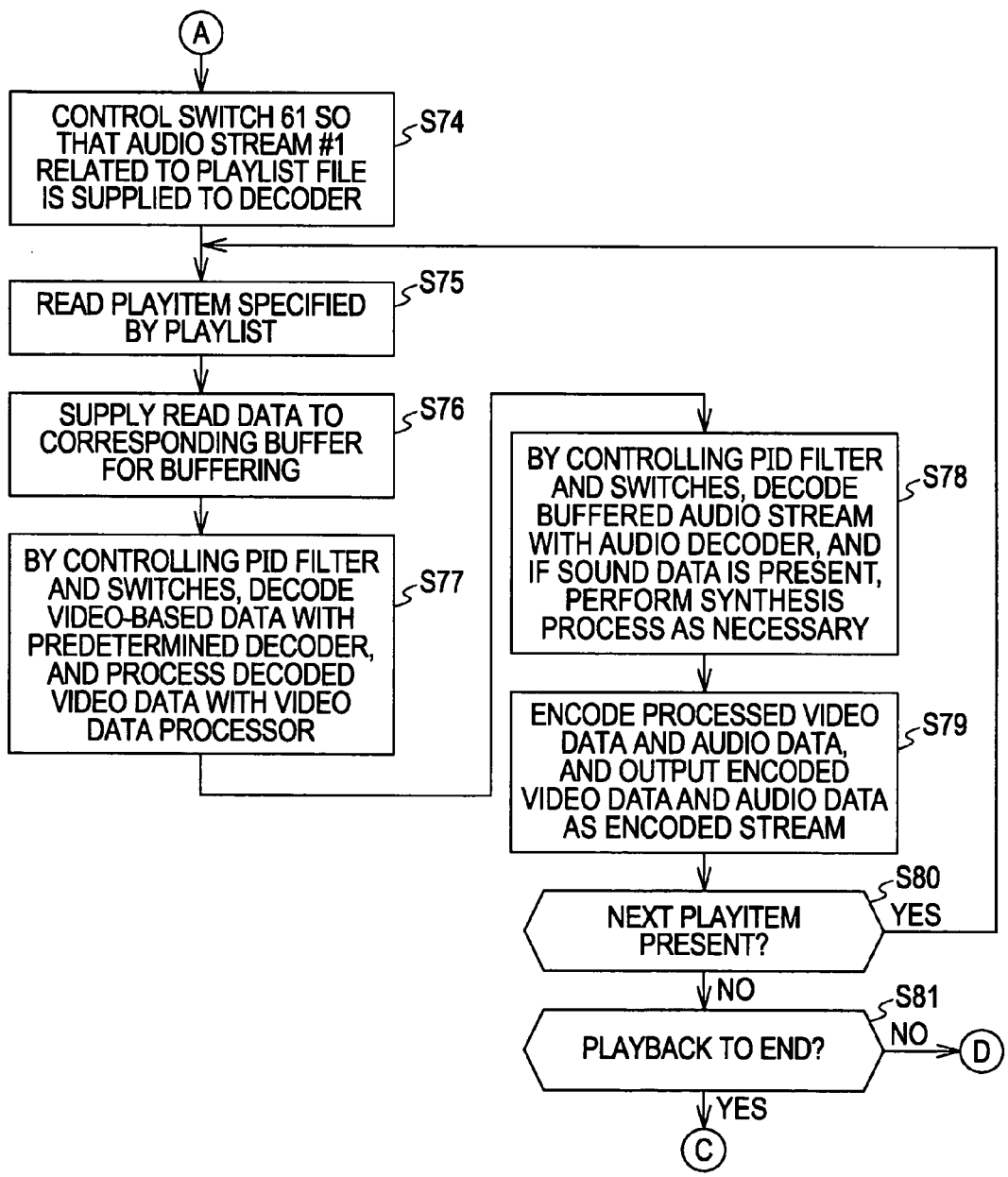
FIG. 39 is a flowchart illustrating a playback process 2.
Figure 39C:
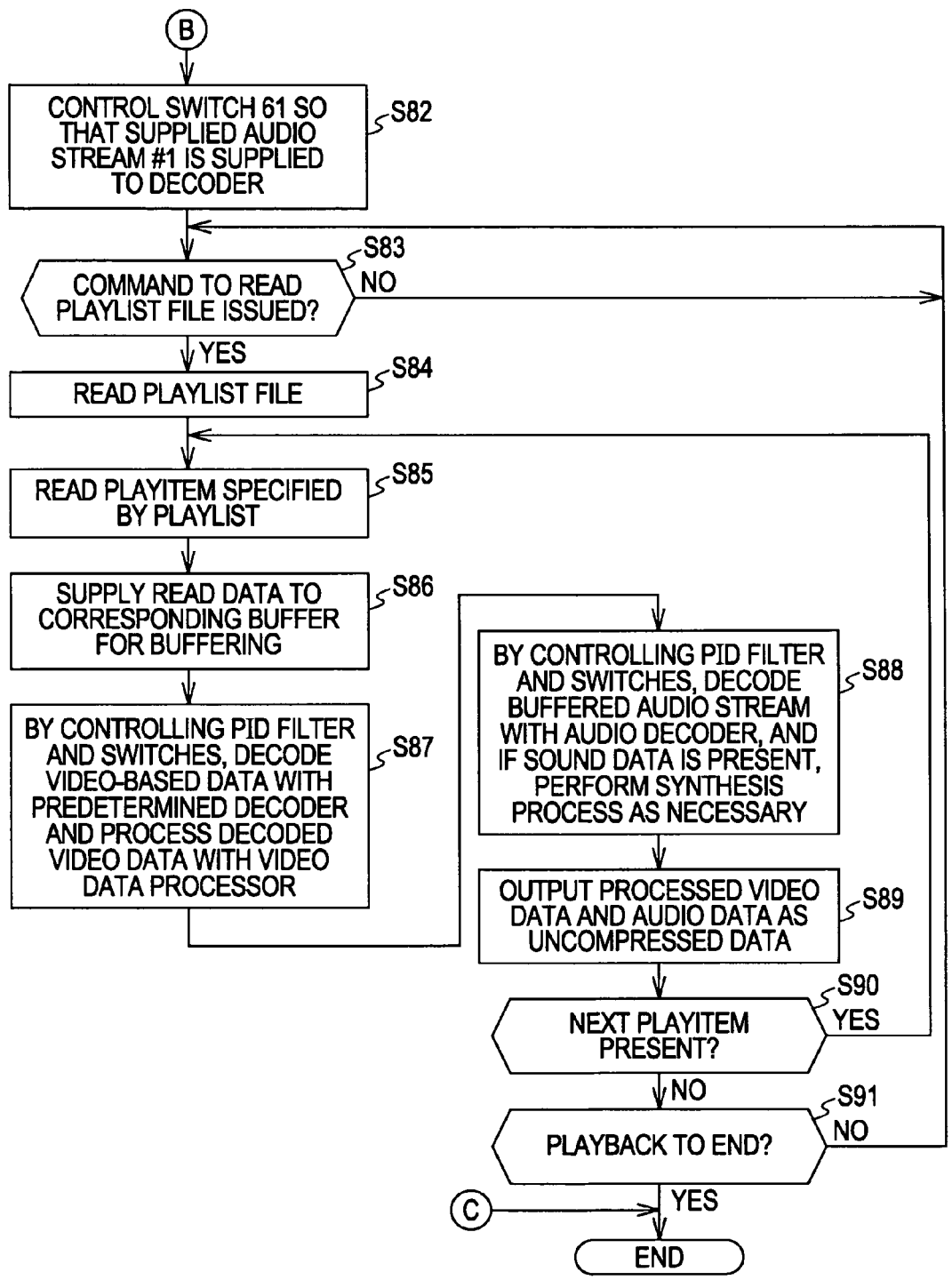
Figure 40B:
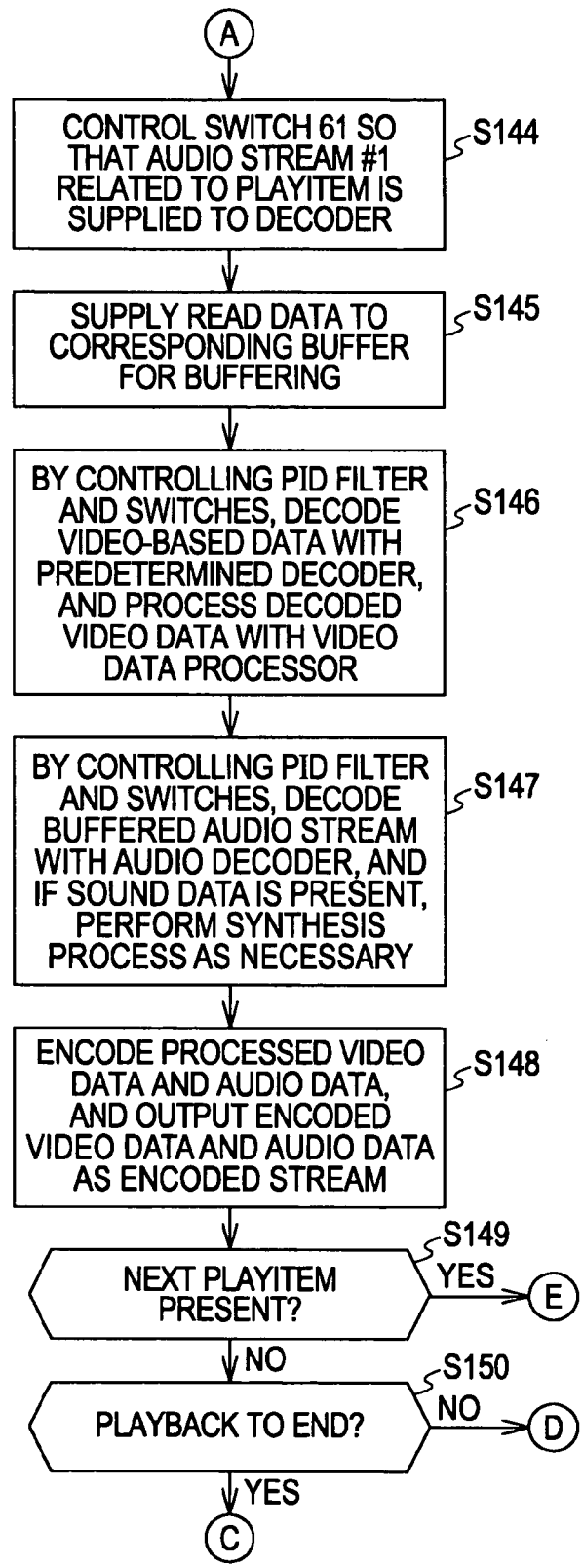
FIG. 40 is a flowchart illustrating a playback process 3.
Figure 40C:
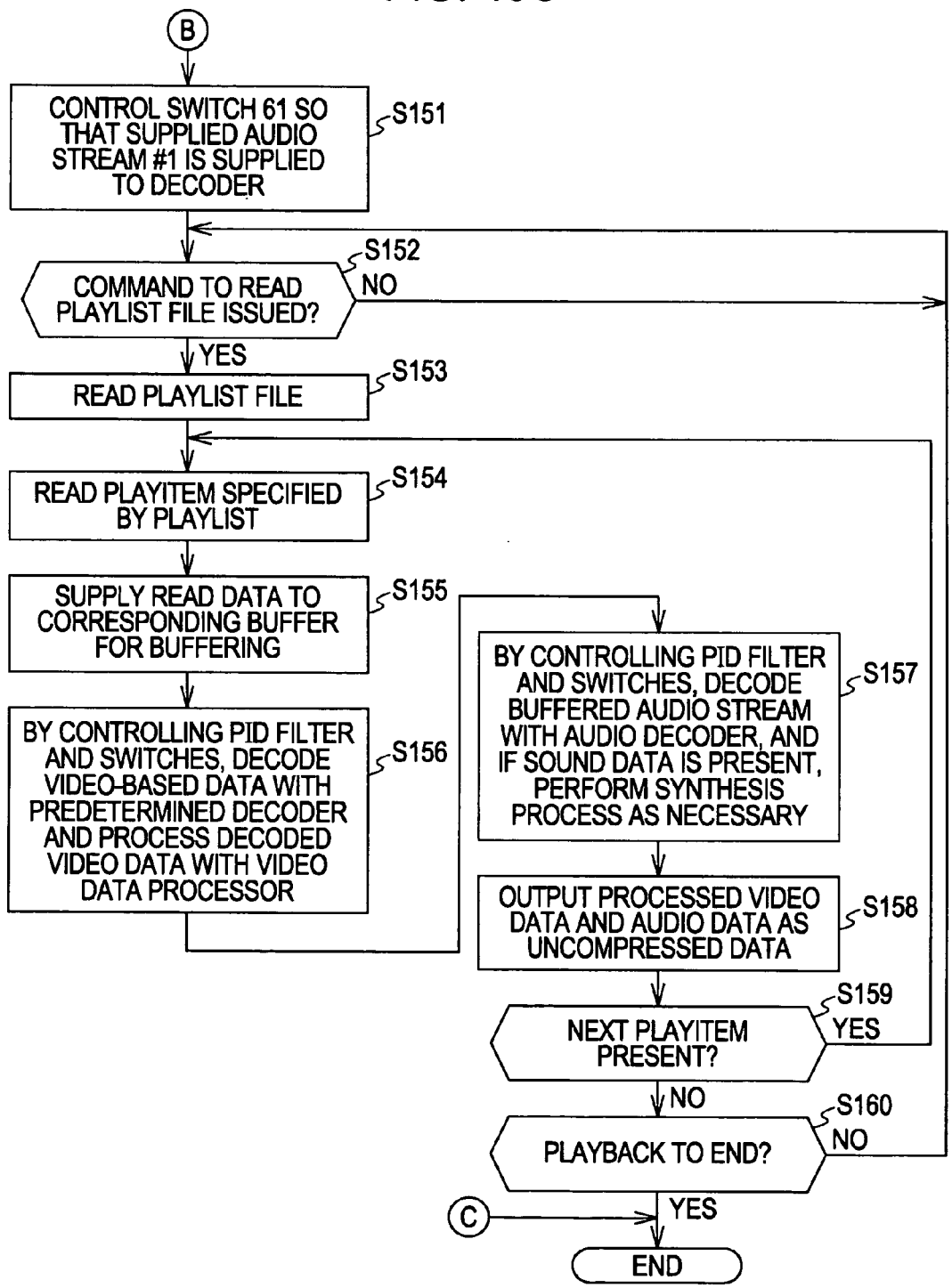
Figure 43B:
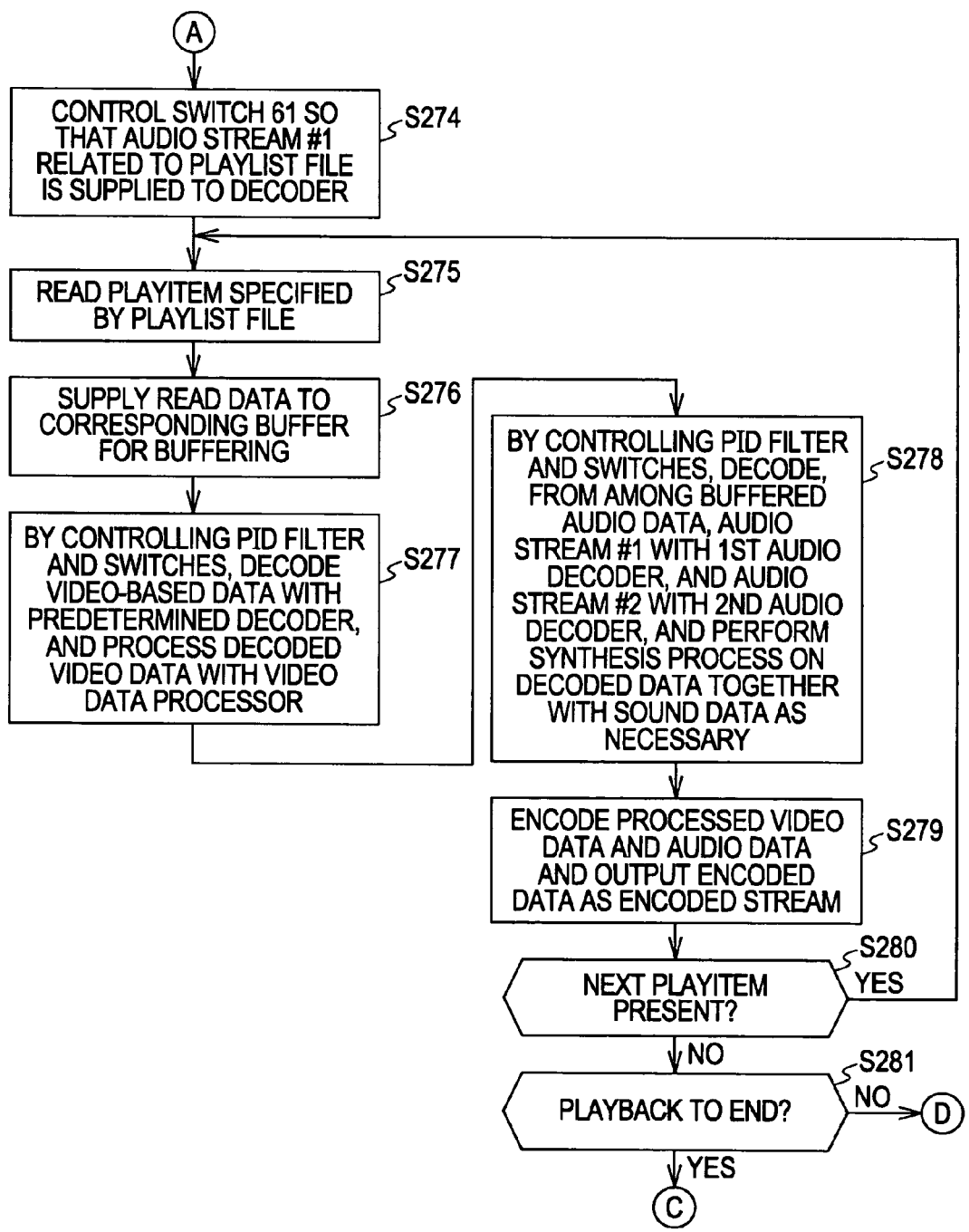
FIG. 43 is a flowchart illustrating a playback process 5.
Figure 43C:
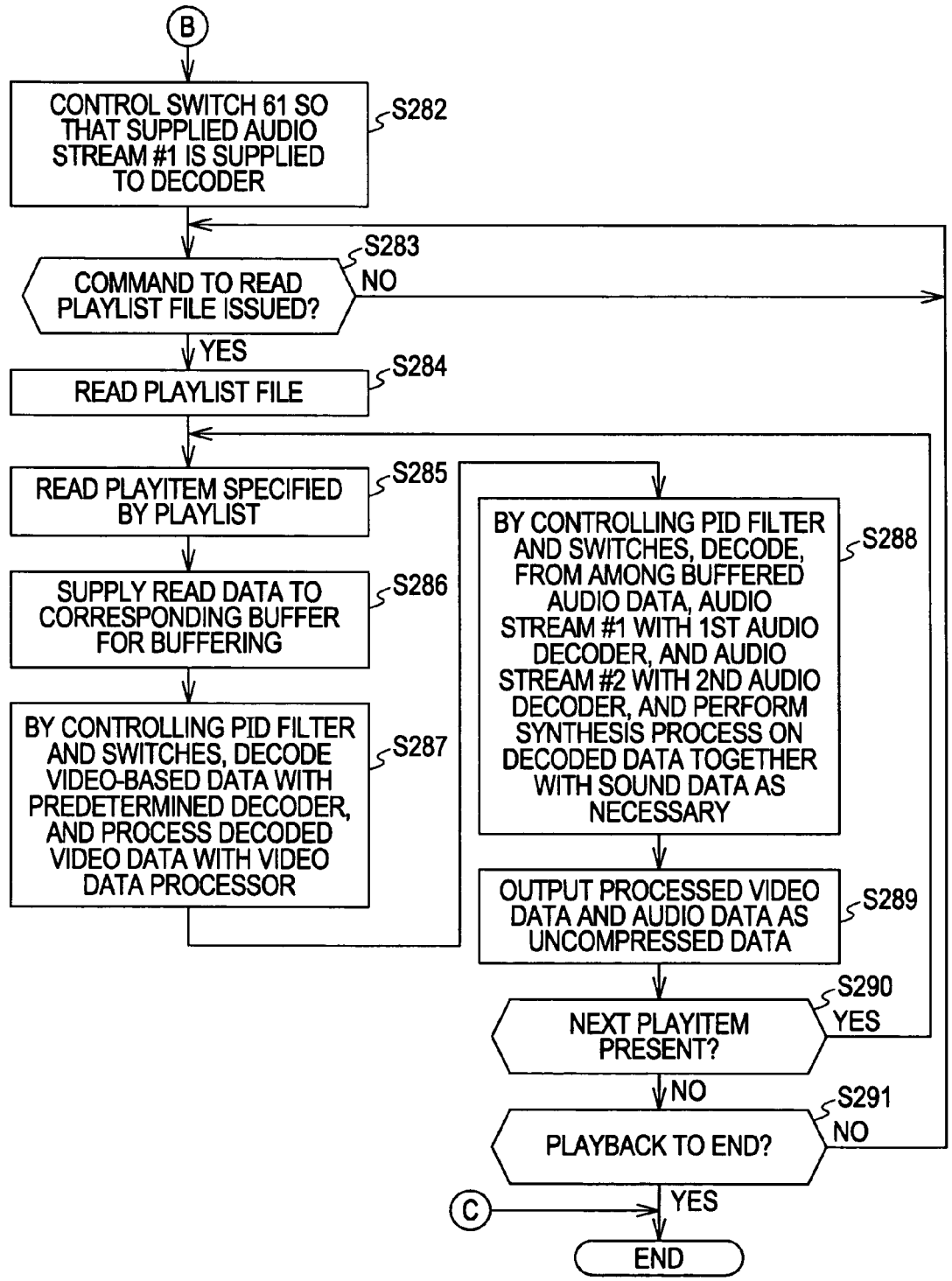
Figure 44B:
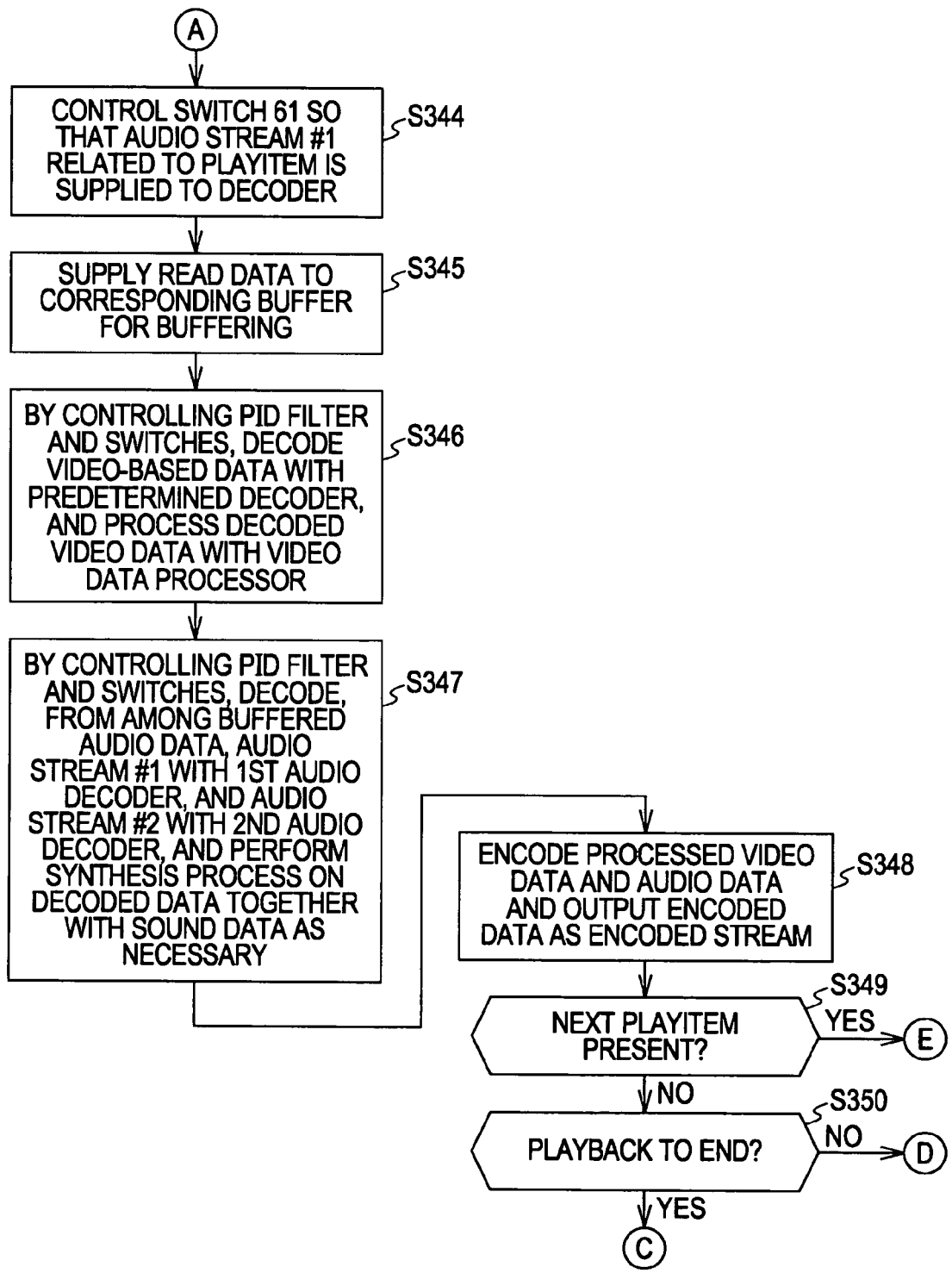
FIG. 44 is a flowchart illustrating a playback process 6.
Figure 44C:
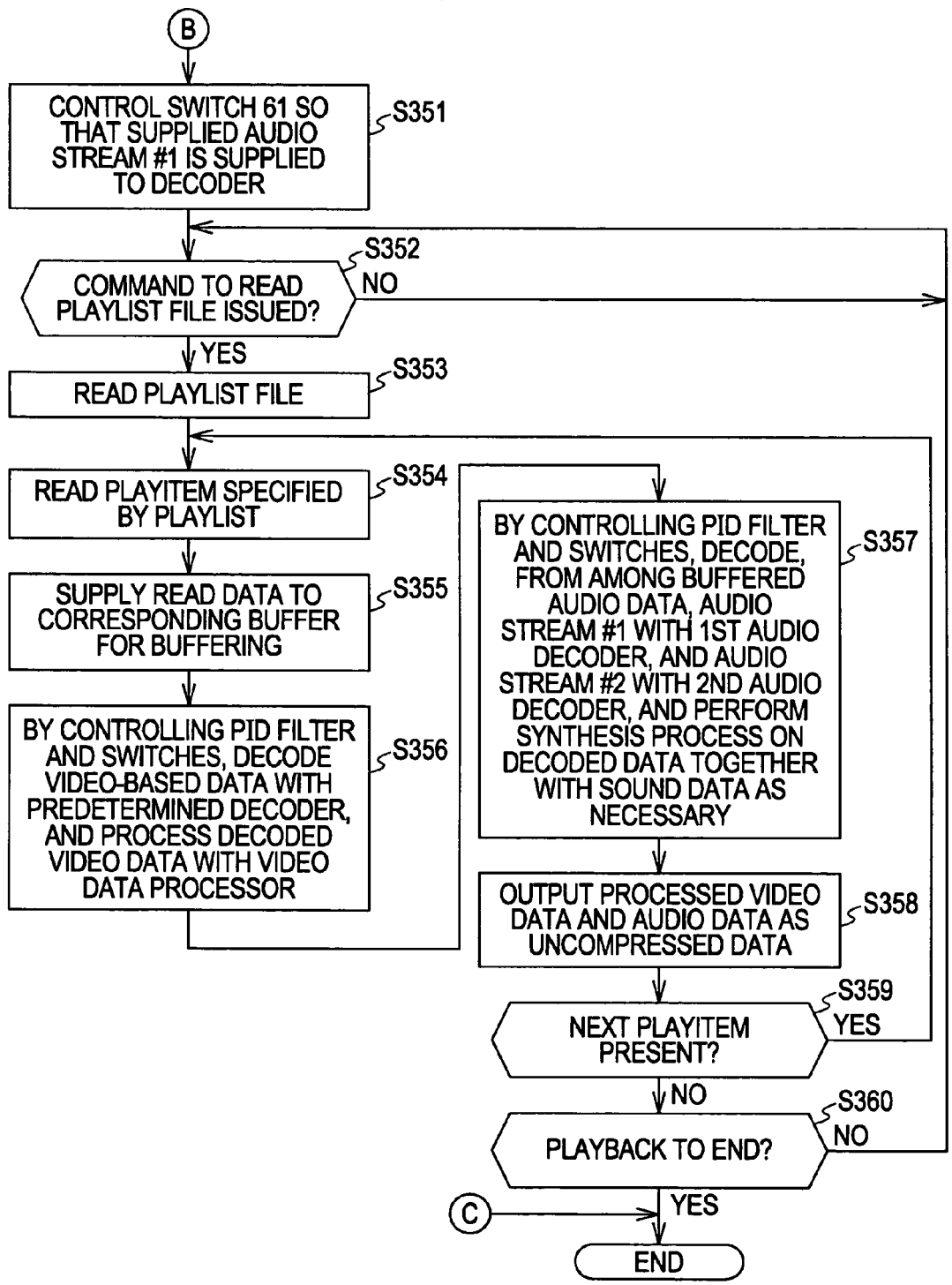

A reproducing method of a reproducing apparatus for reproducing data and outputting the reproduced data, and a program for reproducing data, and a program stored on a program storage medium of embodiments of the present invention includes steps of acquiring (for example, one of step S2 of FIG. 38, step S64 of FIG. 39, step S135 of FIG. 40, step S202 of FIG. 42, step S264 of FIG. 43, and step S335 of FIG. 44), from playback data containing encoded stream data (for example, audio stream #1 or video stream decoded by video decoder 72 of FIG. 45), determination information (for example, is_MixApp, is_MixApp_1, or is_MixApp_2) indicating whether the playback data contains data to be mixed (for example, one of sound data, sound stream #1, another video stream to be mixed into a video stream decoded by video decoder 72, and video data) to be mixed with the stream data, determining (for example, one of step S3 of FIG. 38, step S65 of FIG. 39, step S136 of FIG. 40, step S203 of FIG. 42, step S265 of FIG. 43, and step S336 of FIG. 44) based on the acquired determination information whether the playback data contains the data to be mixed with the stream data, and outputting (for example, one of step S11 of FIG. 38, step S71 of FIG. 39, step S141 of FIG. 40, step S211 of FIG. 42, step S271 of FIG. 43, and step S341 of FIG. 44) the stream data if the determination information indicates that the playback data does not contain the data to be mixed with the stream data and if the reproduced data output from the reproducing apparatus is encoded data.

A data structure of one embodiment of the present invention to be reproduced by a reproducing apparatus (for example, one of reproducing apparatus 20-1 of FIG. 37, reproducing apparatus 20-2 of FIG. 41, and reproducing apparatus 20-3 of FIG. 45) includes first information (for example, XXXXX.mpls corresponding to PLAYLIST of FIG. 8) for managing a playback order of stream data, wherein the first information contains second information (for example, one of is_MixApp, is_MixApp_1, and is_MixApp_2), different from the stream data and related to the presence or absence of data to be mixed (for example, one of sound data, sound stream #1, another video stream to be mixed with a video stream decoded by video decoder 72, and video data) to be mixed with the stream data.

Data recorded on a recording medium is reproduced on a reproducing apparatus (for example, one of reproducing apparatus 20-1 of FIG. 37, reproducing apparatus 20-2 of FIG. 41, and reproducing apparatus 20-3 of FIG. 45) and includes first information (for example, PlayList) for managing a playback order of stream data, wherein the first information contains second information (for example, one of is_MixApp, is_MixApp_1, and is_MixApp_2), different from the stream data and related to the presence or absence of data to be mixed with the stream data (for example, one of sound data, sound stream #1, another video stream to be mixed with a video stream decoded by video decoder 72, and video data).

Figure 48:
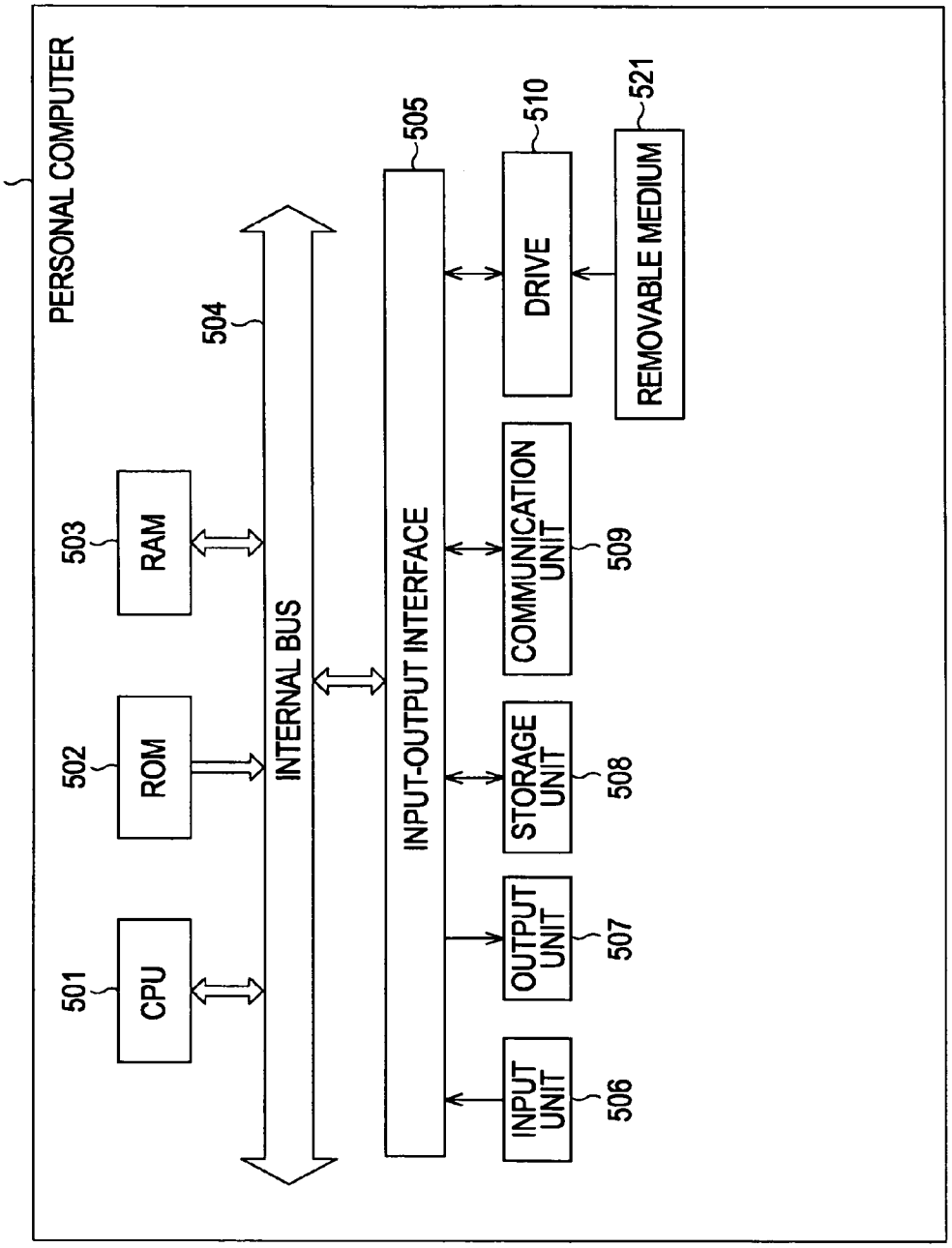
FIG. 48 illustrates the structure of a personal computer.

A recording device of one embodiment of the present invention includes an acquisition unit (for example, one of CPU 501, communication unit 509 and drive 510 of FIG. 48) for acquiring data having a data structure including first information (for example, PlayList) for managing a playback order of stream data, the first information containing second information (for example, one of is_MixApp, is_MixApp_1, and is_MixApp_2), different from the stream data and related to the presence or absence of data to be mixed (for example, one of sound data, sound stream #1, another video stream to be mixed into a video stream decoded by video decoder 72, and video data) to be mixed with the stream data, and a recording unit (for example, drive 510 of FIG. 48) for recording, onto the recording medium, the data acquired by the acquisition unit.

A method of one embodiment of the present invention for manufacturing a recording medium recording data replayable on a reproducing apparatus (for example, one of reproducing apparatus 20-1 of FIG. 37, reproducing apparatus 20-2 of FIG. 41, and reproducing apparatus 20-3 of FIG. 45), includes steps of generating data having a data structure including first information (for example, PlayList) for managing a playback order of stream data, the first information containing second information (for example, one of is_MixApp, is_MixApp_1, and is_MixApp_2), different from the stream data and related to the presence or absence of data to be mixed (for example, one of sound data, sound stream #1, another video stream to be mixed into a video stream decoded by video decoder 72, and video data) to be mixed with the stream data, and recording the generated data onto the recording medium.

The embodiments of the present invention are described below with reference to the drawings.

A reproducing apparatus 20 of one embodiment of the present invention is described below with reference to FIG. 2.

The reproducing apparatus 20 can reproduce information recorded on a recording medium 21 such as an optical disk, information supplied via a network 22, or information recorded on a recording medium thereof (such as a hard disk). The reproducing apparatus 20 supplies reproduced data to a display/audio output device 23 connected in a wired or wireless fashion in order to display an image and output a sound on the display/audio output device 23. The reproducing apparatus 20 also can transmit the reproduced data to another apparatus via the network 22. The reproducing apparatus 20 can receive an operation input from a user via an input device such as buttons provided on own apparatus or a remote commander 24.

Data containing video and audio, replayable on the reproducing apparatus 20, is recorded on the recording medium 21. The recording medium 21 may be an optical disk. The recording medium 21 may also be one of a magnetic disk and a semiconductor memory.

If the display/audio output device 23 is designed to receive uncompressed digital data, the reproducing apparatus decodes encoded data recorded on the recording medium 21, and supplies uncompressed data to the display/audio output device 23. If the display/audio output device 23 has a decoding function to receive compressed data, the reproducing apparatus 20 supplies the compressed data to the display/audio output device 23. If the display/audio output device 23 is designed to receive uncompressed analog data, the reproducing apparatus 20 decodes encoded data recorded on the recording medium 21, generates an analog signal by D/A converting the uncompressed data, and supplies the analog signal to the display/audio output device 23. Furthermore, the reproducing apparatus 20 reproduces data recorded on the recording medium 21, and transmits data in a compressed state to the network 22.

Figure 2:
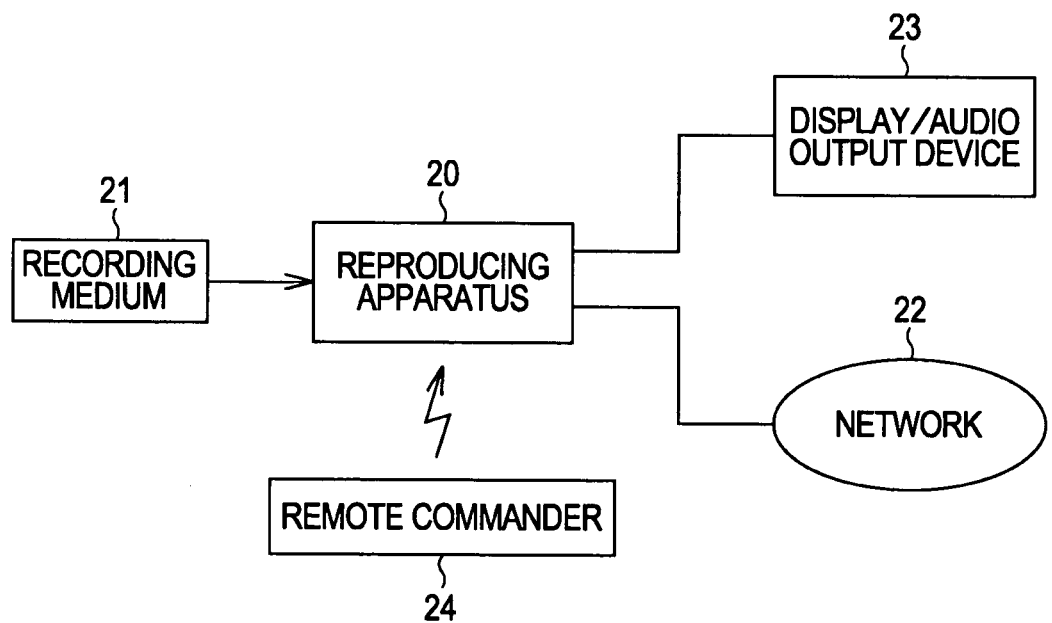
FIG. 2 illustrates a reproducing apparatus of one embodiment of the present invention.
Figure 3:
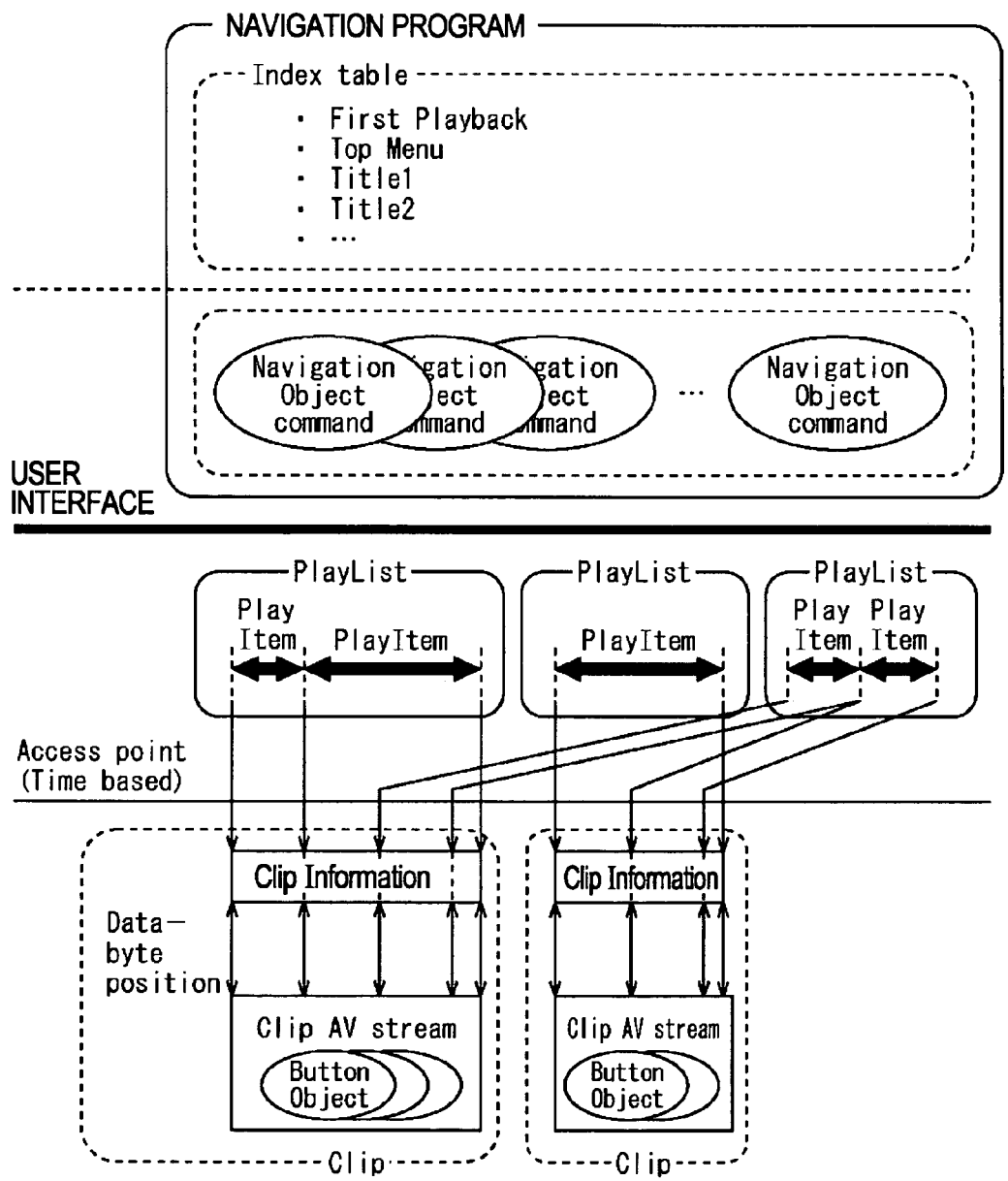
FIG. 3 illustrates an application format of a recording medium loaded on the reproducing apparatus of one embodiment of the present invention.

FIG. 3 illustrates an application format of information replayable on the reproducing apparatus 20 of FIG. 2, namely, data recorded on the recording medium 21 loaded on the reproducing apparatus 20, data supplied via the network 22, or data recorded on a recording medium in the reproducing apparatus 20.

The application format includes two layers of PlayList and clip for managing audio visual (AV) streams. An AV stream and clip information incidental to the AV stream in pairs are considered as a single object, and referred to as a clip. The AV stream is also referred to as an AV stream file. The clip information is also referred to as a clip information file.

Files used in computers are typically handled as byte strings. A content of AV stream file is expanded along time axis, and an access point of the clip is specified by timestamp of PlayList. More specifically, the PlayList and Clip are layers for managing AV streams.

If PlayList specifies an access point in the Clip using timestamp, a Clip Information file is used to find, according to timestamp, address information where to start decoding in the AV stream file.

The PlayList is a set of playback periods of AV streams. One playback period in a given AV stream is referred to PlayItem. The PlayItem is represented by a pair of IN point (playback start point) of the playback period and OUT point (playback end point) of the playback period along time axis. The PlayList is thus composed at least one PlayItem as shown in FIG. 3.

Referring to FIG. 3, the first PlayList from the left includes two PlayItems, and a first half portion and a second half portion of the AV stream contained in the left Clip are referenced by the two PlayItems. The second PlayList from the left is composed a single PlayItem, and the entire AV stream contained in the Clip on the right of the left Clip is referenced by that PlayItem. The third PlayList is composed of two PlayItems, and a given portion of the AV stream contained in the left Clip and a given portion of the AV stream contained in the right Clip are respectively referenced by the two PlayItems.

A navigation program has a function of controlling a playback order of the PlayItems and interactive playback of the PlayList. Furthermore, the navigation program also has a function of displaying a menu screen on which a user gives instructions to perform a variety of playback operations. For example, the navigation program is described in programming language such as Java (Registered Trademark).

The navigation program of FIG. 3 would specify the left PlayItem contained in the first PlayList from the left as information indicating a playback position. The first half of the AV stream contained in the left Clip referenced by the PlayItem is reproduced. In this way, the PlayList is used as playback management information for managing the playback of the AV stream file.

The navigation program is composed an index table and a navigation object read from the index table. The index table and the navigation object are described below with reference to FIG. 4.

Figure 4:
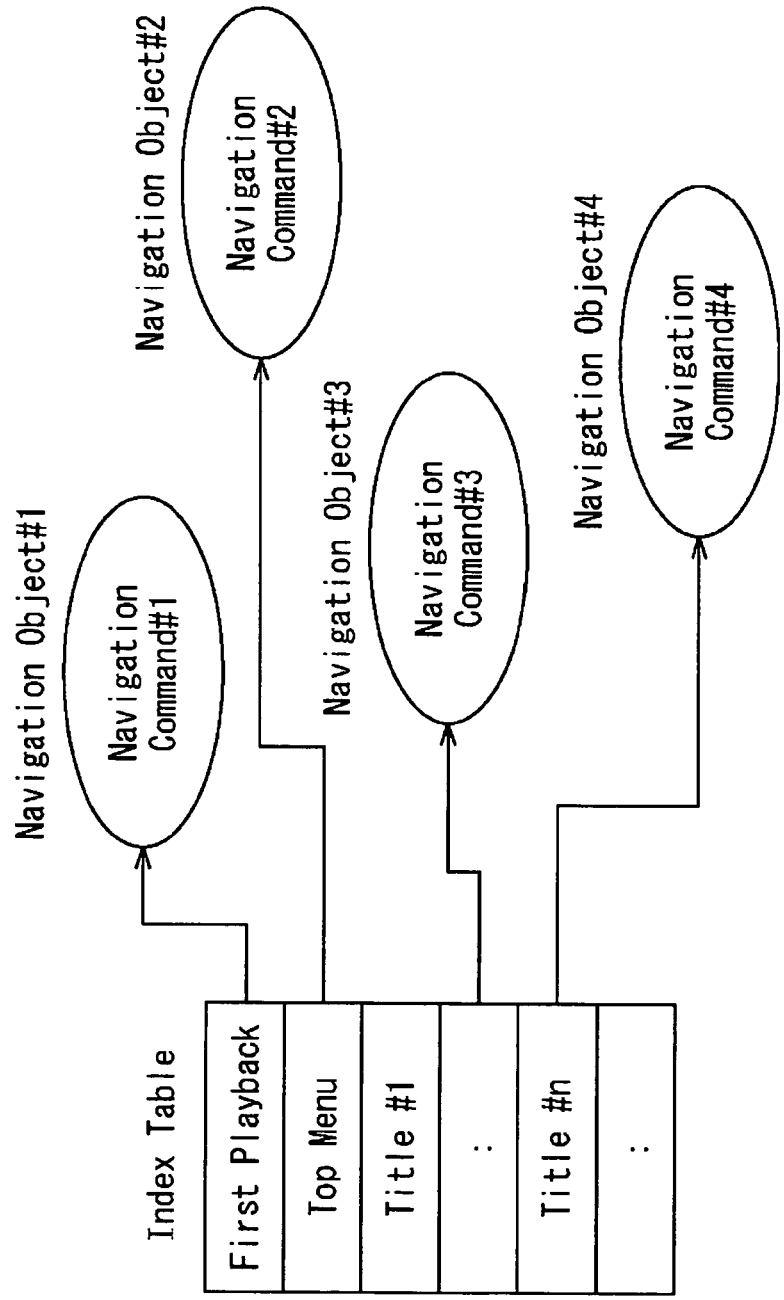
FIG. 4 illustrates an index table and a navigation object.

The index table defines a title of a content and a menu, and stores each title and an entry point of each menu. FirstPlayback contains information relating to NavigationObject that is automatically first executed in response to the reading of the index table when the recording medium 21 storing the data is loaded onto the reproducing apparatus 20. TopMenu contains information relating to NavigationObject of TopMenu that is called when a playback menu screen is displayed. The playback menu screen shows items for a user to reproduce all contents, to reproduce only a particular chapter, to repeat playback of a particular chapter, and to display an initial menu. Each Title contains information relating to NavigationObject that can be assigned to each title identified by a respective Title ID and can be called. As shown in FIG. 4, one Navigation Command is present for one Title.

The navigation object is composed an executable navigation command. Navigation command includes a variety of commands for playback of PlayList, calling another navigation object, and the like. For example, navigation command #3 would contain a command statement for reproducing PlayList #1. If navigation command #3 is executed, PlayList #1 will be reproduced.

An index file as a data file containing an index table will be described later with reference to FIGS. 9 through 11.

In this embodiment, a playback path composed of a series of at least one PlayItem (consecutive PlayItems) in the PlayList is referred to as a main path, and a playback path composed of at least one sub path (containing consecutive or non-consecutive SubPlayItems) and arranged in parallel with the main path in the PlayList is referred to as a sub path. The application format of data replayable on the reproducing apparatus 20 contains in PlayList a sub path associated with PlayList and reproduced in association with the main path.

Figure 5:
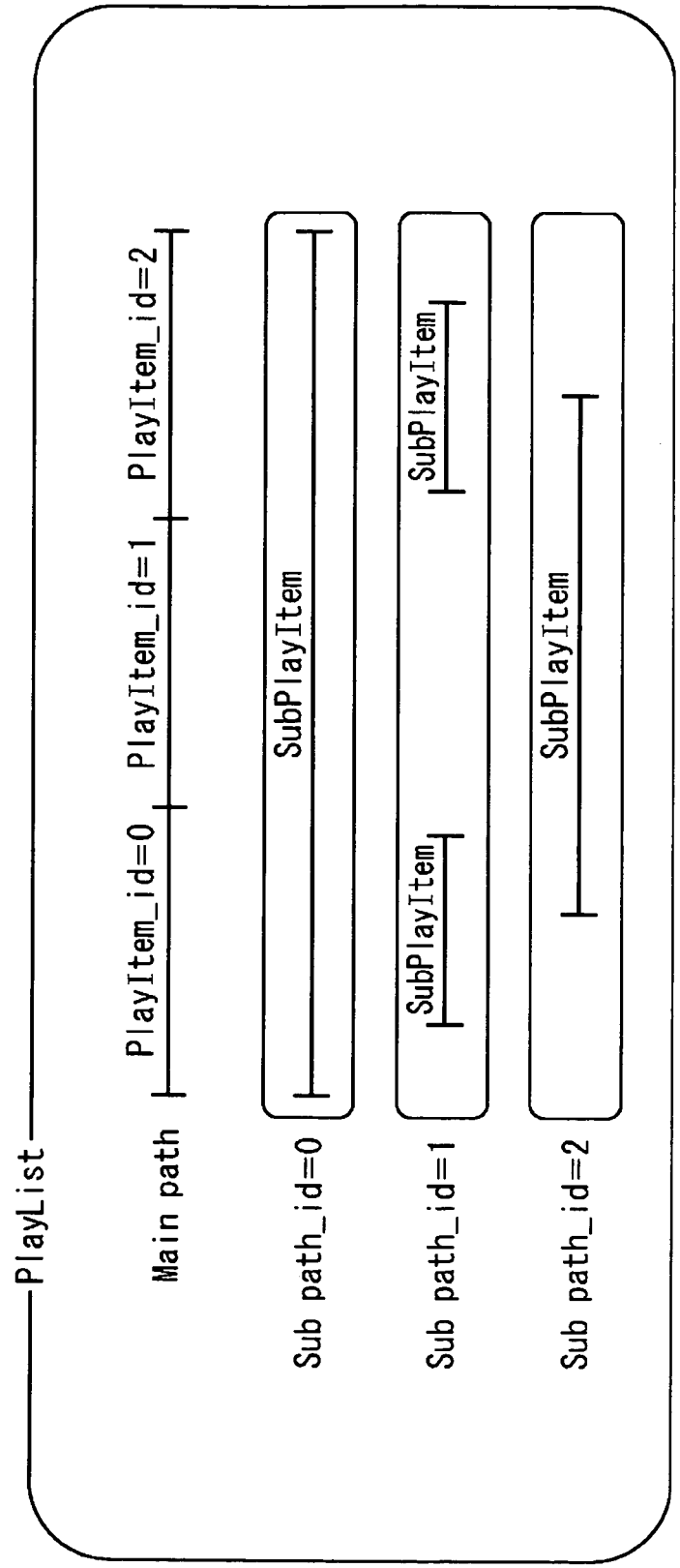
FIG. 5 illustrates the structure of main path and sub path.

FIG. 5 illustrates the structure of a main path and sub paths. PlayList may contain one main path and at least one sub path. One main path is composed of a series of at least one PlayItem, and one sub path is composed of a series of at least on SubPlayItem.

Referring to FIG. 5, the PlayList includes one main path composed of a series of three PlayItems, and three sub paths. More specifically, the main path is composed of PlayItem_id=0, PlayItem_id=1, and PlayItem_id=2. The sub paths are is tagged with IDs Subpath_id=0, Subpath_id=1, and Subpath_id=2 in order from the top. The sub path of Subpath_id=0 contains a singe SubPlayItem, the sub path of Subpath_id=1 contains two SubPlayItems, and the sub path of Subpath_id=2 contains a single SubPlayItem.

A stream referenced by the SubPlayItem contained in the sub path of Subpath_id=0 may be dubbed-in Japanese voice of a movie, for example, and is reproduced instead of an audio stream of a AV stream file referenced by Mainpath. A stream referenced by SubPlayItem contained in the sub path of Subpath_id=1 may be a director's cut of a movie, and a comment of a movie director is contained in a predetermined portion of the AV stream file referenced by the main path.

A Clip AV stream file referenced by a single PlayItem contains at least video stream data (main movie data). The Clip AV stream file may or may not include one or more audio streams that are reproduced at the same timing as (in synchronization with) a video stream (main video data) contained in the Clip AV stream file. The Clip AV stream file may or may not include one or more bit-map caption stream that are reproduced at the same timing as the video stream contained in the Clip AV stream file. The Clip AV stream file may or may not include one or more interactive graphics streams that are reproduced at the same timing as the video stream contained in the Clip AV stream file. The video stream in the Clip AV stream file is multiplexed with one of the audio stream, the bit-map caption stream, and the interactive graphics stream, each being reproduced at the same timing as the video stream. In the Clip AV stream file referenced by one PlayItem, the video stream data is multiplexed with zero or more audio streams, zero or more bit-map caption streams, or zero or more interactive graphics streams, each being reproduced in synchronization with the video stream.

The Clip AV stream file referenced by one PlayItem includes a plurality of types of streams including the video stream, the audio stream, the bit-map caption stream file, and the interactive graphics stream.

One SubPlayItem can reference a audio stream data or caption data of a stream different from the Clip AV stream file referenced by PlayItem.

If PlayList having only the main path is reproduced, the user can select audio or caption in audio switching operation or caption switching operation from only audios and captions in audio streams and sub-picture streams multiplexed with the clip referenced by the main path. In contrast, if the PlayList having the main path and sub paths is reproduced, the user can reference an audio stream and a sub-picture stream in the Clip referenced by the SubPlayItem in addition the audio stream and the sub-picture stream multiplexed with the Clip AV stream file referenced by the main path.

Since a plurality of SubPaths are contained in a single PlayList with each SubPath allowed to reference a SubPlayItem, the AV stream having high degree of expendability and flexibility results. More specifically, SubPlayItem is subsequently added in addition to the Clip AV stream file referenced by the MainPath.

Figure 6:
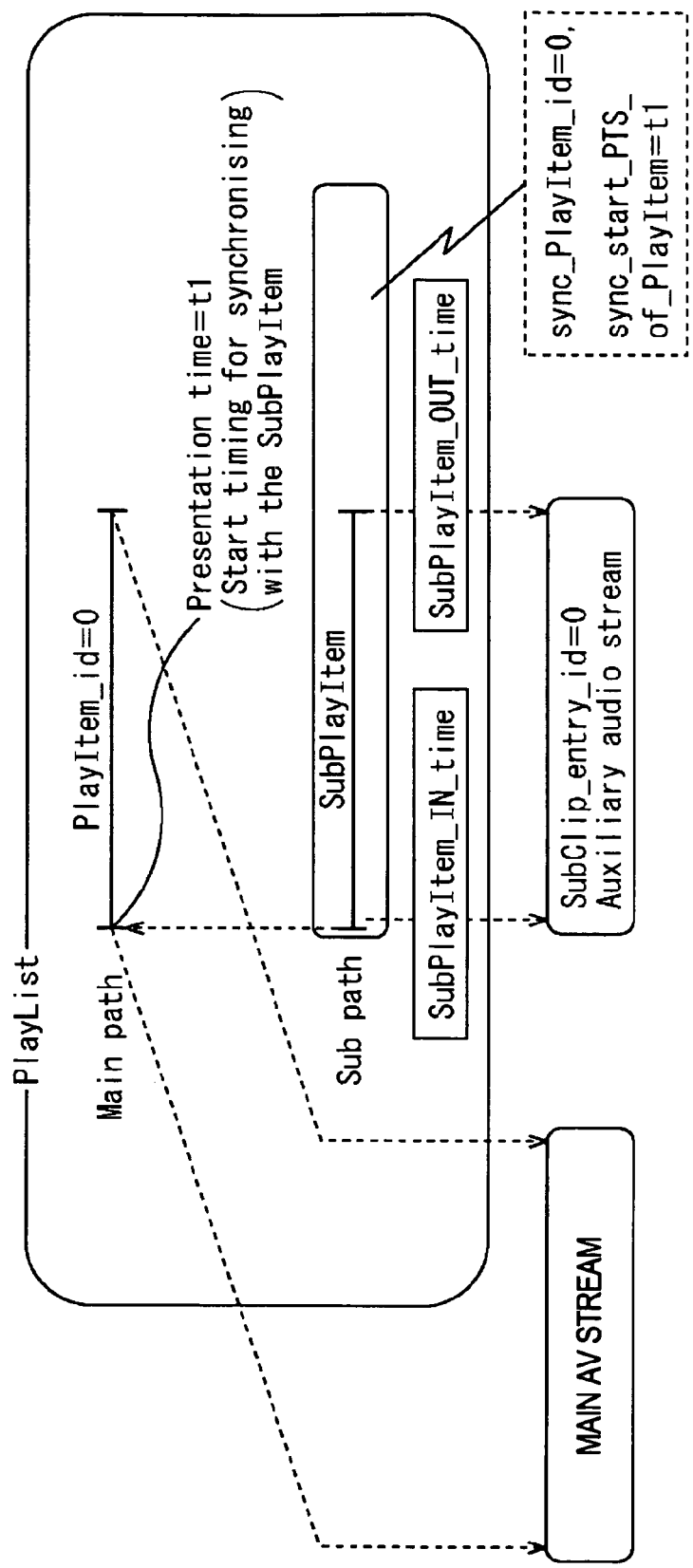
FIG. 6 illustrates an example of main path and sub path.

FIG. 6 illustrates a main path and a sub path. As shown in FIG. 6, a playback path of audio reproduced at the same timing as the main path (in synchronization with AV stream) is represented using a sub path.

The PlayList of FIG. 6 contains a single PlayItem of PlayItem_id=0 as the main path and a single SubPlayItem as the sub path. A single PlayItem ( ) block of PlayItem_id=0 in the main path references a main AV stream of FIG. 6. The SubPlayItem ( ) block contains the following data. The SubPlayItem ( ) contains Clip_Information_file_name specifying the Clip referenced by the sub path in the PlayList. As shown in FIG. 6, an auxiliary audio stream of SubClip_entry_id=0 is referenced by SubPlayItem. The SubPlayItem ( ) contains SubPlayItem_IN_time and SubPlayItem_OUT_time specifying a playback period of the sub path in the stream contained the specified clip (the auxiliary audio stream herein). The SubPlayItem ( ) further contains sync_PlayItem_id and sync_start_PTS_of_PlayItem specifying playback start time at which the sub path starts playback along time axis of the main path. As shown in FIG. 6, sync_PlayItem_id=0 and sync_start_PTS_of_PlayItem=t1. In this way, time t1 at which the sub path starts playback is specified along time axis of PlayItem_id=0 in the main path. More specifically, the playback start time t1 of the main path and the playback start time t1 of the sub path are at the same time.

The audio Clip AV stream file referenced by the sub path should not contain STC discontinuity point (discontinuity point in system timebase). Audio sampling clock of a stream contained in the clip used in the sub path is locked with audio sampling clock of a stream contained in the clip used in the main path.

In other words, the SubPlayItem ( ) contains information specifying the clip referenced by the sub path, information specifying playback period of the sub path, and information specifying time at which the sub path starts playback along the time axis of the main path. Since the Clip AV stream file used in the sub path does not have STC, an audio stream of the Clip AV stream file different from the Clip AV stream file referenced by the main path (main AV stream) is referenced and reproduced based on the information contained in the SubPlayItem ( ) (namely, the information specifying the clip referenced by the sub path, the information specifying playback period of the sub path, and the information specifying time at which the sub path starts playback along the time axis of the main path).

Each of the PlayItem and the SubPlayItem manages the Clip AV stream file, and the Clip AV stream file managed by the PlayItem (main AV stream) and the Clip AV stream file managed by the SubPlayItem are two different files.

In the same manner as shown in FIG. 6, a caption stream playback path reproduced at the same timing as the main path is used as a sub path.

Figure 7:
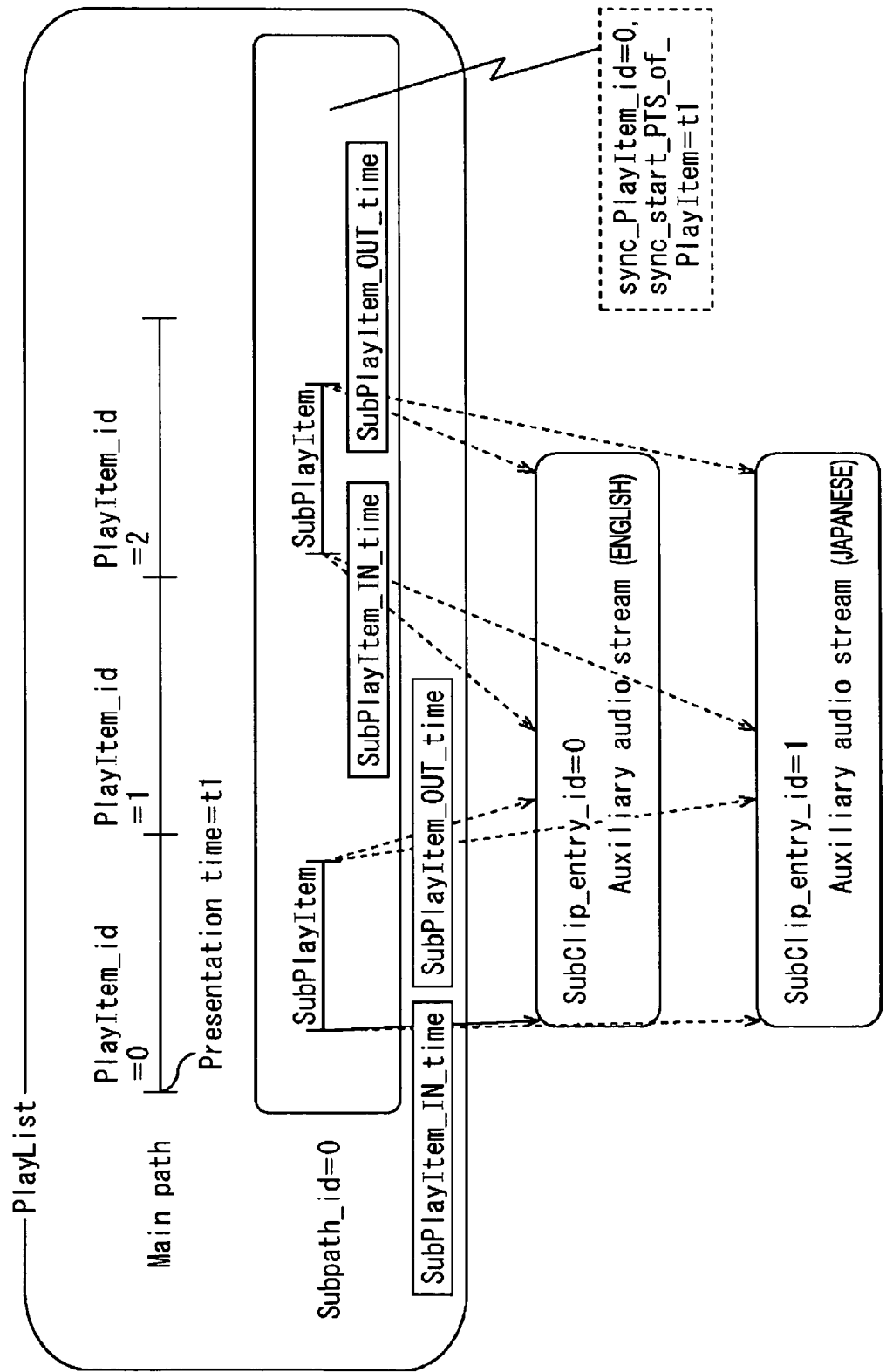
FIG. 7 illustrates another example of main path and sub path.

FIG. 7 illustrates another example of main path and sub path. As shown in FIG. 7, a playback path of audio reproduced at the same timing as (in AV synchronization with) the main path is represented using the sub path. The Clip AV stream file referenced by the PlayItem of the main path is identical to that of FIG. 6, and the discussion thereof is omitted herein.

A Clip AV stream file referenced by the main path may be a single movie content (AV content), and an auxiliary audio stream referenced by an audio path of the sub path may be a comment of a movie director concerning a movie. The audio stream of the Clip AV stream file referenced by the main path may be mixed with (superimposed on) the auxiliary audio stream referenced by the audio path of the sub path during playback. The example of FIG. 7 is applicable to such an arrangement. For example, a user inputs to the reproducing apparatus (player) a command to listen to the comment of the director concerning the movie while viewing the movie. An audio of the Clip AV stream file referenced by the main path and the auxiliary audio stream referenced by the audio path as the sub path are mixed during playback. The example of FIG. 7 is applicable to such an case.

As shown in FIG. 7, three PlayItems, PlayItem_id=0, 1, and 2 are arranged in the main path while two SubPlayItems are arranged in the sub path (Subpath_id=0). The SubPlayItem (discussed later with reference to FIG. 21) called by the sub path of Subpath_id=0 (discussed later with reference to FIG. 19) contains SubPlayItem_IN_time and SubPlayItem_OUT_time for specifying the playback period of the sub path of the auxiliary audio stream (a clip of an English auxiliary audio stream of SubClip_entry_id=0 and a clip of Japanese auxiliary audio stream of SubClip_entry_id=1).

In comparison of FIG. 7 with FIG. 6, the auxiliary audio streams (English and Japanese audio streams) of SubClip_entry_id=0 and 1 are referenced by the SubPlayItem. More specifically, a plurality of audio stream files are referenced using the SubPlayItem. When the SubPlayItem is reproduced, one audio stream file is selected from among the plurality of audio stream files during playback. As shown in FIG. 7, one audio stream file is selected from among the English audio stream file and the Japanese audio stream file. More specifically, one is selected from the SubClip_entry_id=0 and 1 (in response to an instruction from a user), and the auxiliary audio stream indicated by that ID is reproduced. In addition, if playback using mixing of the audio streams referenced by the main path is selected (if two audio streams are selected as audio streams to be reproduced), an audio stream file referenced by the main path and an audio stream file referenced by the audio path as the sub path are mixed during playback.

Figure 8:
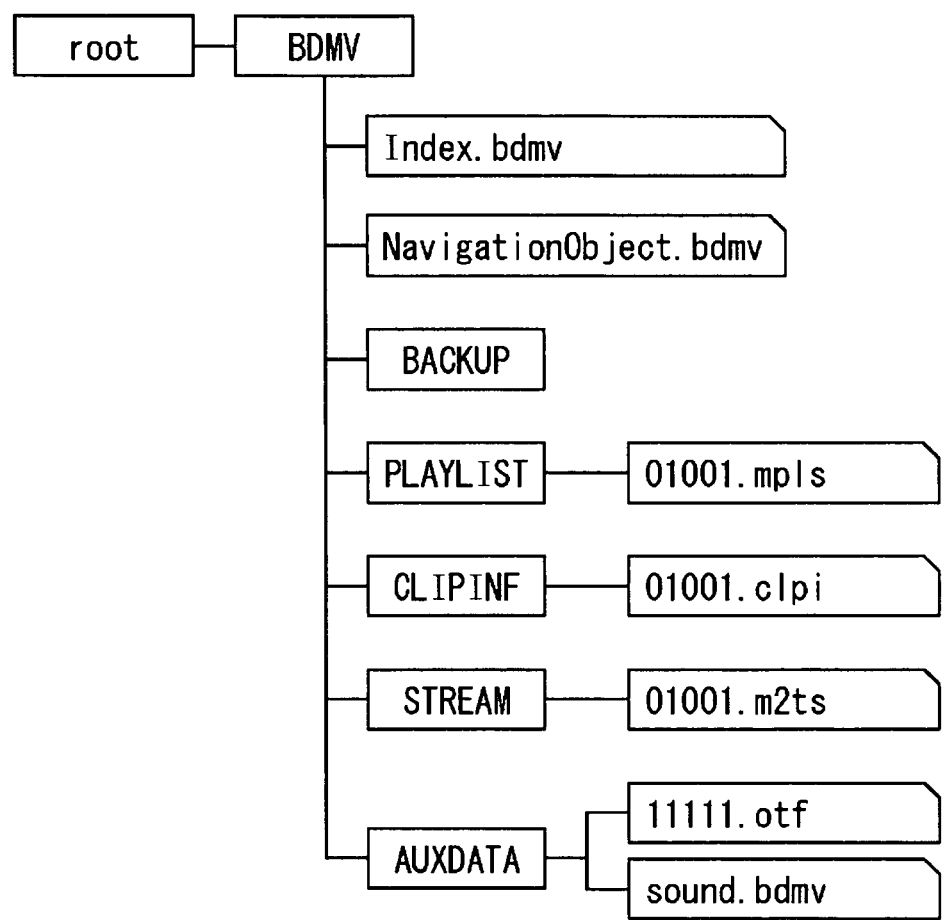
FIG. 8 illustrates a data structure of data replayable on the reproducing apparatus.

FIG. 8 illustrates a file system of data files replayable on the reproducing apparatus 20. As shown in FIG. 8, a data file replayable on the reproducing apparatus 20 is supplied in the recording medium 21 such as an optical disk, and the file system has a directory structure.

In the file system, a directory named "BDMV" is arranged under the "root" directory. A file named "Index.bdmv", and a file named "NavigationObject.bdmv" are arranged under the "BDMV" directory, and hereinafter referred to as an Index file and a NavigationObject file, respectively. Hereinafter, as appropriate, each file is referred to as a "file name" followed by the word "file", and each directory is referred to as a "directory name" followed by the word "directory."

The Index file contains the above-mentioned index table, and information relating to a menu reproducing a data file replayable on the reproducing apparatus 20. For example, based on the Index file, the reproducing apparatus 20 causes a display device to display a menu screen having items to reproduce all contents contained in a data file replayable on the reproducing apparatus 20, to reproduce only a particular chapter, to repeat playback of the particular chapter, and to display an initial menu. NavigationObject to be executed when one item is selected is set in the index table in the Index file. When the user selects one item from the playback menu screen, the reproducing apparatus 20 executes a command described in the NavigationObject set in the index table of the Index file.

The NavigationObject file contains NavigationObject. The NavigationObject contains a command controlling playback of the PlayList contained in the data file replayable on the reproducing apparatus 20. For example, the reproducing apparatus 20 selects and executes one of the NavigationObjects contained in the file system, thereby reproducing the content.

Arranged under the BDMV directory are a directory named "BACKUP" (BACKUP directory), a directory named "PLAYLIST" (PLAYLIST directory), a directory named "CLIPINF" (CLIPINF directory), a directory named "STREAM" (STREAM directory), and a directory named "AUXDATA" (AUXDATA directory).

The BACKUP directory contains files and data for backing up files and data replayable on the reproducing apparatus 20.

The PLAYLIST directory contains PlayList files. Each PlayList file has a name composed of a five-digit file name followed by an extension ".mpls" as shown in FIG. 8.

The CLIPINF directory contains clip information files. Each clip information file has a name composed of five-digit file name followed by an extension ".clpi" as shown in FIG. 8.

The STREAM directory contains Clip AV stream files and sub stream files. Each stream file has a name composed of a five-digit file name followed by an extension ".m2ts" as shown in FIG. 8.

The AUXDATA directory contains neither Clip AV stream files nor sub stream files, but contains files of data referenced by the Clip AV stream file and the sub stream file, and files of data used separate from the Clip AV stream files and the sub stream files. As shown in FIG. 8, the AUXDATA directory contains a file of caption font named "11111.otf" and sound data such as effect sound named "sound.bdmv."

When the data file replayable on the reproducing apparatus 20 is distributed in an optical disk, identifiers author_id and disc_id are recorded on the optical disk in the form of secure electronic data that cannot be altered by the user, or in the form of physical pits. The identifier author_id is assigned to each tile author to identify the title author such as a content manufacturer, such as a production company or a film distributing company, or a supplier of the optical disk as a recording medium. The identifier disc_id is assigned to identify the type of the optical disk manufactured at the title author identified by author_id.

The data file replayable on the reproducing apparatus 20 may be recorded on a removable recording medium other than the optical disk, or may be downloaded via a network. In such a case, identities corresponding to author_id and disc_id are assigned for identification in the same directory structure as the one of FIG. 8. Even if the data file replayable on the reproducing apparatus 20 is not assigned identities corresponding to author_id and disc_id, a file named "Index.bdmv" and a file named "Navigationobject.bdmv" are contained in the same way as in the directory structure of FIG. 8. Furthermore, any appropriate file group from among the file group named "BACKUP", the file group named "PLAYLIST", the file group named "CLIPINF", the file group named "STREAM", and the file group named "AUXDATA" may be contained in the directory structure.

The reproducing apparatus 20 may output audio data in the form of uncompressed data or audio data in the form of encoded (compressed) data. The reproducing apparatus 20 can mix audio data to sound data as main playback output data, as necessary. Furthermore, the reproducing apparatus 20 can mix not only sound effect but also a supplementary sound (auxiliary sound) to main playback output audio data. In other words, whether the reproducing apparatus 20 is to mix the audio data is determined based on whether audio data to be mixed through the function of the reproducing apparatus 20 is contained or not.

The main playback output audio data is hereinafter referred to as an audio stream #1. Audio data described as sound.bdmv in the AUXDATA directory is referred to as sound data. For example, the sound data contains a click sound generated when the user enters an operation input, and sound effects. The sound data can be mixed with the audio stream #1. Streams including the supplementary sound, different from and to be mixed with the audio stream #1, are referred to as an audio stream #2. A plurality of streams of audio data other the audio stream #2, different from and to be mixed with the audio stream #1, can be acceptable. These files may be referred to as an audio stream #3, an audio stream #4, and so on.

Mixing with the audio stream #2 and the sound data may be performed with the audio stream #1 output in the form of compressed (encoded) data. The audio stream #1 is decoded, mixed, and then re-encoded. Audio mixing with the audio stream #2 and the sound data may not be performed with the audio stream #1 output in the form of compressed (encoded) data. In such a case, the audio stream #1 is free from sound quality degradation if the audio stream #1 is output without being decoded.

In order to determine whether to perform the decode process on the audio stream #1, the reproducing apparatus 20 then needs to recognize the output form of the audio stream #1 and the type of the audio data contained in the data file (namely, indicating whether another audio data to be mixed with the audio stream #1 is contained or not). The data file replayable on the reproducing apparatus 20 includes at predetermined locations thereof a flag indicating whether the sound data is contained, and a flag indicating whether the audio stream #2 is contained.

The location where the flag indicating whether the other audio data to be mixed with the audio stream #1 is contained is the Index file, the PlayList file, and the PlayItem file. If these flags are placed in the Index file, whether the other audio data to be mixed with the audio stream #1 is contained or not is defined during playback of all data contained in the data structure of FIG. 8. If these flags are described in the PlayList, whether the other audio data to be mixed with the audio stream #1 contained in the data reproduced based on the corresponding PlayList is contained or not is defined. If these flags are described in the PlayItem, whether the other audio data to be mixed with the audio stream #1 is contained in the clip corresponding to the PlayItem is defined.

FIG. 9 illustrates a syntax of the Index file (Index.bdmv).

A type_indicator field contains a value of "INDEX" encoded in accordance with ISO 646 Standard.

A version_number field indicates a four-letter character string indicating the version number of Index.bdmv, and contains the value "0089" encoded in accordance with ISO 646 Standard.

An Indexes_start_address field contains a start address of an Indexes ( ) block.

An AppIfoBDMV ( ) block contains an identifier indicating a supplier of a data file containing the Index file.

An Indexes ( ) block contains a description of a link to an application (NavigationObject) that performs a menu reading operation, a title searching operation, a jumping operation to a predetermined title, or an automatic start operation when the recording medium 21, such as an optical disk, recording a data file containing the Index file is loaded onto the reproducing apparatus 20. The syntax of Indexes ( ) is described later with reference to FIGS. 10 through 12.

A Padding_word field contains zero or a positive integer inserted in accordance with the syntax of the Index.bdmv.

FIG. 10 illustrates a first example of syntax of Indexes ( ) in which a flag indicating the presence of the other audio data to be mixed with the audio stream #1 in the data referenced by Indexes ( ) is not written in Indexes ( ).

A length field represents the number of bytes of information written in Indexes ( ).

A FirstPlayback block is a data block containing information about NavigationObject that is executed first when data of this file system is reproduced. More specifically, this data block contains information about the NavigationObject that is automatically first executed when the recording medium 21, such as an optical disk, recording the data of this file system is loaded onto the reproducing apparatus 20.

A FirstPlayback_mobj_id_ref field specifies a value of mobj_id of the NavigationObject that is executed first. The mobj_id is an identity uniquely identifying the Navigation-Object. If the NavigationObject that is automatically executed at the start of playback is not set, in other words, if the application is not executed at the start of playback, but is executed in response to a command from a user, this field contains "0Xffff."

TopMenu is a data block containing information about the NavigationObject of the TopMenu called when the user causes a menu screen to be displayed.

A TopMenu_mobj_id_ref field specifies a value of mobj_id of the NavigationObject of the TopMenu. If no TopMenu is set, this field contains "0xFFFF."

A number_of_Titles field indicates the number of titles written in Indexes ( ).

Title[title_id]( ) is a block containing information relating to each title uniquely identified by title_id. The title_id is assigned numbers starting with zero.

A Title_playback_type[title_id] field indicates a playback type of a title identified by that title_id. For example, the playback types may include Movie Title that is a typical content of moving picture and audio to be reproduced, and Interactive Title that is a content that is permitted to be interactively modified in response to an operation input from the user. If the title is a Movie Title, playback process is performed based on PlayList.

A Title_access_type[title_id] field contains information indicating whether a title identified by that title_id is permitted to be reproduced using Title_Search.

A reserved_for_future_use field is a 29-bit field not yet filled with a description of data and available for future expansion.

A Title_mobj_id_ref[title_id] field specifies a value of mobj_id of the NavigationObject in which a title specified by that title_id has been entered.

FIG. 11 illustrates a second example of syntax of Indexes ( ). As shown in FIG. 11, data referenced by Indexes ( ) permits the sound data only to be mixed (contains no audio stream #2). The Index ( ) contains a flag indicating whether the data referenced by the Indexes ( ) contains the sound data to be mixed with the audio stream #1.

The second example of syntax of Indexes ( ) of FIG. 11 has the same structure as the first example of syntax of Indexes ( ) of FIG. 10 except that a one-bit flag is_MixApp indicating whether the data referenced by Indexes ( ) contains the sound data is newly described and that the reserved_for_future_use field has changed from 29 bits to 28 bits. The flag is_MixApp may be defined as a flag indicating which of the sound data and the audio stream #2 to be mixed with the audio stream #1 is contained in the data referenced by Indexes ( ). By recognizing only one flag, whether to mix the audio data, namely, the necessity of the decode process is quickly determined.

FIG. 12 illustrates a third example of syntax of Indexes ( ). As shown in FIG. 12, Indexes ( ) include two flags, namely, a flag indicating whether the data referenced by Indexes ( ) contains the sound data to be mixed with the audio stream #1 and a flag indicating whether the data referenced by Indexes ( ) contains the audio stream #2 to be mixed with the audio stream #1.

The third example of syntax of Indexes ( ) of FIG. 12 is identical to the first example of syntax of Indexes ( ) of FIG. 10 except that a one-bit flag is_MixApp_1 indicating whether the data referenced by Indexes ( ) contains the audio stream #2 and a one-bit flag is_MixApp_2 indicating whether the data referenced by Indexes ( ) contains the sound data are newly described and that the reserved_for_future_use field has been modified from 29 bits to 27 bits.

A flag indicating whether to perform the mixing process may be defined rather than defining the flag indicating whether the data to be mixed with the audio stream #1 (at least one of the audio stream #2 and the sound data) is contained in the data referenced by Indexes ( ). In this case, the flag to be defined indicates whether the data to be mixed is applicable to the PlayList when playback is performed based on Index and PlayList managing the order of playback.

FIG. 13 illustrates a data structure of a PlayList file. The PlayList file is a data file having an extension ".mpls" and stored in the PLAYLIST directory in the recording medium loaded on the reproducing apparatus 20 or a local storage (such as a hard disk) in the reproducing apparatus 20.

A type_indicator field contains information indicating the type of a file. More specifically, this field contains information indicating that the type of this file is PlayList (MoviePlayList) that is playback management information. The playback management information is used to manage playback of video.

A version_number field contains a four-character version number of xxxx.mpls (MoviePlayList).

A PlayList_start_address field contains a front address of PlayList ( ) represented by unit equal to the number of bytes from the front byte of the PlayList file.

A PlayListMark_start_address field contains a front address of PlayListMark( ) represented by unit equal to the number of bytes from the front byte of the PlayList file.

An ExtensionData_start_address field contains a front address of ExtensionData ( ) represented by unit equal to the number bytes from the front byte of the PlayList file.

An AppInfoPlayList ( ) block stores parameters related to playback control of PlayList, such as restriction on playback. AppInfoPlayList ( ) will be described later in detail with reference to FIGS. 14 and 15.

A PlayList ( ) block stores parameters related to a main path and a sub path of PlayList. PlayList ( ) will be described in detail with reference to FIGS. 16 through 18.

A PlayListMark ( ) block stores mark information, more specifically, information related to a mark as a jump destination (jump point) in user operation or command for chapter jump, etc.

An ExtensionData ( ) block stores private data.

A first example of AppInfoPlayList ( ) is described below with reference to FIG. 14. AppInfoPlayList ( ) of FIG. 14 applies when Indexes ( ) is the one described with reference to FIG. 10, namely, when the flag indicating whether the data referenced by Indexes ( ) contains the other audio data to be mixed with the audio stream #1 is not described in Index ( ).

A length field shows a length of syntax after the length field, i.e., the number of bytes of AppInfoPlayList ( ) from the location immediately after the length field to the last location of the reserved_for_future_use. An eight-bit reserved_for_future_use field is prepared subsequent to the length field.

A PlayList_playback_type field contains information indicating the type of playback performed in response to Playlist. The types of playback may include a continuous playback, a random access playback, and a shuffle playback.

A playback_count contains information regarding the number of PlayItems for playback in the PlayList that performs one of the random access playback and the shuffle playback.

A U0_mask_table ( ) block contain information relating to particular playback functions including pause, chapter search, jump, fast forward, fast reverse (fast reverse playback), and limitation to user operation for display.

A PlayList_random_access_flag field contains flag information for controlling the jump playback from another PlayList. If PlayList_random_access_flag=1, the jump playback from the other PlayList is inhibited.

The reproducing apparatus 20 can make available expanded user operations on its own including a user operation command to make a playback position jump from a playback position referenced by a current PlayList to a head or a chapter location of a predetermined PlayItem referenced by another PlayList. When the user operation issues a command to jump from the playback position of the Clip AV stream file referenced by the other PlayList to the Clip AV Stream referenced by this PlayList (shifting of the playback position), the PlayList_random_access_flag is used to set whether to restrict the user operation.

If the jump command (to shift the playback position) is issued not by the user operation but by a navigation command, the PlayList_random_access_flag is disregarded (the command is executed, and the playback position is shifted in response to the generation of the command).

An is_MixApp flag is used to determine whether to mix the stream reproduced by the PlayList into an audio or sound effect. More specifically, the is_MixApp flag is defined as a flag indicating the data referenced by the PlayList contains the sound data and the audio stream #2 to be mixed with the audio stream #1. By recognizing this one flag only, whether to mix the audio data, namely, the necessity of performing the decode process is quickly determined.

A lossless_may_bypass_mixer_flag is related to the playback of lossless sound. This flag is immediately followed by a 13-bit reserved_for_future_use field.

If the flag indicating whether the data referenced by Indexes ( ) contains the other audio data to be mixed with the audio stream #1 is not described as shown in FIG. 10, is_MixApp may be described in the AppInfoPlayList ( ) block as previously discussed with reference to FIG. 14 so that the PlayList indicates whether to mix the sound and the sound effect. The is_MixApp flag may be described in one of PlayList ( ) and PlayItem rather than being described in the AppInfoPlayList ( ) block.

A second example of AppInfoPlayList ( ) is described below with reference to FIG. 15.

The second example of AppInfoPlayList ( ) of FIG. 15 is identical to the first example of AppInfoPlayList ( ) discussed with reference to FIG. 14 except that the is_MixApp flag indicating whether the PlayList mixes the sound and sound effect is not described. More specifically, in the second example of AppInfoPlayList ( ) of FIG. 15, the Indexes ( ) block is the one discussed with reference to FIG. 10 except that a flag, such as is_MixApp flag, is written in the PlayList ( ) or the PlayItem to be discussed later. The flag indicating whether the data referenced by Indexes ( ) contains the other audio data to be mixed with the audio stream #1 is not described in the Index ( ) but in the PlayList ( ) or the PlayItem. Alternatively, the Indexes ( ) block is the one discussed with reference to FIG. 11 or FIG. 12, i.e., the flag indicating whether the data referenced by Indexes ( ) contains the other audio data to be mixed with the audio stream #1 is described in the Index ( ).

FIG. 16 illustrates a first example of syntax of PlayList ( ). In the syntax of FIG. 16, the flag indicating whether the other audio data to be mixed with the audio stream #1 is contained in the data reproduced by referencing the PlayList is not described in the PlayList ( ).

The first example of syntax of PlayList ( ) of FIG. 16 applies when the Indexes ( ) block is the one discussed with reference to FIG. 10, i.e., when the flag indicating whether the data referenced by Indexes ( ) contains the other audio data to be mixed with the audio stream #1 is not described in the Index ( ) but in the PlayItem to be discussed later. The first example of syntax of PlayList ( ) of FIG. 16 applies when the Indexes ( ) block is the one discussed with reference to FIG. 11 or 12, i.e., when the flag indicating whether the data referenced by Indexes ( ) contains the other audio data to be mixed with the audio stream #1 is described in the Index ( ).

A length field contains a 32-bit integer without sign representing the number of bytes from the location immediately after the length field to the last location of the PlayList ( ), namely indicates the number of bytes from the reserved_for_future_use field to the last location of the PlayList. The length field is followed by a 16-bit reserved_for_future_use field. The reserved_for_future_use field is not yet filled with data and available for future expansion. A number_of_PlayItems field is a 16-bit field indicating the number of PlayItems contained in the PlayList. For example, the number of PlayItems is 3 in FIG. 5. PlayItem_id is numbered starting with zero in the order in which the PlayItem ( ) appears in the PlayList. As shown in FIGS. 5 and 7, the PlayItem_id= 0, 1, 2, . . . .

A number_of_SubPaths field is a 16-bit field indicating the number of SubPaths (number of entries) in the PlayList. For example, the number of SubPaths is 3 in FIG. 5. The SubPath_id is numbered starting with zero in the order in which the SubPath ( ) appears in the PlayList. As shown in FIG. 5, the SubPath_id=0, 1, 2 . . . . In subsequent for statement, the PlayItem is referenced according to the number of PlayItems, and the SubPath is referenced according to the number of SubPaths.

FIG. 17 illustrates a second example of syntax of PlayList ( ). As shown in FIG. 17, the audio streams reproduced by referencing the PlayList are only the audio stream #1 (with the audio stream #2 excluded). The flag indicating whether the sound data to be mixed with the audio stream #1 is contained in the data reproduced by referencing the PlayList ( ) is described in the PlayList ( ).

The second example of syntax of PlayList ( ) of FIG. 17 applies when the Indexes ( ) block is the one discussed with reference to FIG. 10, i.e., when the flag indicating whether the other audio data to be mixed with the audio stream #1 is contained in the data referenced by the Indexes ( ) is described neither in the Index ( ) nor in the PlayItem to be discussed later.

The second example of syntax of PlayList ( ) of FIG. 17 is identical to the first example of syntax of PlayList ( ) discussed with reference to FIG. 16 except that a one-bit is_MixApp flag indicating whether the sound data is contained in the data referenced by the PlayList ( ) is newly described and that the reserved_for_future_use field has been modified from 16 bits to 15 bits. The is_MixApp flag may be defined as a flag indicating that the data referenced by the PlayList ( ) contains the sound data and the audio stream #2 to be mixed with the audio stream #1. In this case, by recognizing only one flag, whether to mix the audio data, namely, the necessity of the decode process is quickly determined.

FIG. 18 illustrates a third example of syntax of PlayList ( ). As illustrated, the PlayList ( ) contains a flag indicating whether the data referenced by the PlayList ( ) contains the sound data to be mixed with the audio stream #1 and a flag indicating whether the data referenced by the PlayList ( ) contains the audio stream #2 to be mixed with the audio stream #1.

The third example of syntax of PlayList ( ) of FIG. 18 applies when the Indexes ( ) block is the one described with reference to FIG. 10, i.e., the flag indicating whether the data referenced by Indexes ( ) contains the other audio data to be mixed with the audio stream #1 is described neither in the Index ( ) nor in the PlayItem to be described later.

The third example of syntax of PlayList ( ) of FIG. 18 is identical to the first example of syntax of PlayList ( ) of FIG. 16 except that two flags, namely, the one-bit is_MixApp_1 flag indicating whether the data referenced by the PlayList ( ) contains the audio stream #2 and the one-bit is_MixApp_2 flag indicating whether the data referenced by the PlayList ( ) contains the sound data are described, and that the reserved_for_future_use field has been modified from 16 bits to 14 bits.

FIG. 19 illustrates an example of syntax of SubPath ( ).

A length field contains a 32-bit integer without sign representing the number of bytes from the location immediately after the length field to the last location of the SubPath ( ), namely indicates the number of bytes from the reserved_for_future_use field to the last location of the PlayList. The length field is followed by a 16-bit reserved_for_future_use field. The reserved_for_future_use field is not yet filled with data and available for future expansion. A SubPath_type field is an eight-bit field indicating the application type of SubPath. The SubPath_type field is used to indicate the type of SubPath as to whether the SubPath is of audio, bit-map caption, or text caption. The SubPath_type will be described below with reference to FIG. 20. The SubPath_type field is followed by a 15-bit reserved_for_future_use field. An is_repeat_SubPath field is a one-bit field specifying a playback method of the SubPath, and indicates whether the SubPath is reproduced only once or repeatedly during the playback of the main path. For example, the is_repeat_SubPath field is used if a main AV stream and a Clip specified by the SubPath have different playback timings (e.g., the main path is used for slideshow of still picture while the sub path as the audio path is used as background music for the main path). The is_repeat_SubPath field is followed by an eight-bit reserved_for_future_use field. A number_of_SubPlayItems field is an eight-bit field indicating the number of SubPlayItems (number of entries) in a single SubPath. In the value of the number_of_SubPlayItems field, the number of SubPlayItems is one with SubPath_id=0, and two with SubPath_id=1 as shown in FIG. 5. In the subsequent for statement, the SubPlayItem is referenced by the number of times equal to the number of SubPlayItems.

FIG. 20 illustrates SubPath_type (type of sub path). The type of sub path is defined as shown in FIG. 20.

Referring to FIG. 20, SubPath_type=0 and 1 are reserved. SubPath_type=2 is used for audio presentation of the browsable slideshow. For example, SubPath_type=2 indicates that an audio presentation path using the sub path and a main path using the PlayItem are not synchronized with each other in the PlayList.

SubPath_type=3 is a subpath for an interactive graphics presentation menu. For example, SubPath_type=3 indicates that an interactive graphics menu using the sub path and the main path using the PlayItem are not synchronized with each other in the PlayList.

SubPath_type=4 is a subpath for text subtitle presentation path. For example, the SubPath_type=4 indicates that a presentation path of text caption using the sub path and the main path using the PlayItem are synchronized with each other in the PlayList.

SubPath_type=5 is a subpath for a second audio presentation path (i.e., a path for referencing the second audio stream). More specifically, SubPath_type=5 indicates that the second audio presentation path using the subpath and a main path using the PlayList are synchronized with each other in the PlayList. For example, the second audio stream using the sub path is a comment (voice) of a directory concerning a movie. In the Subpath_id of FIG. 7, SubPath_type of FIG. 19 corresponds to SubPath_type=5.

SubPath_type=6 is a subpath for a second video presentation path (i.e., a path for referencing the second video stream). More specifically, SubPath_type=6 indicates that the second presentation path using the subpath and the main path using the PlayItem are synchronized with each other. For example, the second video stream using the subpath is a comment of a director concerning a movie (moving picture).

SubPath_type=7 through 255 are reserved.

FIG. 21 illustrates syntax of SubPlayItem(i).

A length field contains a 16-bit integer without sign indicating the number of bytes from the location immediately subsequent to the length field to the last location of the SubPlayItem ( ).

FIG. 21 illustrates two cases, a first case in which a single Clip is referenced by the SubPlayItem and a second case in which a plurality of Clips are referenced by the SubPlayItem.

The first case in which a single Clip is referenced by the SubPlayItem is described first.

The SubPlayItem contains a Clip_Information_file_name [0] field specifying clip. The SubPlayItem further contains a Clip_codec_identifier[0] field for specifying a codec method of the clip, a reserved_for_future_use field, an is_multi_Clip_entries flag representing the presence or absence of the registration of multi-Clip, and a ref_to_STC_id[0] field related to STC discontinuity point (discontinuity point in system timebase). If the is_multi_Clip_entries flag is set, the syntax allowing the SubPlayItem to reference a plurality of Clips is used. The SubPlayItem further contains a SubPlayItem_IN_time field and a SubPlayItem_OUT_time field specifying playback time of the SubPath in the Clip. The SubPlayItem further includes a sync_PlayItem_id field and a sync_start_PTS_of_PlayItem field specifying start time of the SubPath along time axis. As previously discussed, the sync_PlayItem_id field and the sync_start_PTS_of_PlayItem field are used in the case of FIGS. 6 and 7 (when the main AV stream and the file indicated by the SubPath are reproduced at the same timing). The sync_PlayItem_id field and the sync_start_PTS_of_PlayItem field are not used when the main AV stream and the file indicated by the SubPath are reproduced at different timings (for example, a still picture referenced by the main path and the audio referenced by the sub path are not synchronized with each other as in the case of background music (BGM) of a slideshow composed of still pictures). The SubPlayItem_IN_time field, the SubPlayItem_OUT_time field, the sync_PlayItem_id field, and the sync_start_PTS_of_PlayItem field are commonly used among Clips referenced by the SubPlayItem.

The SubPlayItem may reference a plurality of clips (is_multi_Clip_entries==1b) as shown in FIG. 7, in other words, multi-clips may be registered. Such a case is described below.

A num_of_Clip_entries field shows the number of clips. The value in a Clip_Information_file_name[SubClip_entry_id] specifies the clips except Clip_Information_file_name[0]. More specifically, the value in the Clip_Information_file_name[SubClip_entry_id] specifies clips such as Clip_Information_file_name[1] and Clip_Information_file_name[2] except Clip_Information_file_name[0]. The SubPlayItem further contains a Clip_codec_identifier[SubClip_entry_id] field specifying the codec method of the clip, a ref_to_STC_id[SubClip_entry_id] field related to an STC discontinuity point (discontinuity point in system timebase), and a reserved_for_future_use field.

The SubPlayItem_IN_time field, the SubPlayItem_OUT_time field, the sync_PlayItem_id field, and the sync_start_PTS_of_PlayItem field are commonly used among a plurality of Clips. As shown in FIG. 7, the SubPlayItem_IN_time field, the SubPlayItem_OUT_time field, the sync_PlayItem_id field, and the sync_start_PTS_of_PlayItem field are shared in use by SubClip_entry_id=0 and SubClip_entry_id=1. Text based subtitle corresponding to the selected SubClip_entry_id is reproduced based on the SubPlayItem_IN_time field, the SubPlayItem_OUT_time field, the sync_PlayItem_id field, and the sync_start_PTS_of_PlayItem field.

The SubClip_entry_id is numbered starting with 1 in the order as Clip_Information_file_name[SubClip_entry_id] appears in the SubPlayItem. The SubClip_entry_id of the Clip_Information_file_name[0] is zero.

FIG. 22 illustrates a first example of syntax of PlayList ( ) in which the flag indicating whether the other audio data to be mixed with the audio stream #1 is not described.

The first example of syntax of PlayItem ( ) of FIG. 22 applies when the Indexes ( ) block is the one described with reference to one of FIGS. 11 and 12, i.e., when the flag indicating whether the data referenced by Indexes ( ) contains the other audio data to be mixed with the audio stream #1 is described in the Index ( ). The first example of syntax of PlayItem ( ) of FIG. 22 also applies when the AppInfoPlayList ( ) block is the one discussed with reference to FIG. 14, i.e., when the flag indicating whether the data referenced by the PlayList contains the other audio data to be mixed with the audio stream #1 is described in the AppInfoPlayList ( ) block. The first example of syntax of PlayItem ( ) of FIG. 22 also applies when the PlayList ( ) block is the one discussed with reference to one of FIGS. 17 and 18, i.e., when the flag indicating whether the data referenced by the PlayList contains the other audio data to be mixed with the audio stream #1 is described.

A length field contains a 16-bit integer without sign indicating the number of bytes from the location immediately subsequent to the length field to the last location of the PlayItem ( ). A Clip_Information_file_name[0] field specifies a clip referenced by the PlayItem. With reference to FIG. 6, a main AV stream is referenced by the Clip_Information_file_name[0] field. The PlayItem ( ) block further contains a Clip_codec_identifier[0] field specifying the codec method of the Clip, an 11-bit reserved_for_future_use field not yet filled with data for future expansion, and an is_multi_angle flag indicating whether the PlayItem ( ) block features multi-angle playback function. The PlayItem ( ) block further contains a connection_condition field, and a ref_to_STC_id[0] as information related to an STC discontinuity point (discontinuity point in system timebase). The PlayItem ( ) block further contains an IN_time field and an OUT_time field specifying playback time of the PlayItem in the clip. As shown in FIG. 6, the playback range of the main Clip AV stream file is represented by the IN_time field and the OUT_time field. The PlayItem ( ) block further contains a U0_mask_table ( ) block, a PlayItem_random_access_mode field and a still_mode field. A plurality of is_multi_angle fields may be used, but the use of the plurality of is_multi_angle fields is not discussed herein because it is not directly related to the present invention.

A PlayItem of interest and at least one SubPath reproduced associated with the PlayItem may be prepared. In such a case, an STN_table ( ) block in PlayItem presents a mechanism that allows one Clip to be selected from a Clip referenced by the PlayItem and Clips referenced by at least one SubPath in response to a user operation for audio switching or caption switching. The STN_table ( ) presents a mechanism that allows a mixing playback of two audio streams to be selected.

FIG. 23 illustrates a second example of syntax of the PlayItem ( ). As illustrated, the data corresponding to the PlayItem ( ) contains no audio stream #2. A flag indicating whether the data corresponding to the PlayItem ( ) contains the sound data to be mixed with the audio stream #1 is described in the PlayItem ( ).

The second example of syntax of the PlayItem ( ) of FIG. 23 applies when the Indexes ( ) block is the one described with reference to FIG. 10, i.e., when the flag indicating whether the data referenced by Indexes ( ) contains the other audio data to be mixed with the audio stream #1 is not described in the Index ( ), and when the AppInfoPlayList ( ) is the one of FIG. 15, i.e., when the flag indicating whether the data referenced by the PlayList contains the other audio data to be mixed with the audio stream #1 is not described in the AppInfoPlayList ( ), and when the PlayList ( ) is the one discussed with reference to FIG. 16, i.e., when the flag indicating whether the data referenced by the PlayList contains the other audio data to be mixed with the audio stream #1 is not described.

The second example of syntax of the PlayList ( ) of FIG. 23 is identical to the first example of syntax of the PlayList ( ) of FIG. 22 except that the one-bit is_MixApp flag indicating whether the data referenced by the PlayItem ( ) contains the sound data is newly described and that the reserved_for_future_use field has been modified from 11 bits to 10 bits. The is_MixApp flag may be defined as a flag indicating whether the data referenced by the PlayItem ( ) contains the sound data and the audio stream #2. By recognizing only one flag, whether to mix the audio data, namely, the necessity of the decode process is quickly determined.

FIG. 24 illustrates a third example of syntax of PlayItem ( ). The PlayItem ( ) of FIG. 24 contains a flag indicating whether the data corresponding to the PlayItem ( ) contains the sound data to be mixed with the audio stream #1 and a flag indicating whether the data corresponding to the PlayItem ( ) contains the audio stream #2 to be mixed with the audio stream #1.

The third example of syntax of the PlayItem ( ) of FIG. 24 applies when the Indexes ( ) block is the one described with reference to FIG. 10, i.e., when the flag indicating whether the data referenced by Indexes ( ) contains the other audio data to be mixed with the audio stream #1 is not described in the Index ( ), and when the AppInfoPlayList ( ) is the one of FIG. 15, i.e., when the flag indicating whether the data referenced by the PlayList contains the other audio data to be mixed with the audio stream #1 is not described in the AppInfoPlayList ( ), and when the PlayList ( ) is the one discussed with reference to FIG. 16, i.e., when the flag indicating whether the data referenced by the PlayList contains the other audio data to be mixed with the audio stream #1 is not described.

The third example of syntax of PlayItem ( ) of FIG. 24 is identical to the first example of syntax of the PlayItem ( ) of FIG. 22 except that two flags, namely, the one-bit is_MixApp_1 flag indicating whether the data corresponding to the PlayItem ( ) contains the audio stream #2 and the one-bit is_MixApp_2 flag indicating whether the data corresponding to the PlayItem ( ) contains the sound data, are newly described and that the reserved_for_future_use field has been modified from 11 bits to 9 bits.

FIG. 25 illustrates a syntax of STN_table ( ). The STN_table ( ) is set as an attribute of the PlayItem.

A length field is a 16-bit integer field without sign indicating the number of bytes from the location immediately subsequent to the length field to the last location of the STN_table ( ). The length field is followed by a 16-bit reserved_for_future_use field. A number_of_video_steam_entries field indicates the number of streams entered (registered) in the STN_table ( ) and provided with video_stream_id. The video_stream_id is identification information identifying a video stream, and video_stream_number is a video stream number used to switch video and visible to the user.

A number_of_audio_stream_entries field contains the number of streams of first audio streams entered in the STN_table ( ) and provided with audio_stream_id. The audio_stream_id is identification information identifying the audio stream, and audio_stream_number is an audio stream number used to switch audio and visible to the user. A number_of_audio_stream2_entries field contains the number of streams of second audio streams entered in the STN_table ( ) and provided with audio_stream_id2. The audio_stream_id2 is identification information identifying the audio stream, and audio_stream_number is an audio stream number used to switch audio and visible to the user. The audio stream of the number_of_audio_stream_entries entered in the STN_table ( ) is an audio stream decoded by a first audio decoder 75-1 of a reproducing apparatus 20-2 of FIG. 41 to be discussed later. The audio stream of the number_of_audio_stream2_entries entered in the STN_table ( ) is an audio stream decoded by a second audio decoder 75-2 of the reproducing apparatus 20-2 of FIG. 41 to be discussed later. In the STN_table ( ) of FIG. 25, audio streams to be decoded by the two audio decoders can be entered.

Figure 41B:
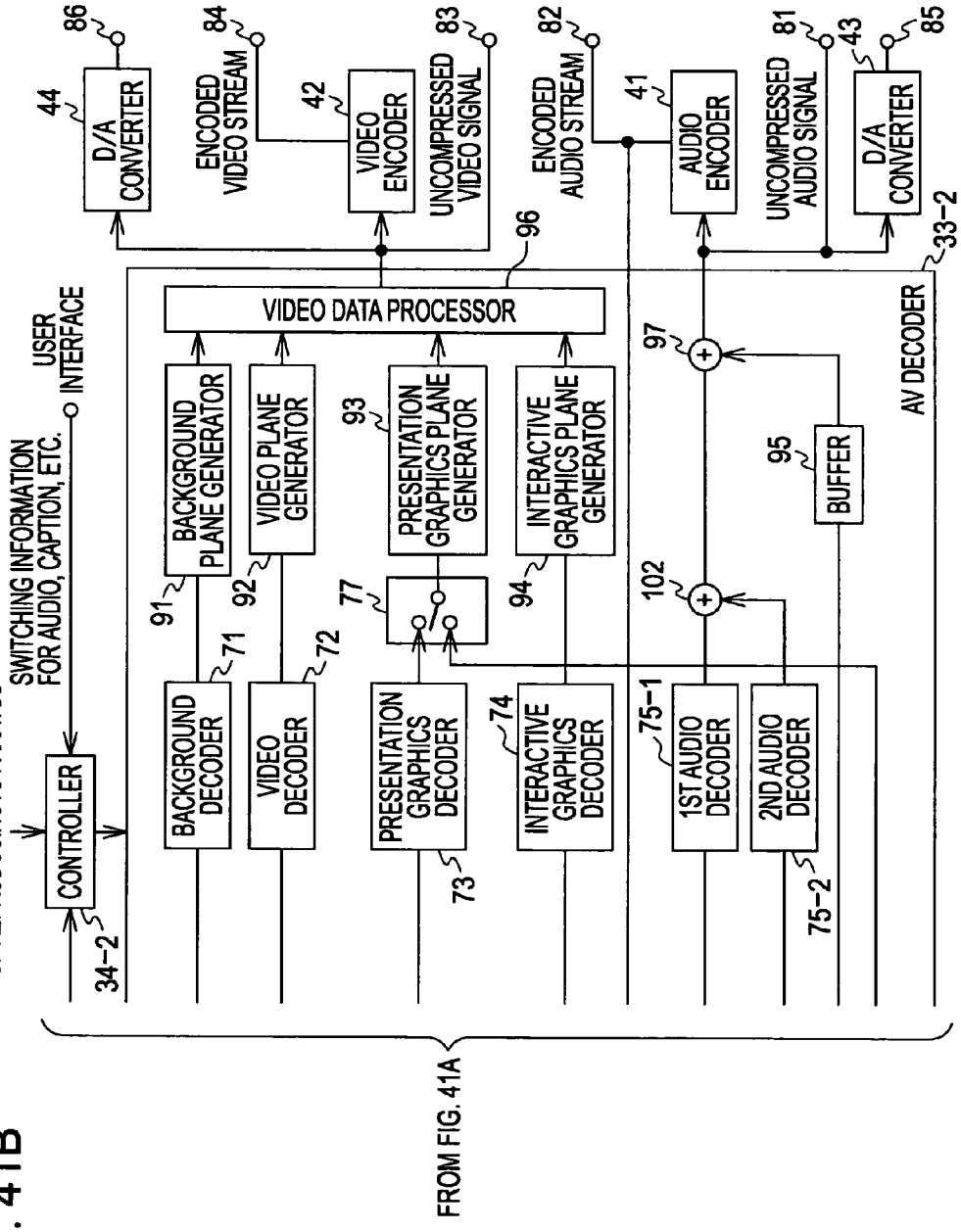
FIG. 41 is a block diagram illustrating a second structure of reproducing apparatus in accordance with one embodiment of the present invention.

In the following discussion, an audio stream in the number_of_audio_stream_entries field decoded by the first audio decoder 75-1 of the reproducing apparatus 20-2 of FIG. 41 is referred to as a first audio stream #1, and an audio stream in the number_of_audio_stream2_entries field decoded by the second audio decoder 75-2 of the reproducing apparatus 20-2 of FIG. 41 is referred to as a second audio stream #2. The first audio stream #1 has a higher priority than the second audio stream #2.

A number_of_PG_textST_stream_entries field contains the number streams entered in the STN_table ( ) and provided with PG_textST_stream_id. A stream (such as presentation graphics stream), into which a bit-map caption such as sub picture of a DVD is run-length encoded, and a text caption file (textST) are entered. PG_textST_stream_id is identification information identifying a caption stream, and PG_textST_stream number is a caption stream number (text sub title stream number) used to switch captions and visible to the user.

A number_of_IG_stream_entries field contains the number of streams entered in the STN_table ( ) and provided with IG_stream_id. Interactive graphics streams are entered. IG_stream_id is identification information identifying the interactive graphics stream and IG_stream_number is a graphics stream number used to switch graphics and visible to the user.

The syntax of a stream_entry ( ) block is described below with reference to FIG. 26.

A length field contains an eight-bit integer without sign indicating the number of bytes from the location immediately subsequent to the length field to the last location of the stream_entry ( ). A type field is an eight-bit field indicating the type of information required to uniquely identify a stream that is provided with the above-mentioned stream number.

With type=1, a 16-bit packet ID (PID) identifying one elementary stream from among a plurality of elementary streams multiplexed into a clip (main clip) referenced by the PlayItem is specified. A ref_to_stream_PID_of_mainClip field indicates the PID. More specifically, with type=1, a stream is determined by simply specifying a PID in the main Clip AV stream file.

The SubPath may reference a plurality of clips at a time, and a plurality of elementary streams may be multiplexed into each clip. With type=2, SubPath_id, Clip_id, and packet ID (PID) are specified to identify one elementary stream from among the plurality of elementary streams of the single (main) clip referenced by the SubPath. A ref_to_SubPath_id field shows SubPath_id, a ref_to_SubClip_entry_id field shows Clip_id, and a ref_to_stream_PID_of_SubClip field show the PID. These IDs are used to reference a plurality of Clips in the SubPlayItem, and a plurality of elementary streams in each clip.

When a PlayItem and at least one SubPath reproduced associated with the PlayItem are prepared with the two types (type=1 and type=2) employed, a single elementary is thus identified from a Clip referenced by the PlayItem and a Clip referenced by at least one SubPath. The type=1 indicates a Clip (main Clip) referenced by a Main Path, and the type=2 indicates a Clip (sub Clip) referenced by Sub Path.

Returning now back to the description of the STN_table ( ) block of FIG. 25, each elementary stream identified by each stream_entry ( ) is sequentially numbered starting with zero as video_stream_id in for loop of video stream ID (video_stream_id). A video stream number (video_stream_number) may be used instead of the video stream ID (video_stream_id). In this case, each video_stream_number is numbered starting with 1 rather than with zero. In other words, the adding of 1 to the video_stream_id results in the video_stream_number. Since the video stream number is used to switch videos and visible to the user, it is numbered starting with 1.

Similarly, each audio elementary stream defined by each stream_entry ( ) is numbered starting with zero as audio_stream_id in the for loop of the audio stream ID (audio_stream_id). As in the video stream, an audio stream number (audio_stream_number) may be used instead of the audio stream ID (audio_stream_id). The audio_stream_number is numbered starting with 1 rather with zero. In other words, the adding of 1 to the audio_stream_id results in the audio_stream_number. Since the audio stream number is used to switch audios and visible to user, it is numbered starting with 1.

Similarly, each audio elementary stream defined by each stream_entry ( ) is numbered starting with zero as audio_stream_id2 in the for loop of the audio stream ID2 (audio_stream_id2). As in the video stream, an audio stream number2 (audio_stream_number2) may be used instead of the audio stream ID2 (audio_stream_id2). The audio_stream_number2 is numbered starting with 1 rather with zero. In other words, the adding of 1 to the audio_stream_id2 results in the audio_stream_number2. Since the audio stream number2 is used to switch audios and visible to user, it is numbered starting with 1.

In the STN_table ( ) of FIG. 25, an audio stream of number_of_audio_stream_entries (first audio stream #1) and an audio stream of number_of_audio_stream2_entries (second audio stream #2) are defined. In other words, since the first audio stream #1 and the second audio stream #2 are entered using the STN_table ( ), the user can select two audio streams to be reproduced in synchronization with each other.

Each bit-map caption elementary stream or text caption defined by each stream_entry ( ) is numbered starting with zero as PG_textST_stream_id in the for loop of the caption stream ID (PG_textST_stream_id). As in the video stream, a caption stream number (PG_textST_stream_number) may be used instead of the caption stream ID (PG_textST_stream_id). In this case, the PG_textST_stream_number is numbered starting with 1 rather with zero. In other words, the adding of 1 to the PG_textST_stream_id results in the PG_textST_stream_number. Since the caption stream number (text sub title stream number) is used to switch captions and visible to the user, it is numbered starting with 1.

Similarly, each interactive graphics elementary stream defined by each stream_entry ( ) is successively numbered starting with zero as IG_stream_id in the for loop of the graphics stream ID (IG_stream_id). As in the video stream, a graphic stream number (IG_stream_number) may be used instead of the graphic stream ID (IG_stream_id). In this case, the IG_stream_number is numbered starting with 1 rather with zero. The adding of 1 to the IG_stream_id results in the IG_stream_id. Since the graphics stream number is used to switch graphics and visible to the user, it is numbered starting with 1.

A stream_attribute ( ) block of STN_table ( ) of FIG. 25 is described below.

In the for statement subsequent to the reserved_for_future_use field, a video stream portion thereof is referenced for video stream, an audio stream portion to which a data provider (e.g., a manufacturer of the recording medium 21) sets a Main Path and a Sub Path is referenced for audio stream, a PG textST stream portion is referenced for PG textST stream, and an IG stream portion is referenced for IG stream.

A stream_attribute ( ) of the for loop of the video stream ID (video_stream_id) provides stream attribute information of one video elementary stream identified on a per stream_entry ( ) basis. The stream attribute information of one video elementary stream identified on a per stream_entry ( ) basis is described in the stream_attribute ( ).

Similarly, a stream_attribute ( ) of the for loop of the audio stream ID (audio_stream_id) provides stream attribute information of one audio elementary stream identified on a per stream_entry ( ) basis. The stream attribute information of one audio elementary stream identified on a per stream_entry ( ) basis is described in the stream_attribute ( ). For example, the audio elementary stream identified by type=1 or type=2 of the stream_entry ( ) of FIG. 26 is single, and the stream_attribute ( ) provides the stream attribute information of that one audio elementary stream.

Similarly, a stream_attribute ( ) of the for loop of the audio stream ID2 (audio_stream_id2) provides stream attribute information of one audio elementary stream identified on a per stream_entry ( ) basis. More specifically, the stream attribute information of one audio elementary stream identified on a per stream_entry ( ) basis is described in the stream_attribute ( ). For example, the audio elementary streams identified by type=1 or type=2 of the stream_entry ( ) of FIG. 26 is single, and the stream_attribute ( ) provides the stream attribute information of that one audio elementary stream.

Similarly, a stream_attribute ( ) of the for loop of the caption stream ID (PG_textST_stream_id) provides stream attribute information of one bit-map caption elementary stream or one text caption elementary stream identified on a per stream_entry ( ) basis. More specifically, the stream attribute information of one bit-map caption elementary stream or one text caption elementary stream identified on a per stream_entry ( ) basis is described in the stream_attribute ( ).

Similarly, a stream_attribute ( ) of the for loop of the graphics stream ID (IG_stream_id) provides stream attribute information of one interactive graphics elementary stream identified on a per stream_entry ( ) basis. More specifically, the stream attribute information of one interactive graphics elementary stream identified on a per stream_entry ( ) basis is described in the stream_attribute ( ).

Syntax of the stream_attribute ( ) is described below with reference to FIG. 27.

A length field contains a 16-bit integer without sign representing the number of bytes from the location immediately subsequent to the length field to the last location of the stream_attribute ( ) block.

A stream_coding_type field contains a coding type of the elementary stream as shown FIG. 28. The coding types of the elementary stream include MPEG-2 video stream, HDMV LPCM audio, Dolby AC-3 audio, dts audio, presentation graphics stream, interactive graphics stream, and text substitute stream.

A video_format field contains a video format of the video elementary stream as shown in FIG. 29. The video formats of the video elementary stream contains 480i, 576i, 480p, 1080i, 720p, and 1080p.

A frame_rate field contains a frame rate of the video elementary stream as shown in FIG. 30. The frame rates of the video elementary stream include 2400/1001, 24, 25, 30000/1001, 50, and 60000/1001.

An aspect_ratio field contains aspect ratio information of the video elementary stream as shown in FIG. 31. Described as the aspect information of the video elementary stream are a display aspect ratio of 4:3, and a display aspect ratio of 16:9.

An audio_presentation_type field contains presentation type information of the audio elementary stream as shown in FIG. 32. Described as the presentation type information of the audio elementary stream are single mono channel, dual mono channel, stereo (2-channel), and multi-channel.

A sampling_frequency field contains a sampling frequency of the audio elementary stream as shown in FIG. 33. Described as the sampling frequencies of the audio elementary stream are 48 kHz and 96 kHz.

An audio_language_code field contains a language code of the audio elementary stream (such as Japanese, Korean, Chinese, etc.).

A PG_language_code field contains a language code of the bit-map caption elementary stream (Japanese, Korean, Chinese, etc.).

An IG_language_code field contains a language code of the interactive graphics elementary stream (Japanese, Korean, Chinese, etc.).

A textST_language_code field contains a language code of the text caption elementary stream (Japanese, Korean, Chinese, etc.).

A character_code field contains a character code of the text caption elementary stream as shown in FIG. 34. The character codes of the text caption elementary stream include Unicode V1.1 (ISO 10646-1), Shift JIS (Japanese), KSC 5601-1987 including KSC 5653 for Roman characters (Korean), GB 18030-2000 (Chinese), GB2312 (Chinese), and BIG 5 (Chinese).

The syntax of the stream_attribute ( ) of FIG. 27 is described below with reference to FIGS. 27, and 28 through 34.

If the coding type of the elementary stream (stream_coding_type of FIG. 27) is MPEG-2 video stream (FIG. 28), the stream_attribute ( ) includes video formats (FIG. 29), frame rates (FIG. 30), and aspect ratio information (FIG. 31) of the elementary stream.

If the coding type of the elementary stream (stream_coding_type of FIG. 27) is one of HDMV LPCM audio, Dolby AC-3 audio, and dts audio (FIG. 28), the stream_attribute ( )

includes presentation type information (FIG. 32), sampling frequencies (FIG. 33), and language code of the audio elementary stream.

If the coding type of the elementary stream (stream_coding_type of FIG. 27) is the presentation graphics stream (FIG. 28), the stream_attribute ( ) includes the language code of the bit-map caption elementary stream.

If the coding type of the elementary stream (stream_coding_type of FIG. 27) is the interactive graphics stream (FIG. 28), the stream_attribute ( ) includes the language code of the interactive graphics elementary stream.

If the coding type of the elementary stream (stream_coding_type of FIG. 27) is the text sub title stream (FIG. 28), the stream_attribute ( ) includes character codes of the text caption elementary stream (FIG. 34), and the language code.

The attribute information is not limited to these pieces of information.

When a PlayItem and at least one SubPath reproduced associated with the PlayItem are prepared, the attribute information of one elementary stream identified by the stream_attribute ( ) is known from the stream_attribute ( ) from among the Clip referenced by the PlayItem and the Clip referenced by at least one SubPath.

By examining the attribute information (stream_attribute ( )), the reproducing apparatus can determine whether the apparatus itself has the function of reproducing the elementary stream. Also, by examining the attribute information, the reproducing apparatus can select an elementary stream matching initial information of language setting thereof.

For example, the reproducing apparatus may have the function of reproducing the bit-map caption elementary stream and may not have the function of reproducing the text caption elementary stream. If the user instructs the reproducing apparatus to switch audio, the reproducing apparatus successively selects only the bit-map caption elementary streams from the for loop of the caption stream ID (PG_textST_stream_id) for playback.

Initial setting information of language on the reproducing apparatus may be Japanese. If the user instructs the reproducing apparatus to switch audio, the reproducing apparatus successively selects only elementary streams having the language code for Japanese from the for loop of the audio stream ID (audio stream id) for playback.

An AV stream (movie) composed of a video stream and an audio stream referenced by a main path may be reproduced. When the user instructs the reproducing apparatus to switch audio to specify (select) the audio stream #1 (audio output in a standard movie) and the audio stream #2 (comment provided by the director or performer), the reproducing apparatus mixes (superimposes) the audio stream #1 and the audio stream #2 to reproduce the video stream together with the audio streams.

As understood from the STN_table ( ) of FIGS. 25 and 26, both the audio stream #1 and the audio stream #2 may be audio streams contained in the Clip referenced by the Main Path. Alternatively, one of the audio stream #1 and the audio stream #2 may be an audio stream in the Clip referenced by the main path, and the other of the audio stream #1 and the audio stream #2 may be an audio stream in the Clip referenced by the Sub Path. In this way, two streams may be selected from among a plurality of audio streams superimposed on the main AV stream referenced by the Main Path and mixed for playback.

When the PlayItem and at least one SubPath to be reproduced associated with the PlayItem are prepared, the STN_table ( ) in the PlayItem ( ) provides in this way a mechanism that allows the user to switch audio or caption to select from the Clip referenced by the PlayItem and the Clip referenced by at least one SubPaths. The reproducing apparatus thus allows the user to interactively operate even on a stream and a file different from a playback main AV stream.

Since a plurality of SubPaths are used in a single PlayList with SubPaths referencing respective SubPlayItems, a resulting AV stream has a high degree of expandability and flexibility. More specifically, a SubPlayItem may be added later. For example, a Clip AV stream file referenced by a Main Path and a PlayList associated with the Clip AV stream file may be used. If the PlayList is rewritten as a result of adding a new SubPath, the Clip AV stream file and a Clip AV stream file different from the Clip AV stream file referenced by the Main Path are together referenced based on the new PlayList for playback. The reproducing apparatus thus provides a high degree of expandability.

The STN_table ( ) in the PlayItem ( ) provides a mechanism that allows the audio stream #1 to be decoded by the first audio decoder 75-1 and the audio stream #2 to be decoded by a second audio decoder 75-2 in a reproducing apparatus 20-2 of FIG. 41 to be mixed (mixed) and then reproduced. For example, a PlayItem ( ) and at least one SubPath to be reproduced associated with the PlayItem ( ) may be prepared, and a mechanism to mix and reproduce an audio stream of a Clip referenced by the PlayItem as the audio stream #1 and an audio stream of a Clip referenced by the SubPath as the audio stream #2 is provided. Also provided is a mechanism that allows two audio streams contained in a Clip (main Clip) referenced by the PlayItem, as the audio stream #1 and the audio stream #2, to be mixed and then reproduced. In this way, an audio stream (such as a stream of comment by a director) different from a recorded main audio stream can be superimposed and reproduced. Two superimposed audio streams, namely, the audio stream #1 and the audio stream #2, may be mixed and reproduced.

A specific example is described below with reference to FIG. 35. FIG. 35 illustrates a stream number table representing the relationship between an audio signal and a caption signal, each supplied to the user.

With reference to FIG. 35, audio numbers are referred to as A_SN (Audio Stream Number) and A_SN2, and a caption number is referred to as S_SN (SubPicture Stream Number). Each audio stream #1 entered in the STN_table ( ) of the PlayItem forming the Main Path in the PlayList (audio stream entered as audio_stream_id) is respectively assigned A_SN. Each audio stream #2 entered in the STN_table ( ) of the PlayItem forming the Main Path in the PlayList (audio stream entered as audio_stream_id2) is respectively assigned A_SN2.

More specifically, A_SN=1 is assigned to audio 2, and A_SN=2 is assigned to audio 1, and A_SN=3 is assigned to audio 3. Furthermore, A_SN2=1 is assigned to audio 4, and A_SN2=2 is assigned to audio 5. The user selects the audio stream #1 to be reproduced from among the audio streams assigned with A_SN, and selects the audio stream #2 to be mixed with the audio stream #1, from among the audio streams assigned with A_SN2. For example, the user selects the audio 1 of A_SN=2 and the audio 5 of A_SN2=2 as the audio streams to be reproduced.

If the user issues an instruction to switch audio with the audio 2 of A_SN=1 selected, audio is switched to the audio 1 of A_SN=2. If the user further issues an instruction to switch audio, audio is then switched to the audio 3 of A_SN=3. If the user issues an instruction to switch audio further again, audio is switched to the audio 2 of A_SN=1. If the user issues an instruction to switch audio with the audio 4 of A_SN2=1 selected, audio is switched to the audio 5 of A_SN2=2. If the user issues an instruction to switch audio again, audio is switched to the audio 4 of A_SN2=1. A_SN for selecting the audio stream #1 and A_SN2 for selecting the audio stream #2 are independently switched. More specifically, the user selects one audio stream from A_SN1 through A_SN=3, and one audio stream from A_SN2=1 through A_SN2=2.

The smaller the A_SN and A_SN2 number, the higher the priority of the audio signal supplied to the user becomes. The stream supplied by A_SN is higher in priority than the stream supplied by A_SN2. A_SN=1 is an audio stream to be reproduced at a default setting.

A sound reproduced based on the information of initial language setting in the reproducing apparatus corresponds to the audio 2 of A_SN=1 (FIG. 35). A sound reproduced when audio is switched corresponds to the audio 1 of A_SN=2 (FIG. 35).

Such a stream number table is provided in connection with the STN_table ( ) of the PlayItem ( ) referenced in the PlayList ( ) (FIG. 25). In order to enter the audio stream #1, the audio 2 is provided by audio_stream_id=0 (A_SN=1), the audio 1 is provided by audio_stream_id=1 (A_SN=2), and the audio 3 is provided by audio_stream_id=2 (A_SN=3). Next, in order to enter the audio stream #2 in the STN_table ( ) (FIG. 25), the audio 4 is provided by audio_stream_id2=0 (A_SN2=1), and the audio 5 is provided by audio_stream_id2=1 (A_SN2=2).

By defining the two playback audio streams (the audio stream #1 and the audio stream #2) separately, the user selects any two audio streams from among the defined audio streams. The user can freely select two playback audio streams (from among the audio streams defined by the audio stream #1 and the audio stream #2), thereby enjoying a high degree of freedom in selecting audio stream combination. For example, the user selects the audio 2 and the audio 4 in combination (combination of A_SN=1 and A_SN2=1), or the audio 2 and the audio 5 in combination (combination of A_SN=1 and A_SN2=2).

Since the two audio streams are entered in the stream_entry ( ) (for example, FIG. 26) of the STN_table ( ) in the PlayItem ( ) (FIG. 25), two audio streams can be mixed for playback. For example, two streams of the same type (audio streams in this case) from a plurality of types of streams can be mixed (superimposed or mixed) for simultaneous playback. The user may command two desired streams of the same type to be mixed for playback.

In the above discussion, the user is permitted to separately select the audio stream #1 to be decoded by the first audio decoder 75-1 and the audio stream #2 to be decoded by the second audio decoder 75-2 of the reproducing apparatus 20-2 of FIG. 41. A combination of the audio stream #1 and the audio stream #2 may be defined, and then the selection of the combination of streams may be left to the user in the mixing playback.

Syntax of a sound.bdmv file of a AUXDATA directory is described below with reference to FIG. 36.

The sound.bdmv file contains at least one effect sound for a stream of interactive graphics.

A SoundData_start_address field is a 32-bit field containing a head address of a SoundData ( ) block. A SoundIndex ( ) block contains information regarding attributes of effect sound of the SoundData ( ) as actual data of effect sound (such as the number of channels and frequency).

The SoundData ( ) as the actual data of effect sound is uncompressed audio data. The SoundData ( ) contains a content of an effect sound prepared separately from the sound stream, and designed to be output at a predetermined location, a content that is designed to work in response to an operation input from a user, e.g., in a manner such that playback data is modified in response to the operation input from the user, and data prepared as a click sound in an interactive content. The SoundData ( ) may not be included depending on content or part of content specified by a PlayList or a PlayItem. The SoundData ( ) may be mixed with the audio stream if a command to reproduce an effect sound is issued or when an operation input from the user is received.

The configuration and process of the reproducing apparatus 20 that outputs the above-referenced data for playback are described below.

Figure 37:
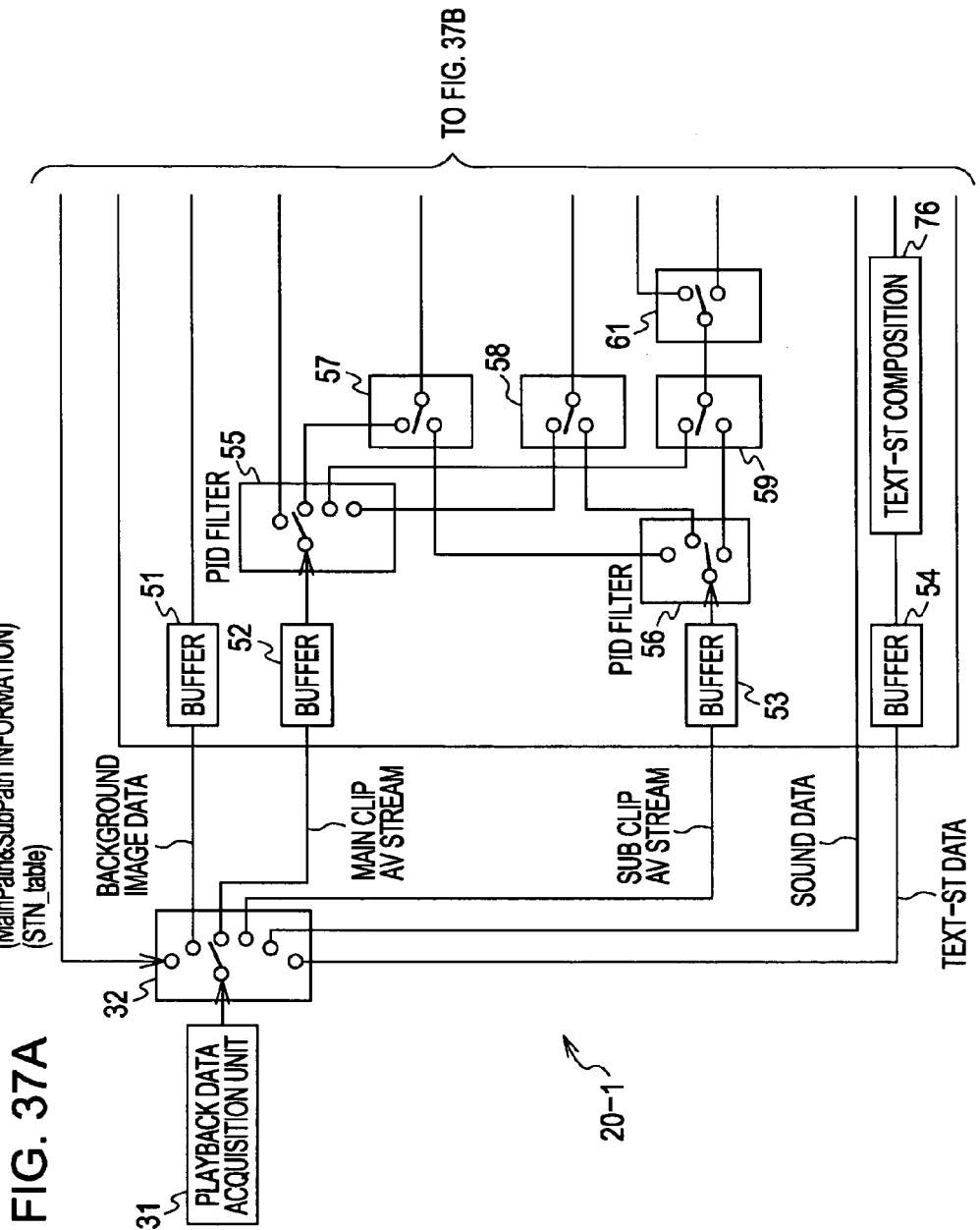
FIG. 37 is a block diagram illustrating a first structure of reproducing apparatus in accordance with one embodiment of the present invention.
Figure 37B:
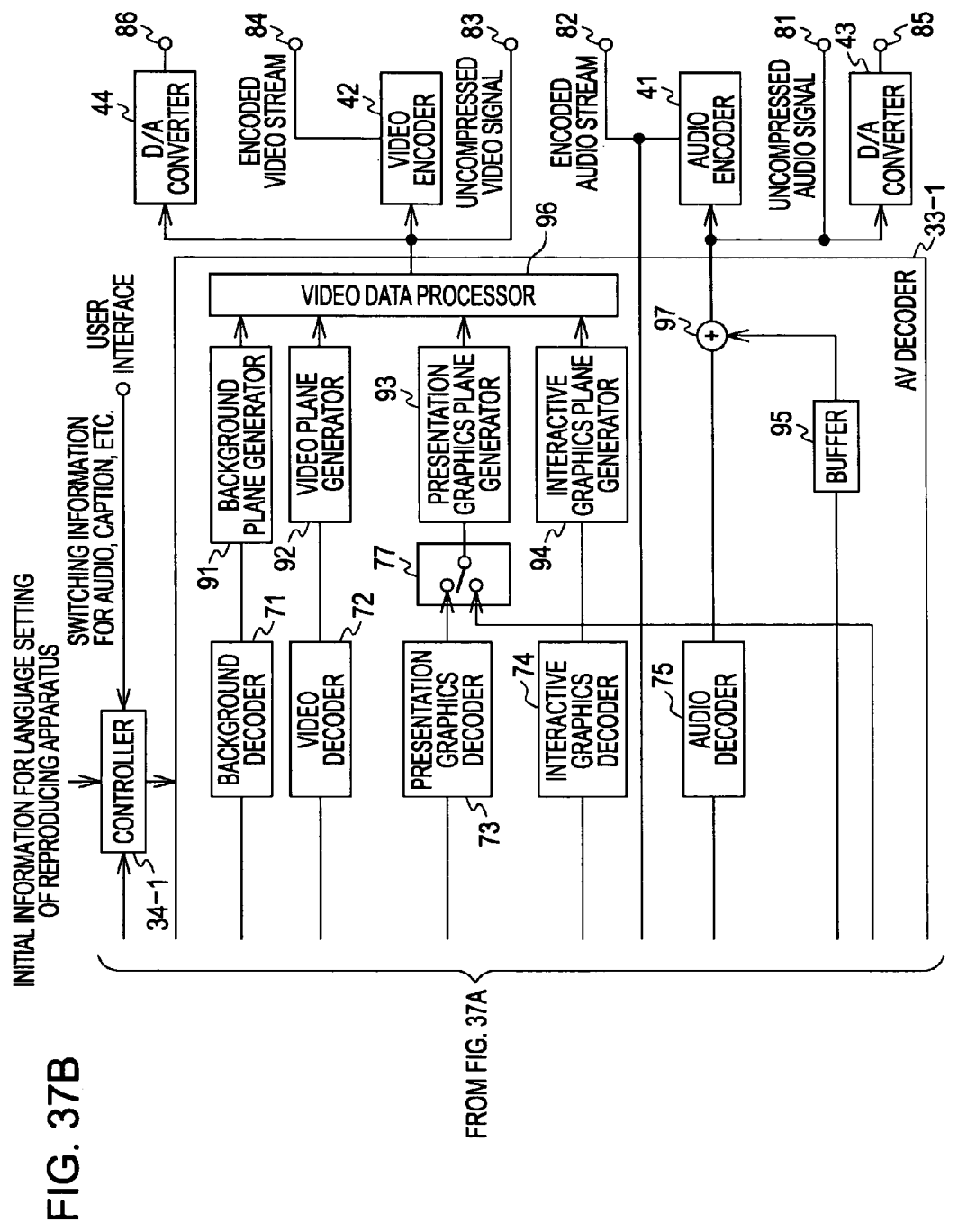

FIG. 37 is a block diagram illustrating the configuration of a reproducing apparatus 20-1 as one embodiment of the present invention. The reproducing apparatus 20-1 reproduces the PlayList having the above-referenced main path and sub path. The reproducing apparatus 20-1 can reproduce only the audio stream #1 and cannot reproduce the audio stream #2 regardless of whether the audio stream #2 given by audio_stream_id2 is present or not. The reproducing apparatus 20-1 can reproduce the audio stream #1 with the sound data mixed therewith.

The reproducing apparatus 20-1 includes a playback data acquisition unit 31, a switch 32, an AV decoder 33-1, a controller 34-1, an audio encoder 41, a video encoder 42, a D/A (digital-to-analog) converter 43, a D/A converter 44, an uncompressed audio signal interface 81, a compressed audio signal interface 82, an uncompressed video signal interface 83, a compressed video signal interface 84, an analog audio signal interface 85, and an analog video signal interface 86.

As shown in FIG. 37, the controller 34-1 reads an Index file via the playback data acquisition unit 31 such as a storage drive reading data from a loaded recording medium 21, a data drive reading data from a recording medium in the reproducing apparatus 20-1, or a network interface acquiring data via a network 22. In response to a generated command, the reproducing apparatus 20-1 reads a PlayList file, reads a PlayItem from information of the PlayList file, detects a Clip corresponding to the PlayItem, and then reads a corresponding AV stream and AV data based on ClipInfo. Using a user interface such as the remote commander 24, the user inputs a command to switch audio or caption to the controller 34-1. The controller 34-1 is supplied with information of initial language setting of the reproducing apparatus 20-1 from a storage (not shown).

The controller 34-1 controls the switch 61 based on the values of the is_MixApp flag and is_MixApp_2 flag, both of which are described in one of the Index file and the PlayList file (one of AppInfoPlayList ( ), PlayList ( ), and PlayItem) and indicate the presence or absence of the sound data to be mixed with the audio stream.

The PlayList file contains the STN_table ( ) besides information of the main path and the sub path. The controller 34-1 reads, from the recording medium 21 via the playback data acquisition unit 31, a main Clip AV stream file contained in a main Clip referenced by the PlayList contained in the PlayList file, a sub Clip AV stream file referenced by the SubPlayItem contained in a sub Clip, and text sub title data referenced by the SubPlayItem. The main Clip referenced by the PlayItem and the sub Clip referenced by the SubPlayItem may be stored in separate recording media. For example, the main Clip may be recorded on the recording medium 21 while the corresponding sub Clip may be supplied via the network 22 and stored on an hard disk (not shown) of a hard disk drive (HDD) in the reproducing apparatus 20-1. The controller 34-1 performs control process, selecting and reproducing an elementary stream corresponding to the playback function of own apparatus (reproducing apparatus 20-1), or selecting and reproducing an elementary stream corresponding to the information of initial language setting of the reproducing apparatus 20-1.

The AV decoder 33-1 includes buffers 51-54, PID filter 55, PID filter 56, switches 57-59, switch 61, background decoder 71, video decoder 72, presentation graphics decoder 73, interactive graphics decoder 74, audio decoder 75, text-ST composition 76, switch 77, background plane generator 91, video plane generator 92, presentation graphics plane generator 93, interactive graphics plane generator 94, buffer 95, video data processor 96, and mixer 97. Since the audio decoder 75 is the only audio decoder herein, the reproducing apparatus 20-1 can decode the audio stream #1 but cannot decode the audio stream #2. More specifically, the reproducing apparatus 20-1 can decode the audio stream identified by audio_stream_id in the STN_table ( ) of FIG. 25 but cannot decode the audio stream identified by audio_stream_id2. The video decoder 72 can use a variety of decode methods including MPEG2, MPEG4, H.264/AVC in response to a stream to be reproduced.

File data read by the controller 34-1 is decoded by an ECC decoder (not shown), and the decoded multiplexed stream is then subjected to an error correction process. Under the control of the controller 34-1, the switch 32 selects streams by type from the decoded and error-corrected data, and then supplies the streams to the respective buffers 51-54. More specifically, the switch 32 under the control of the controller 34-1 supplies the buffer 51 with background image data, the buffer 52 with data of a main Clip AV stream, the buffer 53 with data of a sub Clip AV stream, and the buffer 54 with data of Text-ST. The buffer 51 buffers the background image data, the buffer 52 buffers the data of the main Clip AV stream, the buffer 53 buffers the data of the sub Clip AV stream, and the buffer 54 buffers the Text-ST data.

The main Clip AV stream is a stream (such as a transport stream) into which video, and at least one of audio, bit-map caption (presentation graphics stream), and interactive graphics are multiplexed. The sub Clip AV stream is a stream into which at least one of audio, bit-map caption (presentation graphics stream), and interactive graphics is multiplexed. The data text sub title data file (Text_ST) may or may not be in a multiplexed stream form such as a transport stream.

The playback data acquisition unit 31 may read the files of the main Clip AV stream, the sub Clip AV stream and the text sub title data in a time-division manner. Alternatively, the playback data acquisition unit 31 may read beforehand the sub Clip AV stream and the text sub title data before reading the main Clip AV stream, and pre-load the read sub Clip AV stream and the text sub title data onto buffers (the buffer 53 and the buffer 54).

The stream data read from the buffer 52 as a main Clip AV stream read buffer is output to the subsequent-stage PID (packet ID) filter 55 at a predetermined timing. The PID filter 55 sorts the input main Clip AV stream into streams by PID (packet ID) and outputs the sorted streams to respective decoders for elementary streams. More specifically, the PID filter 55 supplies a presentation graphics stream to the switch 57 serving as a supply source to the presentation graphics decoder 73, an interactive graphics stream to the switch 58 serving as a supply source to an interactive graphics decoder 74, or an audio stream to the switch 59 serving as a supply source to the audio decoder 75.

For example, the presentation graphics stream is bit-map caption data and the text sub title data is text caption data.

The stream data read from the buffer 53 serving as a sub Clip AV stream read buffer is output to the subsequent-stage PID (packet ID) filter 56. The PID filter 56 sorts the input sub Clip AV stream by PID, and outputs the sorted streams to the respective decoders of the elementary streams. More specifically, the PID filter 56 supplies a presentation graphics stream to the switch 57 serving as a supply source to the presentation graphics decoder 73, an interactive graphics stream to the switch 58 serving as a supply source to the interactive graphics decoder 74, or an audio stream to the switch 59 serving as a supply source to the audio decoder 75.

The data read from the buffer 51 for buffering background image data is supplied to the background decoder 71 at a predetermined timing. The background decoder 71 decodes the background image data and supplies the decoded background image data to the background plane generator 91.

The video data stream sorted by the PID filter 55 is supplied to the subsequent video decoder 72. The video decoder 72 decodes the video stream, and outputs the decoded video stream to the video plane generator 92.

The switch 57 selects one from the presentation graphics stream contained in the main Clip supplied from the PID filter 55 and the presentation graphics stream contained in the sub Clip, and supplies the selected presentation graphics stream to the subsequent presentation graphics decoder 73. The presentation graphics decoder 73 decodes the presentation graphics stream and supplies the data of the decoded presentation graphics stream to the switch 77 serving as a supply source to the presentation graphics plane generator 93.

The switch 58 selects one from the interactive graphics stream contained in the main Clip supplied from the PID filter 55 and the interactive graphics stream contained in the sub Clip, and supplies the selected interactive graphics stream to the subsequent interactive graphics decoder 74. The interactive graphics stream supplied to the interactive graphics decoder 74 is a stream separated from the main Clip AV stream or the sub Clip AV stream. The interactive graphics decoder 74 decodes the interactive graphics stream and supplies data of the decoded interactive graphics stream to the interactive graphics plane generator 94.

The switch 59 selects one from the audio stream contained in the main Clip supplied from the PID filter 55 and the audio stream contained in the sub Clip, and supplies the selected audio stream to the subsequent switch 61.

The switch 61 under the control of the controller 34-1 supplies the received audio data to one of the audio decoder 75 and the compressed audio signal interface 82.

The audio decoder 75 decodes the audio stream, and supplies the decoded audio stream to the mixer 97.

Sound data selected by the switch 32 is supplied to the buffer 95 for buffering. The buffer 95 supplies the sound data to the mixer 97 at a predetermined timing. In this case, the sound data is menu-selected sound effect data. The mixer 97 mixes (superimposes, or mixes) the audio data supplied from the audio decoder 75 and the sound data supplied from the buffer 95, and outputs the mixed data as an audio signal.

Data read from the buffer 54 serving as the text sub title read buffer is output to the subsequent text sub title composition decoder 76 at a predetermined timing. The text sub title composition decoder 76 decodes the Text-ST data and supplies the decoded Text-ST data to the switch 77.

The switch 77 selects between the presentation graphics stream decoded by the presentation graphics decoder 73 and the text sub title data. Caption image supplied to the presentation graphics plane generator 93 is one of the output of the presentation graphics decoder 73 and the output of the text sub title composition decoder 76. The presentation graphics stream input to the presentation graphics decoder 73 is the stream separated from one of the main Clip AV stream and the sub Clip AV stream (as selected by the switch 57). The caption image output to the presentation graphics plane generator 93 is one of the presentation graphics stream from the main Clip AV stream, the presentation graphics stream from the sub Clip AV stream, and the decoded output of the text sub title data.

In response to the background image data supplied from the background decoder 71, the background plane generator 91 generates a background plane serving as a wall-paper image appearing when a video image is scale-contracted, and supplies the background plane to the video data processor 96. In response to the video data supplied from the video decoder 72, the video plane generator 92 generates a video plane and supplies the generated video plane to the video data processor 96. In response to data selected and supplied by the switch 77 (one of the presentation graphics stream and the text sub title data), the presentation graphics plane generator 93 generates a presentation graphic plane serving as a rendering image, and supplies the generated presentation graphic plane to the video data processor 96. In response to data of an interactive graphics stream supplied from the interactive graphics decoder 74, the interactive graphics plane generator 94 generates an interactive graphics plane and then supplies the generated interactive graphics plane to the video data processor 96.

The video data processor 96 mixes the background plane from the background plane generator 91, the video plane from the video plane generator 92, the presentation graphic plane from the presentation graphics plane generator 93, and the interactive graphics plane from the interactive graphics plane generator 94, and outputs the mixed plane as a video signal.

The switches 57-59 and 77 operate for switching in response to an operation input from the user via a user interface or in response to a file containing data to be processed. For example, if the audio data is contained in only the sub Clip AV stream, the switch 59 is turned to the sub side selection.

The audio encoder 41 encodes uncompressed audio data supplied from the mixer 97, and supplies the encoded audio data to the compressed audio signal interface 82. The video encoder 42 encodes an uncompressed video signal supplied from the video data processor 96 and supplies the encoded signal to the compressed video signal interface 84. The D/A converter 43 converts a digital signal as uncompressed audio data from the mixer 97 into an analog signal, and supplies the resulting analog signal to the analog audio signal interface 85. The D/A converter 44 converts a digital signal as uncompressed digital video signal supplied from the video data processor 96 into an analog signal, and then supplies the resulting analog signal to the analog video signal interface 86. The uncompressed audio signal interface 81 outputs the uncompressed audio data supplied from the mixer 97 to the outside of the apparatus. The compressed audio signal interface 82 outputs a compressed audio signal supplied from one of the audio encoder 41 and the switch 61 to the outside of the apparatus. The uncompressed video signal interface 83 outputs an uncompressed video signal supplied from the video data processor 96 to the outside of the apparatus. The compressed video signal interface 84 outputs a compressed video signal supplied from the video encoder 42 to the outside of the apparatus. The analog audio signal interface 85 outputs an analog audio signal supplied from the D/A converter 43 to the outside of the apparatus. The analog video signal interface 86 outputs an analog video signal supplied from the D/A converter 44 to the outside of the apparatus.

The reproducing apparatus 20-1 performs a playback process 1 to reproduce data when a flag indicating the presence of the other audio data to be mixed with the audio stream #1 is described in the Indexes ( ) of the Index file. The playback process 1 is described below with reference to a flowchart of FIG. 38.

In step S1, the controller 34-1 determines whether an output from the reproducing apparatus 20-1 is an encoded stream. If it is determined in step S1 that the output from the reproducing apparatus 20-1 is not an encoded stream, processing proceeds to step S24.

If it is determined in step S1 that the output from the reproducing apparatus 20-1 is an encoded stream, the controller 34-1 reads an Index file supplied from the switch 32 in step S2.

In step S3, the controller 34-1 determines whether an is_MixApp flag or an is_MixApp_2 flag, each described in the Indexes ( ) and indicating the presence of the sound data, is 1.

In a content having the audio stream #2 identified by audio_stream_id2 in addition to the audio stream #1 identified by audio_stream_id, the is_MixApp_1 flag indicating the presence of the audio stream #2 is described in addition to the is_MixApp_2 flag indicating the presence of the sound data. However, the reproducing apparatus 20-1 has no function to reproduce the audio stream #2 identified by audio_stream_id2. In step S3, the reproducing apparatus 20-1 detects only the flag value of the is_MixApp flag or the is_MixApp_2 flag, and does not reference the is_MixApp_1 flag even if the is_MixApp_1 flag is written in the read data. In other words, the value of the is_MixApp_1 flag does not affect the control of the switch 61 in the reproducing apparatus 20-1.

If it is determined in step S3 that one of the is_MixApp flag and the is_MixApp_2 flag is 1, processing proceeds to step S14 to be discussed later.

If it is determined in step S3 that one of the is_MixApp flag and the is_MixApp_2 flag is not 1, the data related to the Index file does not contain the sound data to be mixed with the audio stream #1 in the reproducing apparatus 20-1. In step S4, the controller 34-1 controls the switch 61 to supply the audio data relating to the Index file to the compressed audio signal interface 82 serving as an output terminal for the compressed (encoded) audio signal.

In step S5, the controller 34-1 determines whether a command generated in response to an operation input from the user is issued to read a PlayList file (such as xxxxx.mpls of FIG. 13). If it is determined in step S5 that the read command to read the PlayList file has not been issued, step S5 is repeated until it is determined the read command to read the PlayList file has been issued.

If it is determined in step S5 that the read command to read the PlayList file has been issued, the controller 34-1 reads in step S6 the PlayList file supplied from the switch 32.

In step S7, the controller 34-1 reads a PlayItem specified by a PlayList (PlayList ( ) of FIG. 13) described in the PlayList file, reads corresponding main Clip AV stream, sub Clip AV stream and text sub title data and supplies the read data to the switch 32.

In step S8, the controller 34-1 supplies the read data to corresponding buffers for buffering. More specifically, the controller 34-1 controls the switch 32 to supply the background image data to the buffer 51, the main Clip AV stream to the buffer 52, the sub Clip AV stream to the buffer 53, and the text sub title data to the buffer 54. The buffer 51-54 buffer the supplied data thereof. More specifically, the buffer 51 buffers the background image data, the buffer 52 buffers the main Clip AV stream, the buffer 53 buffers the sub Clip AV stream, and the buffer 54 buffers the text sub title data.

In step S9, the controller 34-1 controls the PID filters 55 and 56, and the switches 57-59, thereby decoding the video-based data with predetermined decoders, and processing the decoded data with the video data processor 96.

In step S10, the video encoder 42 encodes the processed video data supplied from the video data processor 96.

In step S11, the compressed audio signal interface 82 serving as the output terminal of the compressed (encoded) audio signal outputs, to the outside of the apparatus, the audio stream #1 as the encoded audio data output from the switch 61. The compressed video signal interface 84 serving as the output terminal of the compressed (encoded) video signal outputs the encoded video data to the outside of the apparatus.

The compressed (encoded) audio data output from the compressed audio signal interface 82 in step S11 is not degraded in audio quality because the AV decoder 33-1 of the reproducing apparatus 20-1 has performed no decode process.

In step S12, the controller 34-1 references the PlayList to determine whether a next PlayItem to be reproduced is present. If it is determined in step S12 that there is a next PlayItem, processing returns to step S7 to repeat step S7 and subsequent steps.

If it is determined in step S12 that there is no next PlayItem, the controller 34-1 determines in step S13 whether the playback process is to end. If it is determined in step S13 that the playback process is not to end, processing returns to step S5 to repeat step S5 and subsequent steps. If it is determined in step S13 that the playback process is to end, processing ends.

If it is determined in step S3 that one of the is_MixApp flag and the is_MixApp_2 flag is 1, the data related to the Index file contains the sound data to be mixed with the audio stream #1 by the reproducing apparatus 20-1. In step S14, the controller 34-1 controls the switch 61 to supply the audio stream #1 related to the Index file to the audio decoder 75.

Steps S15 through S19 are basically identical to steps S5 through S9, respectively. More specifically, the controller 34-1 determines whether a command generated in response to an operation input from the user is issued to read a PlayList file. If it is determined that the read command to read the PlayList file has been issued, the PlayList is read, and the PlayItem specified by the PlayList is read. Clip data (AV stream) corresponding to the read PlayItem is supplied to the corresponding buffer for buffering. The PID filters and the switches are controlled so that the buffered video-based data is decoded by the corresponding decoders and then processed by the video data processor 96.

In step S20, the controller 34-1 controls the PID filters and the switches to supply the audio stream #1 buffered by the buffer 53 to the audio decoder 75 via the switch 61 for decoding, and controls the mixer 97 to perform, as necessary, a mixing process to mix the decoded data with the sound data buffered on the buffer 95.

Since the switch 61 is controlled to decode the audio stream #1 with the audio decoder 75, the audio stream #1 and the sound data are mixed.

In step S21, the audio encoder 41 encodes the mixed uncompressed audio data, and supplies the encoded (compressed) audio data to the compressed audio signal interface 82 to be output to the outside of the apparatus. The video encoder 42 encodes the uncompressed video data processed by the video data processor 96, and supplies the encoded (compressed) video data to the compressed video signal interface 84 to be output to the outside of the apparatus.

In step S22, the controller 34-1 references the PlayList to determine whether a next PlayItem to be reproduced is present. If it is determined in step S22 that a next PlayItem is present, processing returns to step S17 to repeat step S17 and subsequent steps.

If it is determined in step S22 that no next PlayItem is present, the controller 34-1 determines in step S23 whether the playback process is to end. If it is determined in step S23 that the playback process is not to end, processing returns to step S15 to repeat step S15 and subsequent steps. If it is determined in step S23 that the playback process is to end, processing ends.

If it is determined in step S1 that the output from the reproducing apparatus 20-1 is not an encoded stream, the controller 34-1 controls in step S24 the switch 61 to supply the supplied audio stream #1 to the audio decoder 75.

If the output is not an encoded stream, the audio stream #1 is decoded regardless of whether the sound data to be mixed with the audio stream #1 is available or not.

Steps S25 through S30 are substantially identical to steps S15 through S20, respectively. More specifically, the controller 34-1 determines whether a command generated in response to an operation input from the user is issued to read a PlayList file. If it is determined that the read command to read the PlayList file has been issued, the PlayList is read, and the PlayItem specified by the PlayList is read. Clip data (AV stream) corresponding to the read PlayItem is supplied to the corresponding buffer for buffering. The PID filters and the switches are controlled so that the buffered video-based data is decoded by the corresponding decoders and then processed by the video data processor 96. Furthermore, the PID filters and the switches are controlled so that the data buffered on the buffer 53 is supplied to the audio decoder 75 to be decoded there. If the sound data is supplied to and present on the buffer 95, the mixer 97 performs the mixing process as appropriate.

In step S31, the uncompressed audio signal interface 81 outputs the processed uncompressed audio data supplied from the mixer 97 to the outside of the apparatus. The uncompressed video signal interface 83 outputs the uncompressed video data supplied from the video data processor 96 to the outside of the apparatus. The D/A converter 43 digital-to-analog converts the uncompressed audio data. The analog audio signal interface 85 outputs the analog signal to the outside of the apparatus. The D/A converter 44 digital-to-analog converts the uncompressed video data. The analog video signal interface 86 outputs the analog signal to the outside of the apparatus.

In step S32, the controller 34-1 references the PlayList to determine whether a next PlayItem to be reproduced is present. If it is determined in step S32 that a next PlayItem is present, processing returns to step S27 to repeat step S27 and subsequent steps.

If it is determined in step S32 that no next PlayItem is present, the controller 34-1 determines in step S33 whether the playback process is to end. If it is determined in step S33 that the playback process is not to end, processing returns to step S25 to repeat step S25 and subsequent steps. If it is determined in step S33 that the playback process is to end, processing ends.

In the above process, the reproducing apparatus 20-1 references the flags described in the Indexes ( ). If the data referenced by Indexes ( ) contains no sound data, the audio stream #1 is output to the outside of the apparatus as compressed (encoded) data without being decoded. The audio stream #1 is thus free from audio quality degradation.

In the above process, the controller 34-1 determines at the earlier stage of the process whether the output is compressed data or uncompressed data, and then references the flags to determine whether to perform the mixing process. Alternatively, the flags may be referenced first to determine whether to perform the mixing process, and then whether the output signal is compressed data or uncompressed data may be determined. In this arrangement, the process is not essentially changed in the content thereof but in mere sequential order thereof.

The reproducing apparatus 20-1 performs a playback process 2 to reproduce data when a flag indicating the presence of the other audio data to be mixed with the audio stream #1 is described in the PlayList. The playback process 2 is described below with reference to a flowchart of FIG. 39.

In step S61, the controller 34-1 determines whether an output from the reproducing apparatus 20-1 is an encoded stream. If it is determined in step S61 that the output from the reproducing apparatus 20-1 is not an encoded stream, processing proceeds to step S82 as will be discussed later.

If it is determined in step S61 that the output from the reproducing apparatus 20-1 is an encoded stream, the controller 34-1 reads an Index file supplied from the switch 32 in step S62.

In step S63, the controller 34-1 determines whether a command generated in response to an operation input from the user is issued to read a PlayList file (such as xxxxx.mpls of FIG. 13). If it is determined in step S63 that the read command to read the PlayList file has not been issued, step S63 is repeated until it is determined the read command to read the PlayList file has been issued.

If it is determined in step S63 that the read command to read the PlayList file has been issued, the controller 34-1 reads in step S64 the PlayList file supplied from the switch 32.

In step S65, the controller 34-1 determines whether an is_MixApp flag or an is_MixApp_2 flag, each described in the AppInfoPlayList ( ) or PlayList ( ) and indicating the presence of the sound data, is 1.

In a content having the audio stream #2 identified by audio_stream_id2 in addition to the audio stream #1 identified by audio_stream_id, the is_MixApp_1 flag indicating the presence of the audio stream #2 is described in addition to the is_MixApp_2 flag indicating the presence of the sound data. However, the reproducing apparatus 20-1 has no function to reproduce the audio stream #2 identified by audio_stream_id2. The reproducing apparatus 20-1 detects only the flag value of the is_MixApp_2 flag, and does not reference the value of the is_MixApp_1 flag even if the is_MixApp_1 flag is written in the read data.

If it is determined in step S65 that one of the is_MixApp flag and the is_MixApp_2 flag is 1, processing proceeds to step S74 to be discussed later.

If it is determined in step S65 that one of the is_MixApp flag and the is_MixApp_2 flag is not 1, the data related to the PlayList file does not contain the sound data to be mixed with the audio stream #1 in the reproducing apparatus 20-1. In step S66, the controller 34-1 controls the switch 61 to supply the audio data relating to the PlayList file to the compressed audio signal interface 82 serving as an output terminal for the compressed (encoded) audio signal.

Figure 38:
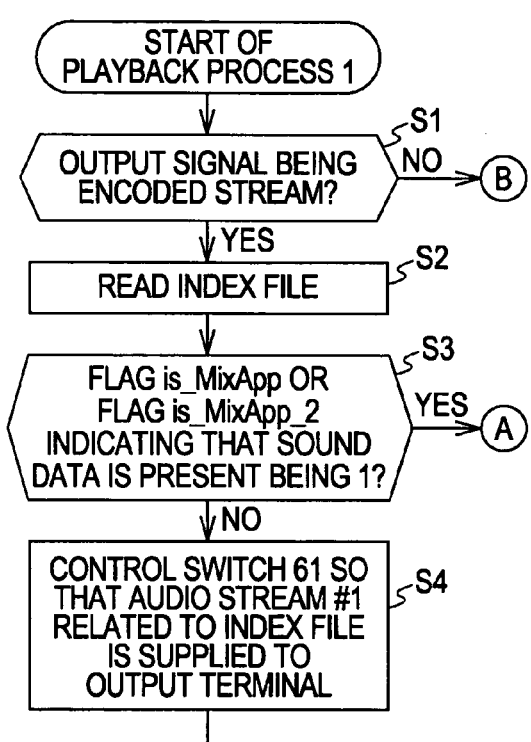
FIG. 38 is a flowchart illustrating a playback process 1.
Figure 38A:
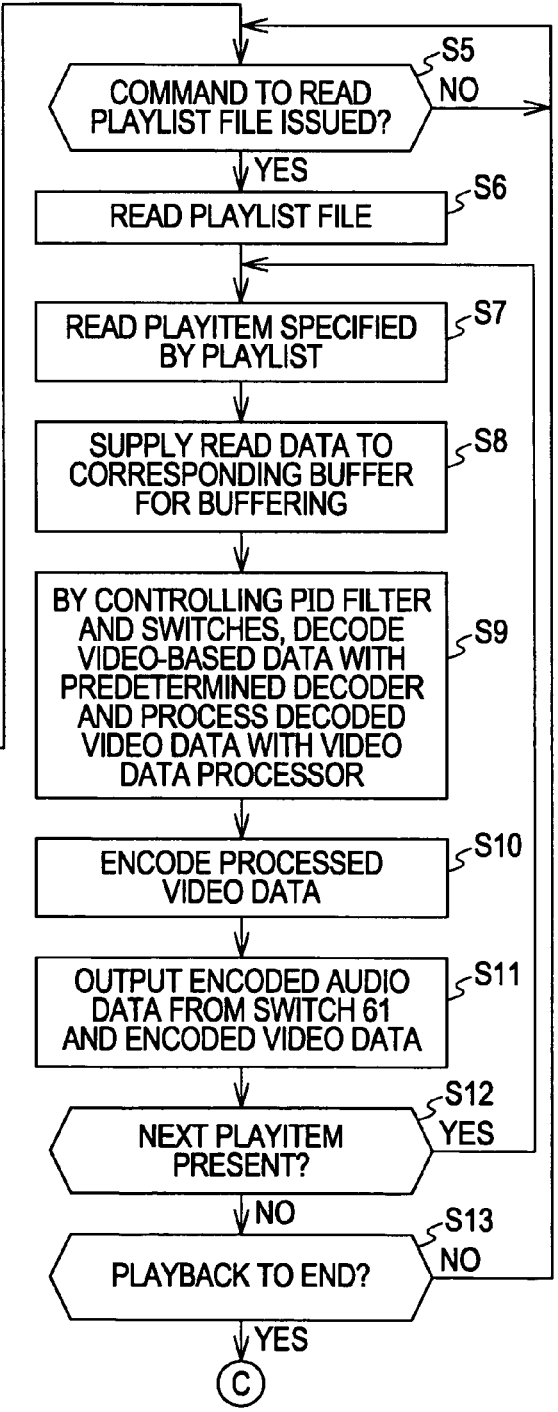
Figure 38B:
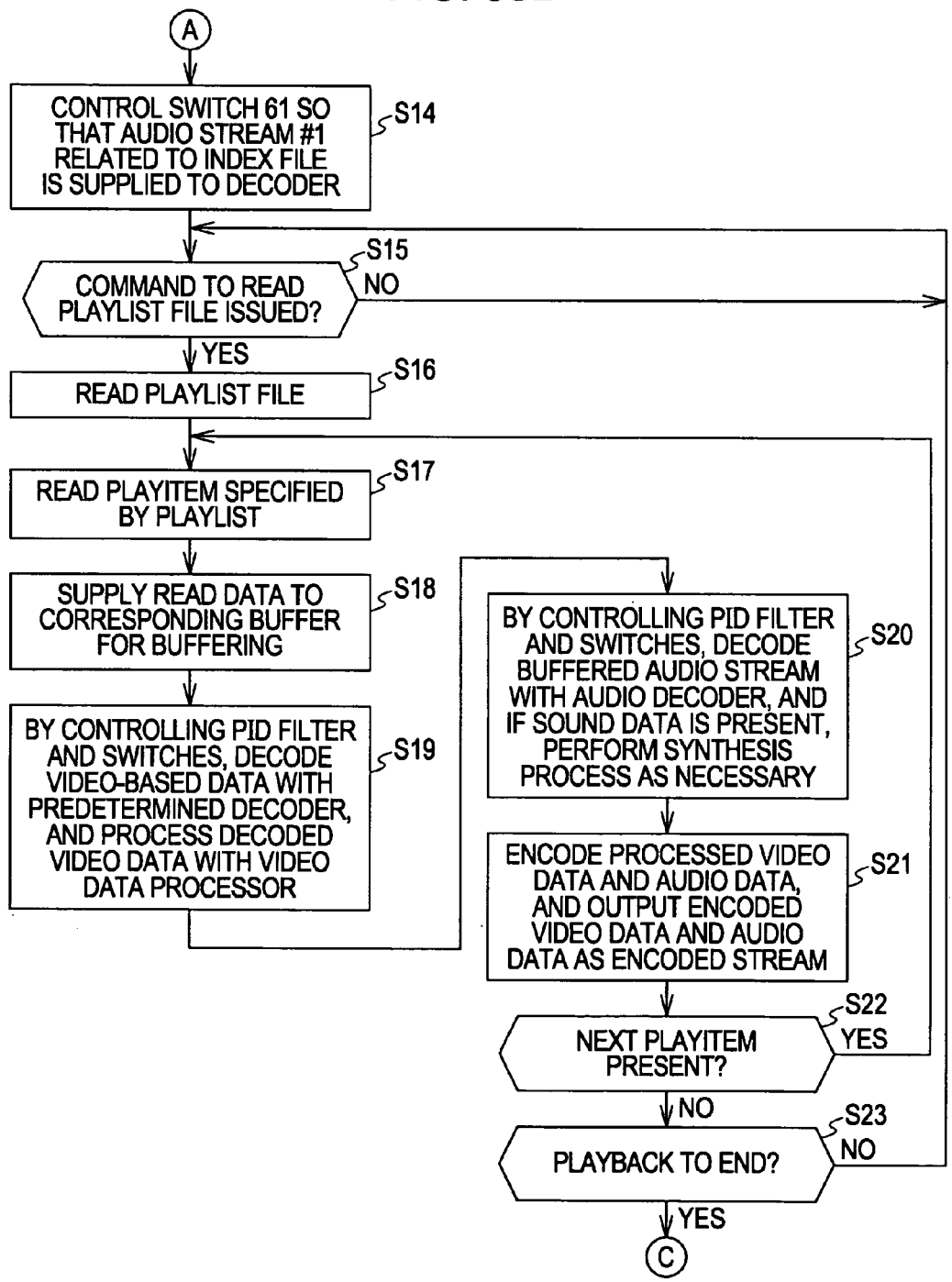

Steps S67 through S71 are substantially identical to steps S7 through S11 of FIG. 38, respectively.

More specifically, the PlayItem specified by the PlayList is read. The data of the corresponding Clip (AV stream) is read and supplied to the switch 32 so that the read data is supplied to the corresponding buffers for buffering. The PID filters 55 and 56 and the switches 57-59 are controlled so that the video-based data is decoded by the corresponding decoders, and then processed by the video data processor 96. The processed data is then encoded. The encoded audio data output from the switch 61 is output to the outside of the apparatus via the compressed audio signal interface 82. The encoded video data is output to the outside of the apparatus via the compressed video signal interface 84.

Since the compressed (encoded) audio data output from the compressed audio signal interface 82 in step S71 has not been decoded by the AV decoder 33-1 in the reproducing apparatus 20-1, audio quality is not degraded.

In step S72, the controller 34-1 references the PlayList to determine whether a next PlayItem to be reproduced is present. If it is determined in step S72 that there is a next PlayItem, processing returns to step S67 to repeat step S67 and subsequent steps.

If it is determined in step S72 that there is no next PlayItem, the controller 34-1 determines in step S73 whether the playback process is to end. If it is determined in step S73 that the playback process is not to end, processing returns to step S63 to repeat step S63 and subsequent steps. Control of the switch 61 may change depending on the value of the flag described in the PlayList to be read next. If it is determined in step S73 that the playback process is to end, processing ends.

If it is determined in step S65 that one of the is_MixApp flag and the is_MixApp_2 flag is 1, the data related to the PlayList file contains the sound data to be mixed with the audio stream #1 by the reproducing apparatus 20-1. In step S74, the controller 34-1 controls the switch 61 to supply the audio stream #1 related to the PlayList file to the audio decoder 75. The audio decoder 75 decodes the audio data related to the PlayList file.

Steps S75 through S79 are basically identical to steps S17 through S21 of FIG. 38, respectively. More specifically, the PlayItem specified by the PlayList is read. The data of the corresponding Clip (AV stream) is read, and then supplied to the corresponding buffers for buffering. The PID filters and the switches are controlled so that the buffered video-based data is decoded by the corresponding decoders, and the decoded data is processed by the video data processor 96.

The PID filters and the switches are controlled so that the audio stream #1 buffered on the buffer 53 is supplied to the audio decoder 75 via the switch 61 to be decoded. The mixer 97 mixes the decoded data with the sound data buffered on the buffer 95. Since the switch 61 is controlled so that the audio stream #1 is decoded by the audio decoder 75, the audio stream #1 and the sound data are mixed.

The mixed uncompressed audio data is encoded and then output to the outside of the apparatus via the compressed audio signal interface 82. The uncompressed video data processed by the video data processor 96 is encoded, and then output to the outside of the apparatus via the compressed video signal interface 84.

In step S80, the controller 34-1 references the PlayList to determine whether there is a next PlayItem. If it is determined in step S80 that there is a next PlayItem, processing returns to step S75 to repeat step S75 and subsequent steps.

If it is determined in step S80 that no next PlayItem is present, the controller 34-1 determines in step S81 whether the playback process is to end. If it is determined in step S81 that the playback process is not to end, processing returns to step S63 to repeat step S63 and subsequent steps. Control of the switch 61 may change depending on the value of the flag described in the PlayList to be read next. If it is determined in step S81 that the playback process is to end, processing ends.

If it is determined in step S61 that the output from the reproducing apparatus 20-1 is not an encoded stream, steps S82-S91, respectively substantially identical to steps S24-S33 of FIG. 38, are performed.

More specifically, if the output is not an encoded stream, the audio stream #1 is decoded regardless of whether the sound data to be mixed with the audio stream #1 is present or not. The switch 61 is thus controlled so that the audio stream #1 is supplied to the audio decoder 75. The controller 34-1 determines whether the read command to read the PlayList has been issued. If the controller 34-1 determines that the read command has been issued, the PlayList is read. The PlayItem specified by the PlayList is read, and the data of the corresponding Clip is then read. The read data is supplied to the corresponding buffer for buffering. The PID filters and the switches are controlled so that the buffered video-based data is decoded by the corresponding decoder, and the decoded data is then processed by the video data processor 96. Furthermore, the PID filters and the switches are controlled so that the audio stream #1 buffered on the buffer 53 is supplied to the audio decoder 75 via the switch 61 to be decoded. If the sound data is supplied to and present on the buffer 95, the mixer 97 performs the mixing process on the decoded data and the sound data.

The uncompressed audio signal interface 81 outputs processed uncompressed audio data supplied from the mixer 97 to the outside of the apparatus. The uncompressed video signal interface 83 outputs the uncompressed video data supplied from the video data processor 96 to the outside of the apparatus. The D/A converter 43 digital-to-analog converts the uncompressed audio data. The analog audio signal interface 85 outputs the analog signal to the outside of the apparatus. The D/A converter 44 digital-to-analog converts the uncompressed video data. The analog video signal interface 86 outputs the analog signal to the outside of the apparatus.

It is determined whether there is a next PlayItem to be reproduced. If it is determined that there is a next PlayItem, processing returns to step S85 to repeat step S85 and subsequent steps. If it is determined that there is no next PlayItem, the controller 34-1 determines whether the playback process is to end. If it is determined that the playback process is not to end, processing returns to step S83. If it is determined that the playback process is to end, processing ends.

In the above process, the reproducing apparatus 20-1 references the flags described in the PlayList file. If the data referenced by the PlayList contains no sound data, the reproducing apparatus 20-1 outputs the audio stream #1 to the outside of the apparatus as the compressed (encoded) data without being decoded. Audio quality is thus free from degradation. If the flags are described in one of the AppInfoPlayList ( ) and PlayList ( ) in the PlayList file, whether the sound data is contained is set on a per PlayList basis. Thus, freedom of authoring is increased.

In the above-referenced process as well, the controller 34-1 determines at the earlier stage of the process whether the output is compressed data or uncompressed data, and then references the flags to determine whether to perform the mixing process. Alternatively, the flags may be referenced first to determine whether to perform the mixing process, and then whether the output signal is compressed data or uncompressed data may be determined. In this arrangement, the process is not essentially changed in the content thereof but in mere sequential order thereof.

The reproducing apparatus 20-1 performs a playback process 3 to reproduce data when a flag indicating the presence of the other audio data to be mixed with the audio stream #1 is described in the PlayItem. The playback process 3 is described below with reference to a flowchart of FIG. 40.

In step S131, the controller 34-1 determines whether an output from the reproducing apparatus 20-1 is an encoded stream. If it is determined in step S131 that the output from the reproducing apparatus 20-1 is not an encoded stream, processing proceeds to step S151 as will be discussed later.

If it is determined in step S131 that the output from the reproducing apparatus 20-1 is an encoded stream, the controller 34-1 reads an Index file supplied from the switch 32 in step S132.

In step S133, the controller 34-1 determines whether a command generated in response to an operation input from the user is issued to read a PlayList file (such as xxxxx.mpls of FIG. 13). If it is determined in step S133 that the read command to read the PlayList file has not been issued, step S133 is repeated until it is determined the read command to read the PlayList file has been issued.

If it is determined in step S133 that the read command to read the PlayList file has been issued, the controller 34-1 reads in step S134 the PlayList file supplied from the switch 32.

In step S135, the controller 34-1 reads the PlayItem specified by the PlayList (PlayList ( ) of FIG. 13) described in the PlayList file. In accordance with the PlayItem, the controller 34-1 controls the playback data acquisition unit 31, thereby reading corresponding main Clip AV stream, sub Clip AV stream, and text sub title data, and supplying the switch 32 with these pieces of data.

In step S136, the controller 34-1 determines whether an is_MixApp flag or an is_MixApp_2 flag, each described in the PlayItem and indicating the presence of the sound data, is 1.

In a content having the audio stream #2 identified by audio_stream_id2 in addition to the audio stream #1 identified by audio_stream_id, the is_MixApp_1 flag indicating the presence of the audio stream #2 is described in addition to the is_MixApp_2 flag indicating the presence of the sound data. However, the reproducing apparatus 20-1 has no function to reproduce the audio stream #2 identified by audio_stream_id2. In step S136, the reproducing apparatus 20-1 detects only the flag value of the is_MixApp flag or the is_MixApp_2 flag, and does not reference the value of the is_MixApp_1 flag even if the is_MixApp_1 flag is written in the read data.

If it is determined in step S136 that one of the is_MixApp flag and the is_MixApp_2 flag is 1, processing proceeds to step S144 to be discussed later.

If it is determined in step S136 that one of the is_MixApp flag and the is_MixApp_2 flag is not 1, the audio data related to the Index file does not contain the sound data to be mixed with the audio stream #1 in the reproducing apparatus 20-1. In step S137, the controller 34-1 controls the switch 61 to supply the audio stream #1 related to the PlayItem to the compressed audio signal interface 82 serving as an output terminal for an compressed (encoded) audio signal.

Steps S137 through S141 are substantially identical to steps S8 through S11 of FIG. 38, respectively.

More specifically, the read data is supplied to the corresponding buffers for buffering. The PID filters 55 and 56 and the switches 57-59 are controlled so that the video-based data is decoded by the corresponding decoders, and then processed by the video data processor 96. The processed data is then encoded. The audio stream #1 as the encoded audio data from the switch 61 is output to the outside of the apparatus via the compressed audio signal interface 82. The encoded video data is output to the outside of the apparatus via the compressed video signal interface 84.

Since the compressed (encoded) audio data output from the compressed audio signal interface 82 in step S141 has not been decoded by the AV decoder 33-1 in the reproducing apparatus 20-1, audio quality is not degraded.

In step S142, the controller 34-1 references the PlayList to determine whether a next PlayItem to be reproduced is present. If it is determined in step S142 that there is a next PlayItem, processing returns to step S135 to repeat step S135 and subsequent steps. Control of the switch 61 may change depending on the value of the flag described in the PlayItem to be read next.

If it is determined in step S142 that there is no next PlayItem, the controller 34-1 determines in step S143 whether the playback process is to end. If it is determined in step S143 that the playback process is not to end, processing returns to step S133 to repeat step S133 and subsequent steps. If it is determined in step S143 that the playback process is to end, processing ends.

If it is determined in step S136 that one of the is_MixApp flag and the is_MixApp_2 flag is 1, the data related to the PlayItem file contains the sound data to be mixed with the audio stream #1 by the reproducing apparatus 20-1. In step S144, the controller 34-1 controls the switch 61 to supply the audio stream #1 related to the PlayItem file to the audio decoder 75.

Steps S145 through S148 are basically identical to steps S18 through S21 of FIG. 38, respectively. More specifically, the read data is supplied to the corresponding buffers for buffering. The PID filters and the switches are controlled so that the buffered video-based data is decoded by the corresponding decoders, and the decoded data is processed by the video data processor 96.

The PID filters and the switches are controlled so that the audio stream #1 buffered on the buffer 53 is supplied to the audio decoder 75 via the switch 61 to be decoded. The mixer 97 mixes the decoded data with the sound data buffered on the buffer 95. Since the switch 61 is controlled so that the audio stream #1 is decoded by the audio decoder 75, the audio stream #1 and the sound data are mixed.

The mixed uncompressed audio data is encoded and then output to the outside of the apparatus via the compressed audio signal interface 82. The uncompressed video data processed by the video data processor 96 is encoded, and then output to the outside of the apparatus via the compressed video signal interface 84.

In step S149, the controller 34-1 references the PlayList to determine whether there is a next PlayItem. If it is determined in step S149 that there is a next PlayItem, processing returns to step S135 to repeat step S135 and subsequent steps. Control of the switch 61 may change depending on the value of the flag described in the PlayItem to be read next.

If it is determined in step S149 that no next PlayItem is present, the controller 34-1 determines in step S150 whether the playback process is to end. If it is determined in step S150 that the playback process is not to end, processing returns to step S133 to repeat step S133 and subsequent steps. If it is determined in step S150 that the playback process is to end, processing ends.

If it is determined in step S131 that the output from the reproducing apparatus 20-1 is not an encoded stream, steps S151-S160, respectively substantially identical to steps S24-S33 of FIG. 38, are performed.

More specifically, if the output is not an encoded stream, the audio stream #1 is decoded regardless of whether the sound data to be mixed with the audio stream #1 is present or not. The switch 61 is thus controlled so that the audio stream #1 is supplied to the audio decoder 75. The controller 34-1 determines whether the read command to read the PlayList has been issued. If the controller 34-1 determines that the read command has been issued, the PlayList is read. The PlayItem specified by the PlayList is read, and the data of the corresponding Clip (AV stream) is then read. The read data is supplied to the corresponding buffer for buffering. The PID filters and the switches are controlled so that the buffered video-based data is decoded by the corresponding decoder, and the decoded data is then processed by the video data processor 96. Furthermore, the PID filters and the switches are controlled so that the audio stream #1 buffered on the buffer 53 is supplied to the audio decoder 75 via the switch 61 to be decoded. If the sound data is supplied to and present on the buffer 95, the mixer 97 performs the mixing process on the decoded data and the sound data.

The uncompressed audio signal interface 81 outputs the processed uncompressed audio data supplied from the mixer 97 to the outside of the apparatus. The uncompressed video signal interface 83 outputs the uncompressed video data supplied from the video data processor 96 to the outside of the apparatus. The D/A converter 43 digital-to-analog converts the uncompressed audio data. The analog audio signal interface 85 outputs the analog signal to the outside of the apparatus. The D/A converter 44 digital-to-analog converts the uncompressed video data. The analog video signal interface 86 outputs the analog signal to the outside of the apparatus.

It is determined in step S159 whether there is a next PlayItem to be reproduced. If it is determined in step S159 that there is a next PlayItem, processing returns to step S154 to repeat step S154 and subsequent steps. If it is determined in step S159 that there is no next PlayItem, the controller 34-1 determines in step S160 whether the playback process is to end. If it is determined in step S160 that the playback process is not to end, processing returns to step S152. If it is determined in step S160 that the playback process is to end, processing ends.

In the above process, the reproducing apparatus 20-1 references the flags described in the PlayItem file. If the data referenced by the PlayItem contains no sound data, the reproducing apparatus 20-1 outputs the audio stream #1 to the outside of the apparatus as the compressed (encoded) data without being decoded. Audio quality is thus free from degradation. Since the flags are described in the PlayItem file, whether the sound data is contained is set on a per PlayItem basis. Thus, freedom of authoring is increased.

In the above-referenced process as well, the controller 34-1 determines at the earlier stage of the process whether the output is compressed data or uncompressed data, and then references the flags to determine whether to perform the mixing process. Alternatively, the flags may be referenced first to determine whether to perform the mixing process, and then whether the output signal is compressed data or uncompressed data may be determined. In this arrangement, the process is not essentially changed in the content thereof but in mere sequential order thereof.

A reproducing apparatus 20-2 as a second embodiment of the present invention can reproduce two audio streams of an audio stream #1 and an audio stream #2. FIG. 41 is a block diagram illustrating the reproducing apparatus 20-2. The reproducing apparatus 20-2 reproduces the PlayList having a main path and a sub path. The reproducing apparatus 20-2 can mix the audio stream #2 and the sound data identified audio_stream_id2 with the audio stream #1 identified by audio_stream_id.

Elements identical to those of the reproducing apparatus 20-1 discussed with reference to FIG. 37 are designated with the same reference numerals and the discussion thereof is omitted herein as appropriate.

As the reproducing apparatus 20-1, the reproducing apparatus 20-2 includes playback data acquisition unit 31, switch 32, audio encoder 41, video encoder 42, D/A converter 43, D/A converter 44, uncompressed audio signal interface 81, compressed audio signal interface 82, uncompressed video signal interface 83, compressed video signal interface 84, analog audio signal interface 85, and analog video signal interface 86. The reproducing apparatus 20-2 further includes AV decoder 33-2 and controller 34-2 instead of the AV decoder 33-1 and the controller 34-1 in the reproducing apparatus 20-1.

In the same way as previously discussed with reference to FIG. 37, the controller 34-2 of FIG. 41 reads an Index file via the playback data acquisition unit 31, reads a PlayList file in response to a generated command, and reads a PlayItem based on information of the PlayList file. The controller 34-2 acquires a corresponding Clip (AV stream or AV data). Using a user interface, the user issues a command to switch audio or caption. The controller 34-2 is supplied with information of initial language setting in the reproducing apparatus 20-2 from a storage (not shown).

The controller 34-2 controls the switch 61 based on the value of an is_MixApp flag or is_MixApp_2 flag, and the value an is_MixApp_1 flag. Each of the is_MixApp flag, the is_MixApp_1 flag and the is_MixApp_2 flag is described in one of the Index file and the PlayList file (AppInfoPlayList ( ), PlayList ( ) or PlayItem). The is_MixApp flag and the is_MixApp_2 flag indicate whether the sound data to be mixed with the audio stream #1 is present, and the is_MixApp_1 flag indicates whether the audio stream #2 to be mixed with the audio stream #1 is present.

As the AV decoder 33-1, the AV decoder 33-2 includes buffers 51-55, PID filter 55, PID filter 56, switches 57 and 58, switch 61, switch 102, background decoder 71, video decoder 72, presentation graphics decoder 73, interactive graphics decoder 74, text sub title composition decoder 76, switch 77, background plane generator 91, video plane generator 92, presentation graphics plane generator 93, interactive graphics plane generator 94, buffer 95, video data processor 96, and mixer 97. The AV decoder 33-2 further includes switch 101 instead of the switch 59, first audio decoder 75-1 instead of the audio decoder 75, and additionally includes second audio decoder 75-2 and mixer 102.

The first audio decoder 75-1 decodes the audio stream #1 and the second audio decoder 75-2 decodes the audio stream #2. More specifically, the first audio decoder 75-1 decides an audio stream identified by audio_stream_id in the STN_table ( ) of FIG. 25, and the second audio decoder 75-2 decodes an audio stream identified by audio_stream_id2 of the STN_table ( ) of FIG. 25.

The reproducing apparatus 20-2 thus includes the two decoders (the first audio decoders 75-1 and the second audio decoder 75-2) for decoding the two audio streams.

File data ready by the controller 34-2 is decoded by an ECC decoder (not shown), and the decoded multiplexed stream is then subjected to an error correction process. Under the control of the controller 34-2, the switch 32 selects streams by type from the decoded and error-corrected data, and then supplies the streams to the respective buffers 51-54.

The format of the AV stream contained in the main clip and the sub clip may be the same as previously described. The method of the playback data acquisition unit 31 for reading data may be the same as discussed above (i.e., data may be read in a time-division manner or may be pre-loaded).

Stream data read from the buffer 52 as a main Clip AV read buffer is output to the subsequent PID (packet ID) filter 55 at a predetermined timing. The PID filter 55 sorts the input main Clip by PID (packet ID), and outputs the sorted data to subsequent decoders of elementary streams. More specifically, the PID filter 55 supplies a video stream to the video decoder 72, a presentation graphics stream to the switch 57 serving as a supplier to the presentation graphics decoder 73, an interactive graphics stream to the switch 58 serving as a supplier to the interactive graphics decoder 74, and an audio stream to the switch 101 serving as a supplier to the switch 61 and the second audio decoder 75-2.

The audio stream, supplied to the switch 61 and then output via the compressed audio signal interface 82 or input to the first audio decoder 75-1, is a stream separated from the main Clip or the sub Clip. Similarly, an audio stream input to the second audio decoder 75-2 is a stream separated from the main Clip or the sub Clip. For example, if the main Clip contains both the audio stream #1 and the audio stream #2, the PID filter 55 filters the audio stream #1 and the audio stream #2 based on PID of the audio stream, and supplies the resulting streams to the switch 101.

In the same way as the reproducing apparatus 20-1, the reproducing apparatus 20-1 performs a playback process on the video data, the bit-map data, and the interactive graphics data.

The switch 101 switches between the audio stream contained in the main Clip supplied from the PID filter 55 and the audio stream contained in the sub Clip. The selected audio stream is supplied to one of the subsequent switch 61 and the subsequent second audio decoder 75-2.

For example, the switch 101 selects the audio stream #1 from the PID filter 55 to supply the audio stream #1 to the switch 61, and selects the audio stream #2 from the PID filter 55 to supply the audio stream #2 to the second audio decoder 75-2.

Under the control of the controller 34-2, the switch 61 supplies the supplied audio data to one of the first audio decoder 75-1 and the compressed audio signal interface 82.

The first audio decoder 75-1 decodes the audio stream, and then supplies data of the decoded audio stream to the mixer 102. The second audio decoder 75-2 decodes the audio stream, and then supplies the decoded audio stream to the mixer 102.

If the audio stream #1 and the audio stream #2 are to be mixed and reproduced (i.e., if the user selects the two audio streams as playback audio streams), the audio stream #1 decoded by the first audio decoder 75-1 and the audio stream #2 decoded by the first audio decoder 75-1 are supplied to the mixer 102.

The mixer 102 mixes (superimposes) the audio data from the first audio decoder 75-1 and the audio data from the second audio decoder 75-2, and outputs the mixed audio data to the subsequent mixer 97. In the content of this specification, mixing (superimposition) of the audio data output from the first audio decoder 75-1 and the audio data output from the second audio decoder 75-2 is also referred to as synthesis. In other words, synthesis refers to the mixing of two pieces of audio data.

The sound data selected by the switch 32 is supplied to the buffer 95 for buffering. The buffer 95 supplies the sound data to the mixer 97 at a predetermined timing. The sound data is data of sound effect selected on menu and independent of the stream. The mixer 97 mixes (superimposes, or mixes) the sound data supplied from the buffer 95 with the audio data mixed by the mixer 102 (i.e., the mixed audio data of the audio data output from the first audio decoder 75-1 and the audio data output from the second audio decoder 75-2), and outputs the resulting data as an audio signal.

The reproducing apparatus 20-2 performs a playback process 4 to reproduce data when a flag indicating the presence of the other audio data to be mixed with the audio stream #1 is described in the Indexes ( ) of the Index file. The playback process 4 is described below with reference to a flowchart of FIG. 42.

In step S201, the controller 34-2 determines whether an output from the reproducing apparatus 20-2 is an encoded stream. If it is determined in step S201 that the output from the reproducing apparatus 20-2 is not an encoded stream, processing proceeds to step S224.

If it is determined in step S201 that the output from the reproducing apparatus 20-2 is an encoded stream, the controller 34-2 reads an Index file supplied from the switch 32 in step S202.

In step S203, the controller 34-2 determines whether one of flags described in the Indexes ( ) of the Index file and indicating the presence of the data to be mixed with the audio stream #1 as the main audio stream is 1. More specifically, the controller 34-2 determines whether one of the is_MixApp flag and the is_MixApp_2 flag indicating the presence of the sound data and the is_MixApp_1 flag indicating the presence of the audio stream #2 is 1.

In a content having the audio stream #2 identified by audio_stream_id2 in addition to the audio stream #1 identified by audio_stream_id, the is_MixApp_1 flag indicating the presence of the audio stream #2 is described in addition to the is_MixApp_2 flag indicating the presence of the sound data. The reproducing apparatus 20-2, having the function to reproduce the audio stream #2 identified by audio_stream_id2, references not only the values of the is_MixApp flag and the is_MixApp_2 flag but also the value of the is_MixApp_1 flag in step S203.

If it is determined in step S203 that one of the flags is 1, processing proceeds to step S214 to be discussed later.

If it is determined in step S203 that any one of the flags is not 1, the data related to the Index file contains none of the sound data and the audio stream #2 to be mixed with the audio stream #1 in the reproducing apparatus 20-2. In step S204, the controller 34-2 controls the switch 61 to supply the audio data relating to the Index file to the compressed audio signal interface 82 serving as an output terminal for the compressed (encoded) audio signal.

In step S205, the controller 34-2 determines whether a command generated in response to an operation input from the user is issued to read a PlayList file (such as xxxxx.mpls of FIG. 13). If it is determined in step S205 that the read command to read the PlayList file has not been issued, step S205 is repeated until it is determined the read command to read the PlayList file has been issued.

If it is determined in step S205 that the read command to read the PlayList file has been issued, the controller 34-2 reads in step S206 the PlayList file supplied from the switch 32.

In step S207, the controller 34-2 reads a PlayItem specified by a PlayList (PlayList ( ) of FIG. 13) described in the PlayList file, reads a corresponding main Clip AV stream, sub Clip AV stream and text sub title data and supplies the read data to the switch 32.

In step S208, the controller 34-2 supplies the read data to corresponding buffers for buffering. More specifically, the controller 34-2 controls the switch 32 to supply the background image data to the buffer 51, the main Clip AV stream to the buffer 52, the sub Clip AV stream to the buffer 53, and the text sub title data to the buffer 54. The buffer 51-54 buffer the supplied data thereof. More specifically, the buffer 51 buffers the background image data, the buffer 52 buffers the main Clip AV stream, the buffer 53 buffers the sub Clip AV stream, and the buffer 54 buffers the text sub title data.

In step S209, the controller 34-2 controls the PID filters 55 and 56, and the switches 67-59, thereby decoding the video-based data with predetermined decoders, and processing the decoded data with the video data processor 96.

In step S210, the video encoder 42 encodes the processed video data supplied from the video data processor 96.

In step S211, the compressed audio signal interface 82 serving as the output terminal of the compressed (encoded) audio signal outputs, to the outside of the apparatus, the audio stream #1 as the encoded audio data output from the switch 61. The compressed video signal interface 84 serving as the output terminal of the compressed (encoded) video signal outputs the encoded video data to the outside of the apparatus.

The compressed (encoded) audio data output from the compressed audio signal interface 82 in step S211 is not degraded in audio quality because the AV decoder 33-2 of the reproducing apparatus 20-2 has performed no decode process.

In step S212, the controller 34-2 references the PlayList to determine whether a next PlayItem to be reproduced is present. If it is determined in step S212 that there is a next PlayItem, processing returns to step S207 to repeat step S207 and subsequent steps.

If it is determined in step S212 that there is no next PlayItem, the controller 34-2 determines in step S213 whether the playback process is to end. If it is determined in step S213 that the playback process is not to end, processing returns to step S205 to repeat step S205 and subsequent steps. If it is determined in step S213 that the playback process is to end, processing ends.

If it is determined in step S203 that one of the flags is 1, the data related to the Index file contains at least one of the sound data and the audio stream #2 to be mixed with the audio stream #1 by the reproducing apparatus 20-1. In step S214, the controller 34-2 controls the switch 61 to supply the audio stream #1 related to the Index file to the audio decoder 75-1.

Steps S215 through S219 are basically identical to steps S205 through S209, respectively. More specifically, the controller 34-2 determines whether a command generated in response to an operation input from the user is issued to read a PlayList file. If it is determined that the read command to read the PlayList file has been issued, the PlayList is read, and the PlayItem specified by the PlayList is read. Clip data (AV stream) corresponding to the read PlayItem is supplied to the corresponding buffer for buffering. The PID filters and the switches are controlled so that the buffered video-based data is decoded by the corresponding decoders and then processed by the video data processor 96.

In step S220, the controller 34-2 controls the PID filters and the switches to supply the audio stream #1 buffered by the buffer 53 to the audio decoder 75-1 via the switch 61 and the switch 101 for decoding, and the audio stream #2 to the second audio decoder 75-2 via the switch 101 for decoding. The controller 34-2 controls the mixer 102 to mix the audio streams decoded by the first audio decoder 75-1 and the second audio decoder 75-2 as appropriate. The controller 34-2 controls the mixer 97 to perform the mixing process on the audio stream mixed by the mixer 102 and the sound data buffered on the buffer 95.

Since the switch 61 is controlled to decode the audio stream #1 with the audio decoder 75-1, the audio stream #2 and the sound data are mixed with the audio stream #1.

In step S221, the audio encoder 41 encodes the mixed uncompressed audio data, and supplies the encoded (compressed) audio data to the compressed audio signal interface 82 to be output to the outside of the apparatus. The video encoder 42 encodes the uncompressed video data processed by the video data processor 96, and supplies the encoded (compressed) video data to the compressed video signal interface 84 to be output to the outside of the apparatus.

In step S222, the controller 34-2 references the PlayList to determine whether a next PlayItem to be reproduced is present. If it is determined in step S222 that a next PlayItem is present, processing returns to step S217 to repeat step S217 and subsequent steps.

If it is determined in step S222 that no next PlayItem is present, the controller 34-2 determines in step S223 whether the playback process is to end. If it is determined in step S223 that the playback process is not to end, processing returns to step S215 to repeat step S215 and subsequent steps. If it is determined in step S223 that the playback process is to end, processing ends.

If it is determined in step S201 that the output from the reproducing apparatus 20-2 is an encoded stream, the controller 34-2 controls the switch 61 in step S224 to supply the supplied audio stream #1 to the audio decoder 75.

If the output is not an encoded stream, the audio stream #1 is decoded regardless of whether the sound data to be mixed with the audio stream #1 is available or not.

Steps S225 through S230 are substantially identical to steps S215 through S220, respectively. The controller 34-2 determines whether a command generated in response to an operation input from the user is issued to read a PlayList file. If it is determined that the read command to read the PlayList file has been issued, the PlayList is read, and the PlayItem specified by the PlayList in the PlayList file is read. Clip data (AV stream) corresponding to the read PlayItem is supplied to the corresponding buffer for buffering. The PID filters and the switches are controlled so that the buffered video-based data is decoded by the corresponding decoders and then processed by the video data processor 96. Furthermore the PID filters and the switches are controlled to supply the audio stream #1 buffered by the buffer 53 to the audio decoder 75-1 via the switch 61 and the switch 101 for decoding, and the audio stream #2 to the second audio decoder 75-2 via the switch 101 for decoding. The controller 34-2 controls the mixer 102 to mix the audio streams decoded by the first audio decoder 75-1 and the second audio decoder 75-2 as appropriate. The controller 34-2 controls the mixer 97 to perform the mixing process on the audio stream mixed by the mixer 102 and the sound data buffered on the buffer 95.

In step S231, the uncompressed audio signal interface 81 outputs the processed uncompressed audio data supplied from the mixer 97 to the outside of the apparatus. The uncompressed video signal interface 83 outputs the uncompressed video data supplied from the video data processor 96 to the outside of the apparatus. The D/A converter 43 digital-to-analog converts the uncompressed audio data. The analog audio signal interface 85 outputs the analog signal to the outside of the apparatus. The D/A converter 44 digital-to-analog converts the uncompressed video data. The analog video signal interface 86 outputs the analog signal to the outside of the apparatus.

In step S232, the controller 34-2 references the PlayList to determine whether a next PlayItem to be reproduced is present. If it is determined in step S232 that a next PlayItem is present, processing returns to step S227 to repeat step S227 and subsequent steps.

If it is determined in step S232 that no next PlayItem is present, the controller 34-2 determines in step S233 whether the playback process is to end. If it is determined in step S233 that the playback process is not to end, processing returns to step S225 to repeat step S225 and subsequent steps. If it is determined in step S233 that the playback process is to end, processing ends.

In the above process, the reproducing apparatus 20-2 references the flags described in the Indexes ( ). If the data referenced by Indexes ( ) contains neither the sound data nor the audio stream #2, the audio stream #1 is output to the outside of the apparatus as compressed (encoded) data without being decoded. The audio stream #1 is thus free from audio quality degradation.

In the above process as well, the controller 34-2 determines at the earlier stage of the process whether the output is compressed data or uncompressed data, and then references the flags to determine whether to perform the mixing process. Alternatively, the flags may be referenced first to determine whether to perform the mixing process, and then whether the output signal is compressed data or uncompressed data may be determined. In this arrangement, the process is not essentially changed in the content thereof but in mere sequential order thereof.

The reproducing apparatus 20-2 performs a playback process 5 to reproduce data when a flag indicating the presence of the other audio data to be mixed with the audio stream #1 is described in the PlayList file. The playback process 5 is described below with reference to a flowchart of FIG. 43.

In step S261, the controller 34-2 determines whether an output from the reproducing apparatus 20-2 is an encoded stream. If it is determined in step S161 that the output from the reproducing apparatus 20-2 is not an encoded stream, processing proceeds to step S282.

If it is determined in step S261 that the output from the reproducing apparatus 20-2 is an encoded stream, the controller 34-2 reads an Index file supplied from the switch 32 in step S262.

In step S263, the controller 34-2 determines whether a command generated in response to an operation input from the user is issued to read a PlayList file (such as xxxxx.mpls of FIG. 13). If it is determined in step S263 that the read command to read the PlayList file has not been issued, step S263 is repeated until it is determined the read command to read the PlayList file has been issued.

If it is determined in step S263 that the read command to read the PlayList file has been issued, the controller 34-2 reads in step S264 the PlayList file supplied from the switch 32.

In step S265, the controller 34-2 determines whether one of flags described in the Index file, namely, one of AppInfoPlayList ( ) and PlayList ( ), and indicating the presence of the data to be mixed with the audio stream #1 as the main audio stream is 1. More specifically, the controller 34-2 determines whether one of the is_MixApp flag indicating the presence of the sound data (or the audio stream #2), the is_MixApp_2 flag indicating the presence of the sound data and the is_MixApp_1 flag indicating the presence of the audio stream #2 is 1.

In a content having the audio stream #2 identified by audio_stream_id2 in addition to the audio stream #1 identified by audio_stream_id, the is_MixApp_1 flag indicating the presence of the audio stream #2 is described in addition to the is_MixApp_2 flag indicating the presence of the sound data. The reproducing apparatus 20-2, having the function to reproduce the audio stream #2 identified by audio_stream_id2, references not only the value of the is_MixApp_2 flag but also the value of the is_MixApp_1 flag in step S265.

If it is determined in step S265 that one of the flags is 1, processing proceeds to step S274 to be discussed later.

If it is determined in step S265 that any one of the flags is not 1, the data related to the Index file contains none of the sound data and the audio stream #2 to be mixed with the audio stream #1 in the reproducing apparatus 20-2. In step S266, the controller 34-2 controls the switch 61 to supply the audio data relating to the Index file to the compressed audio signal interface 82 serving as an output terminal for the compressed (encoded) audio signal.

Figure 42B:
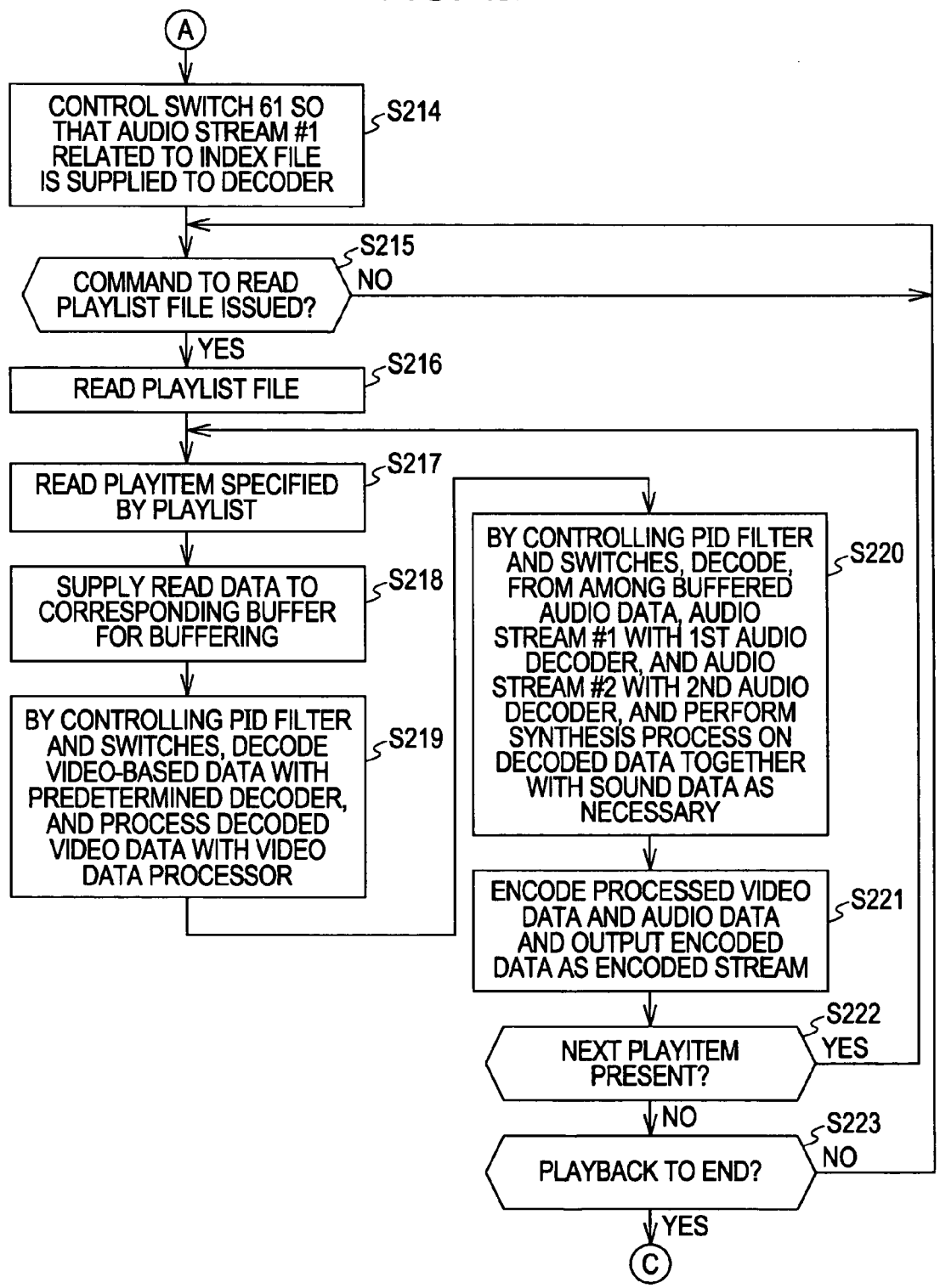
FIG. 42 is a flowchart illustrating a playback process 4.
Figure 42C:
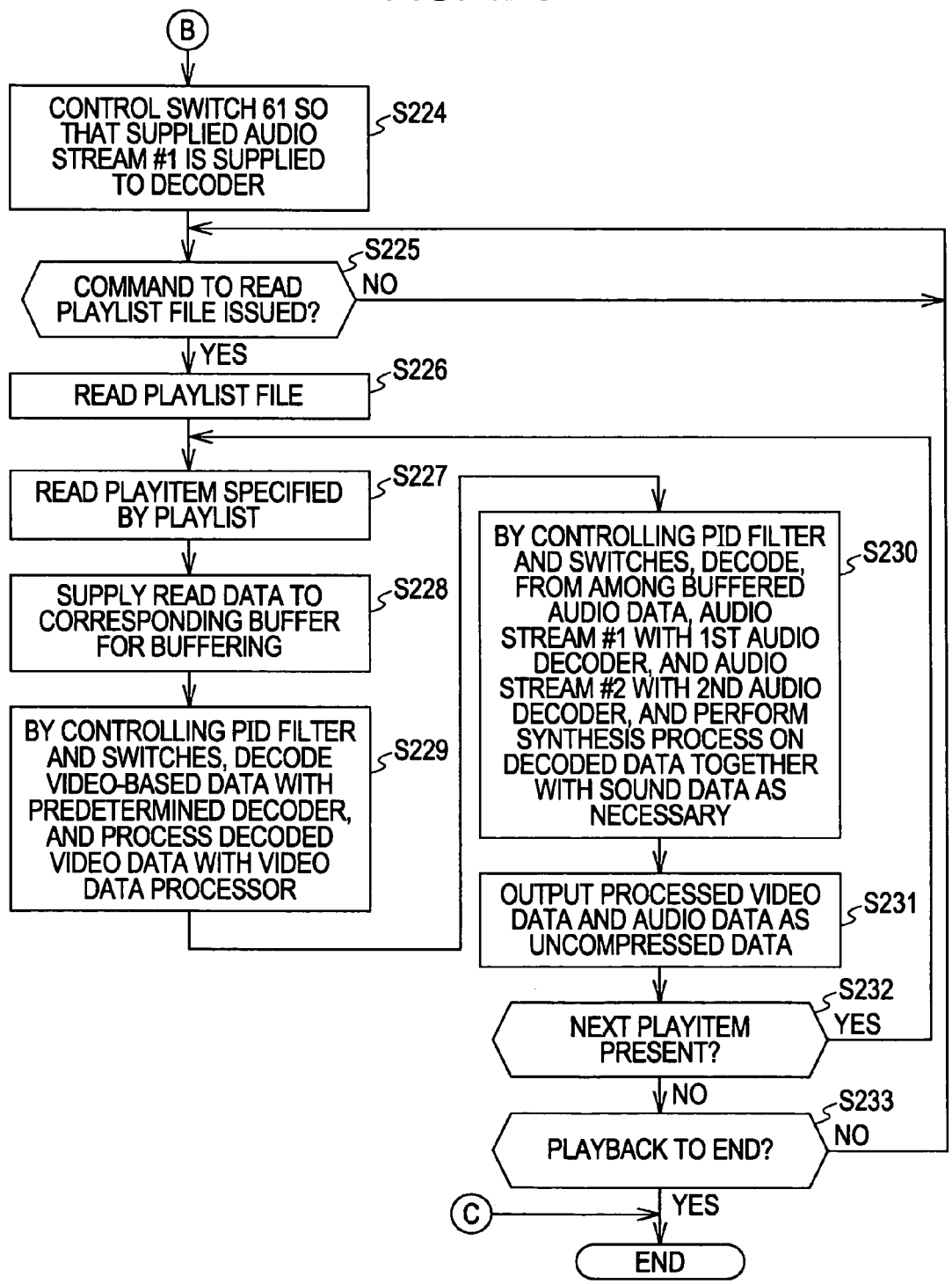

Steps S267-S271 are substantially identical to steps S207-S211 of FIG. 42, respectively. The PlayItem specified by the PlayList is read. The stream data contained in the corresponding main Clip or the sub Clip and the text sub title data are read and supplied to the switch 32. The read data is then supplied to the corresponding buffer for buffering. The PID filters 55 and 56, and the switches 57-59 are controlled so that the video-based data is decoded by the corresponding decoder, and then processed by the video data processor 96. The processed video data is then encoded.

The audio stream #1 as the encoded audio data output from the switch 61 is output to the outside of the apparatus via the compressed audio signal interface 82 serving as an output terminal of the compressed (encoded) audio signal. The encoded video data is output to the outside of the apparatus via the compressed video signal interface 84 serving as a terminal of the compressed (encoded) video signal.

The compressed (encoded) audio data output from the compressed audio signal interface 82 in step S271 is not degraded in audio quality because the AV decoder 33-2 of the reproducing apparatus 20-2 has performed no decode process.

In step S272, the controller 34-2 references the PlayList to determine whether a next PlayItem to be reproduced is present. If it is determined in step S272 that there is a next PlayItem, processing returns to step S267 to repeat step S267 and subsequent steps.

If it is determined in step S272 that there is no next PlayItem, the controller 34-2 determines in step S273 whether the playback process is to end. If it is determined in step S273 that the playback process is not to end, processing returns to step S263 to repeat step S263 and subsequent steps. Control of the switch 61 may change depending on the value of the flag described in the PlayList file to be read next. If it is determined in step S273 that the playback process is to end, processing ends.

If it is determined in step S265 that one of the flags is 1, the data related to the Index file contains at least one of the sound data and the audio stream #2 to be mixed with the audio stream #1 by the reproducing apparatus 20-2. In step S274, the controller 34-2 controls the switch 61 to supply the audio stream #1 related to the Index file to the audio decoder 75-1.

Steps S275 through S279 are basically identical to steps S215 through S221 of FIG. 42, respectively. More specifically, the PlayItem specified by the PlayList is read. Data contained in the corresponding Clip is supplied to the corresponding buffer based on the read PlayItem. The PID filters and the switches are controlled so that the buffered video-based data is decoded by the corresponding decoders, and so that the decoded data is processed by the video data processor 96.

Furthermore, the PID filters and the switches are controlled to supply the audio stream #1 buffered by the buffer 53 to the audio decoder 75-1 via the switch 61 and the switch 101 for decoding, and the audio stream #2 buffered by the buffer 53 to the second audio decoder 75-2 via the switch 101 for decoding. The controller 34-2 controls the mixer 102 to mix the audio streams decoded by the first audio decoder 75-1 and the second audio decoder 75-2 as appropriate. The controller 34-2 controls the mixer 97 to perform the mixing process on the audio stream mixed by the mixer 102 and the sound data buffered on the buffer 95.

Since the switch 61 is controlled to decode the audio stream #1 with the audio decoder 75-1, the audio stream #2 and the sound data are mixed with the audio stream #1.

The audio encoder 41 encodes the mixed uncompressed audio data, and supplies the encoded (compressed) audio data to the compressed audio signal interface 82 to be output to the outside of the apparatus. The video encoder 42 encodes the uncompressed video data processed by the video data processor 96, and supplies the encoded (compressed) video data to the compressed video signal interface 84 to be output to the outside of the apparatus.

In step S280, the controller 34-2 references the PlayList to determine whether a next PlayItem to be reproduced is present. If it is determined in step S280 that a next PlayItem is present, processing returns to step S275 to repeat step S275 and subsequent steps.

If it is determined in step S280 that no next PlayItem is present, the controller 34-2 determines in step S281 whether the playback process is to end. If it is determined in step S281 that the playback process is not to end, processing returns to step S263 to repeat step S263 and subsequent steps. Control of the switch 61 may change depending on the value of the flag described in the PlayList to be read next. If it is determined in step S281 that the playback process is to end, processing ends.

If it is determined in step S261 that the output from the reproducing apparatus 20-2 is not an encoded stream, steps S282-S291, substantially identical to steps S224-S233 of FIG. 42, are executed.

More specifically, if the output is not an encoded stream, the audio stream #1 is decoded regardless of whether the sound data to be mixed with the audio stream #1 is available or not.

The controller 34-2 determines whether a command to read a PlayList file has been issued. If it is determined that the read command to read the PlayList file has been issued, the PlayList is read, and the PlayItem specified by the PlayList in the PlayList file is read. Clip data (AV stream) corresponding to the read PlayItem is supplied to the corresponding buffer for buffering. The PID filters and the switches are controlled so that the buffered video-based data is decoded by the corresponding decoders and then processed by the video data processor 96. Furthermore the PID filters and the switches are controlled to supply the audio stream #1 buffered by the buffer 53 to the audio decoder 75-1 via the switch 61 and the switch 101 for decoding, and the audio stream #2 to the second audio decoder 75-2 via the switch 101 for decoding. The controller 34-2 controls the mixer 102 to mix the audio streams decoded by the first audio decoder 75-1 and the second audio decoder 75-2 as appropriate. The controller 34-2 controls the mixer 97 to perform the mixing process on the audio stream mixed by the mixer 102 and the sound data buffered on the buffer 95. Processed uncompressed audio data supplied from the mixer 97 is output to the outside of the apparatus, as is or after being digital-to-analog converted as necessary. Uncompressed video data supplied from the video data processor 96 is output to the outside of the apparatus, as is or after being digital-to-analog converted.

The controller 34-2 references the PlayList to determine in step S290 whether a next PlayItem to be reproduced is present. If it is determined in step S290 that a next PlayItem is present, processing returns to step S285 to repeat step S285 and subsequent steps. If it is determined in step S290 that no next PlayItem is present, the controller 34-2 determines in step S291 whether the playback process is to end. If it is determined in step S291 that the playback process is not to end, processing returns to step S283 to repeat step S283 and subsequent steps. If it is determined in step S291 that the playback process is to end, processing ends.

In this way, the reproducing apparatus 20-2 references the flags described in the PlayList file, and if neither the sound data nor the audio stream #2 is contained in the data referenced by the PlayList file, the audio stream #1 is output to the outside of the apparatus without being decoded. Audio quality is thus not excessively degraded.

A click sound of a button in the audio data supplied as the sound data is an effect sound generated in response to an operation by a user. It is unknown whether the click sound is to be mixed with the audio stream #1. In the flow of the above-referenced playback process, the is_MixApp flag, the is_MixApp_1 flag and the is_MixApp_2 flag indicating the presence of the sound data or the audio data have been described. Any flag works as long as the flag indicates that the data specified by the flag is not decodable for mixing. More specifically, even if a flag is 1, the mixing process not necessarily takes place, and the apparatus may not undergo the mixing process after all. If the mixing process does not take place, zero is set for the flag. Since the Indexes ( ) can specify a plurality of PlayList files, whether the sound data is contained or not is set on a per PlayList basis by describing the flag in the PlayList. Flexible control is achieved by describing flag information in the Indexes ( ), and the freedom of authoring is increased.

In the above process, the controller 34-2 determines at the earlier stage of the process whether the output is compressed data or uncompressed data, and then references the flags to determine whether to perform the mixing process. Alternatively, the flags may be referenced first to determine whether to perform the mixing process, and then whether the output signal is compressed data or uncompressed data may be determined. In this arrangement, the process is not essentially changed in the content thereof but in mere sequential order thereof.

The reproducing apparatus 20-2 performs a playback process 6 to reproduce data when a flag indicating the presence of the other audio data to be mixed with the audio stream #1 is described in the PlayItem. The playback process 6 is described below with reference to a flowchart of FIG. 44.

In step S331, the controller 34-2 determines whether an output from the reproducing apparatus 20-2 is an encoded stream. If it is determined in step S331 that the output from the reproducing apparatus 20-2 is not an encoded stream, processing proceeds to step S351 to be discussed later.

If it is determined in step S331 that the output from the reproducing apparatus 20-2 is an encoded stream, the controller 34-2 reads an Index file supplied from the switch 32 in step S332.

In step S333, the controller 34-2 determines whether a command generated in response to an operation input from the user is issued to read a PlayList file (such as xxxxx.mpls of FIG. 13). If it is determined in step S333 that the read command to read the PlayList file has not been issued, step S333 is repeated until it is determined the read command to read the PlayList file has been issued.

If it is determined in step S333 that the read command to read the PlayList file has been issued, the controller 34-2 reads in step S334 the PlayList file supplied from the switch 32.

In step S335, the controller 34-2 reads the PlayItem specified by the PlayList (PlayList ( ) of FIG. 13) described in the PlayList file, reads the corresponding main Clip AV stream, sub Clip AV stream, and text sub title data, and outputs these pieces of data to the switch 32.

In step S336, the controller 34-2 determines whether one of flags described in the PlayItem, and indicating the presence of the data to be mixed with the audio stream #1 as the main audio stream is 1. More specifically, the controller 34-2 determines whether one of the is_MixApp flag and the is_MixApp_2 flag indicating the presence of the sound data and the is_MixApp_1 flag indicating the presence of the audio stream #2 is 1.

In a content having the audio stream #2 identified by audio_stream_id2 in addition to the audio stream #1 identified by audio_stream_id, the is_MixApp_1 flag indicating the presence of the audio stream #2 is described in addition to the is_MixApp_2 flag indicating the presence of the sound data. The reproducing apparatus 20-2, having the function to reproduce the audio stream #2 identified by audio_stream_id2, references not only the value of the Is_MixApp flag or the is_MixApp_2 flag but also the value of the is_MixApp_1 flag in step S336.

If it is determined in step S336 that one of the flags is 1, processing proceeds to step S344 to be discussed later.

If it is determined in step S336 that any one of the flags is not 1, the data related to the PlayItem contains none of the sound data and the audio stream #2 to be mixed with the audio stream #1 in the reproducing apparatus 20-2. In step S337, the controller 34-2 controls the switch 61 to supply the audio data relating to the PlayItem to the compressed audio signal interface 82 serving as an output terminal for the compressed (encoded) audio signal.

Steps S338-S341 are substantially identical to steps S208-S2211 of FIG. 42, respectively. The read data is supplied to the corresponding buffer for buffering. The PID filters 55 and 56, and the switches 59-67 are controlled so that the video-based data is decoded by the corresponding decoder, and then processed by the video data processor 96. The processed video data is then encoded.

The audio stream #1 as the encoded audio data output from the switch 61 is output to the outside of the apparatus via the compressed audio signal interface 82 serving as an output terminal of the compressed (encoded) audio signal. The encoded video data is output to the outside of the apparatus via the compressed video signal interface 84 serving as a terminal of the compressed (encoded) video signal.

The compressed (encoded) audio data output from the compressed audio signal interface 82 in step S341 is not degraded in audio quality because the AV decoder 33-2 of the reproducing apparatus 20-2 has performed no decode process.

In step S342, the controller 34-2 references the PlayList to determine whether a next PlayItem to be reproduced is present. If it is determined in step S342 that there is a next PlayItem, processing returns to step S335 to repeat step S335 and subsequent steps. Control of the switch 61 may change depending on the value of the flag described in the PlayList to be read next.

If it is determined in step S342 that there is no next PlayItem, the controller 34-2 determines in step S343 whether the playback process is to end. If it is determined in step S343 that the playback process is not to end, processing returns to step S333 to repeat step S333 and subsequent steps. If it is determined in step S343 that the playback process is to end, processing ends.

If it is determined in step S336 that one of the flags is 1, the data related to the PlayItem contains at least one of the sound data and the audio stream #2 to be mixed with the audio stream #1 by the reproducing apparatus 20-2. In step S344, the controller 34-2 controls the switch 61 to supply the audio stream #1 related to the PlayList file to the audio decoder 75-1.

Steps S345 through S348 are basically identical to steps S218 through S221 of FIG. 42, respectively. Data of the Clip corresponding to the PlayItem is supplied to the corresponding buffer for buffering. The PID filters and the switches are controlled so that the buffered video-based data is decoded by the corresponding decoders, and so that the decoded data is processed by the video data processor 96.

Furthermore, the PID filters and the switches are controlled to supply the audio stream #1 buffered by the buffer 53 to the audio decoder 75-1 via the switch 61 and the switch 101 for decoding, and the audio stream #2 buffered by the buffer 53 to the second audio decoder 75-2 via the switch 101 for decoding. The controller 34-2 controls the mixer 102 to mix the audio streams decoded by the first audio decoder 75-1 and the second audio decoder 75-2 as appropriate. The controller 34-2 controls the mixer 97 to perform the mixing process on the audio stream mixed by the mixer 102 and the sound data buffered on the buffer 95.

Since the switch 61 is controlled to decode the audio stream #1 with the audio decoder 75-1, each of the audio stream #2 and the sound data is mixed with the audio stream #1.

The audio encoder 41 encodes the mixed uncompressed audio data, and supplies the encoded (compressed) audio data to the compressed audio signal interface 82 to be output to the outside of the apparatus. The video encoder 42 encodes the uncompressed video data processed by the video data processor 96, and supplies the encoded (compressed) video data to the compressed video signal interface 84 to be output to the outside of the apparatus.

In step S349, the controller 34-2 references the PlayList to determine whether a next PlayItem to be reproduced is present. If it is determined in step S349 that a next PlayItem is present, processing returns to step S335 to repeat step S335 and subsequent steps. Control of the switch 61 may change depending on the value of the flag described in the PlayList to be read next.

If it is determined in step S349 that no next PlayItem is present, the controller 34-2 determines in step S350 whether the playback process is to end. If it is determined in step S350 that the playback process is not to end, processing returns to step S333 to repeat step S333 and subsequent steps. If it is determined in step S350 that the playback process is to end, processing ends.

If it is determined in step S331 that the output from the reproducing apparatus 20-2 is not an encoded stream, steps S351-S360, substantially identical to steps S224-S233 of FIG. 42, are executed.

If the output is not an encoded stream, the audio stream #1 is decoded regardless of whether the sound data to be mixed with the audio stream #1 is available or not.

More specifically, the controller 34-2 determines whether a command to read a PlayList file has been issued. If it is determined that the read command to read the PlayList file has been issued, the PlayList file is read, and the PlayItem specified by the PlayList in the PlayList file is read. Clip data (AV stream) corresponding to the read PlayItem is supplied to the corresponding buffer for buffering. The PID filters and the switches are controlled so that the buffered video-based data is decoded by the corresponding decoders and then processed by the video data processor 96. Furthermore the PID filters and the switches are controlled to supply the audio stream #1 buffered by the buffer 53 to the audio decoder 75-1 via the switch 61 and the switch 101 for decoding, and the audio stream #2 to the second audio decoder 75-2 via the switch 101 for decoding. The controller 34-2 controls the mixer 102 to mix the audio streams decoded by the first audio decoder 75-1 and the second audio decoder 75-2 as appropriate. The controller 34-2 controls the mixer 97 to perform the mixing process on the audio stream mixed by the mixer 102 and the sound data buffered on the buffer 95. Processed uncompressed audio data supplied from the mixer 97 is output to the outside of the apparatus, as is or after being digital-to-analog converted as necessary. Uncompressed video data supplied from the video data processor 96 is output to the outside of the apparatus, as is or after being digital-to-analog converted.

The controller 34-2 references the PlayList to determine in step S359 whether a next PlayItem to be reproduced is present. If it is determined in step S359 that a next PlayItem is present, processing returns to step S354 to repeat step S354 and subsequent steps. If it is determined in step S359 that no next PlayItem is present, the controller 34-2 determines in step S360 whether the playback process is to end. If it is determined in step S360 that the playback process is not to end, processing returns to step S352 to repeat step S352 and subsequent steps. If it is determined in step S369 that the playback process is to end, processing ends.

In this way, the reproducing apparatus 20-2 references the flags described in the PlayItem, and if neither the sound data nor the audio stream #2 is contained in the data referenced by the PlayItem, the audio stream #1 is output to the outside of the apparatus without being decoded. Audio quality is thus not excessively degraded. With the flag information described in the PlayItem, whether the sound data is contained or not can be set on a per PlayItem basis, leading to an increased degree of freedom in authoring.

With the flag information described in the PlayItem, control can be performed more flexibly. However, if re-encoding is switched to on/off while seamless playback is assured by a single PlayList, implementation of software design of the reproducing apparatus becomes excessively heavy. Depending on software implementation requirements, the flag information may preferably be recorded on a per PlayList file basis.

In the above process, the controller 34-2 determines at the earlier stage of the process whether the output is compressed data or uncompressed data, and then references the flags to determine whether to perform the mixing process. Alternatively, the flags may be referenced first to determine whether to perform the mixing process, and then whether the output signal is compressed data or uncompressed data may be determined. In this arrangement, the process is not essentially changed in the content thereof but in mere sequential order thereof.

As described above, whether to perform the mixing process on the audio data is determined. Based on the determination, the process to be performed when to perform the decode process on the main audio data and the process to be performed when not to perform the decode process on the main audio process are determined. These processes are applicable to not only the mixing of audio data but also the mixing of video data.

As previously discussed, a flag indicating in the stream the presence of each of a background plane, a presentation graphics plane, and an interactive graphics plane to be mixed with main video data, i.e., video data decoded with the video decoder 72 is described in one of the Indexes, PlayList, and PlayItem. The AV decoder 33-3 of a reproducing apparatus 20-3 of FIG. 45 includes a switch 151. Under the control of the AV decoder 33-3, the switch 151 supplies the main video data from the PID filter 55 to one of the video decoder 72 and the compressed video signal interface 84. In this way, the main video data is output as compressed (encoded) data, and if none of the background plane, the presentation graphics plane, and the interactive graphics plane is mixed with the main video data, the main video data is output without being decoded. Unnecessary image degradation is thus avoided.

A method of manufacturing the recording medium 21 storing data replayable on the reproducing apparatus 20 is described below with reference to FIGS. 46 and 47. The recording medium 21 is a disk-like recording medium herein.

Figure 46:
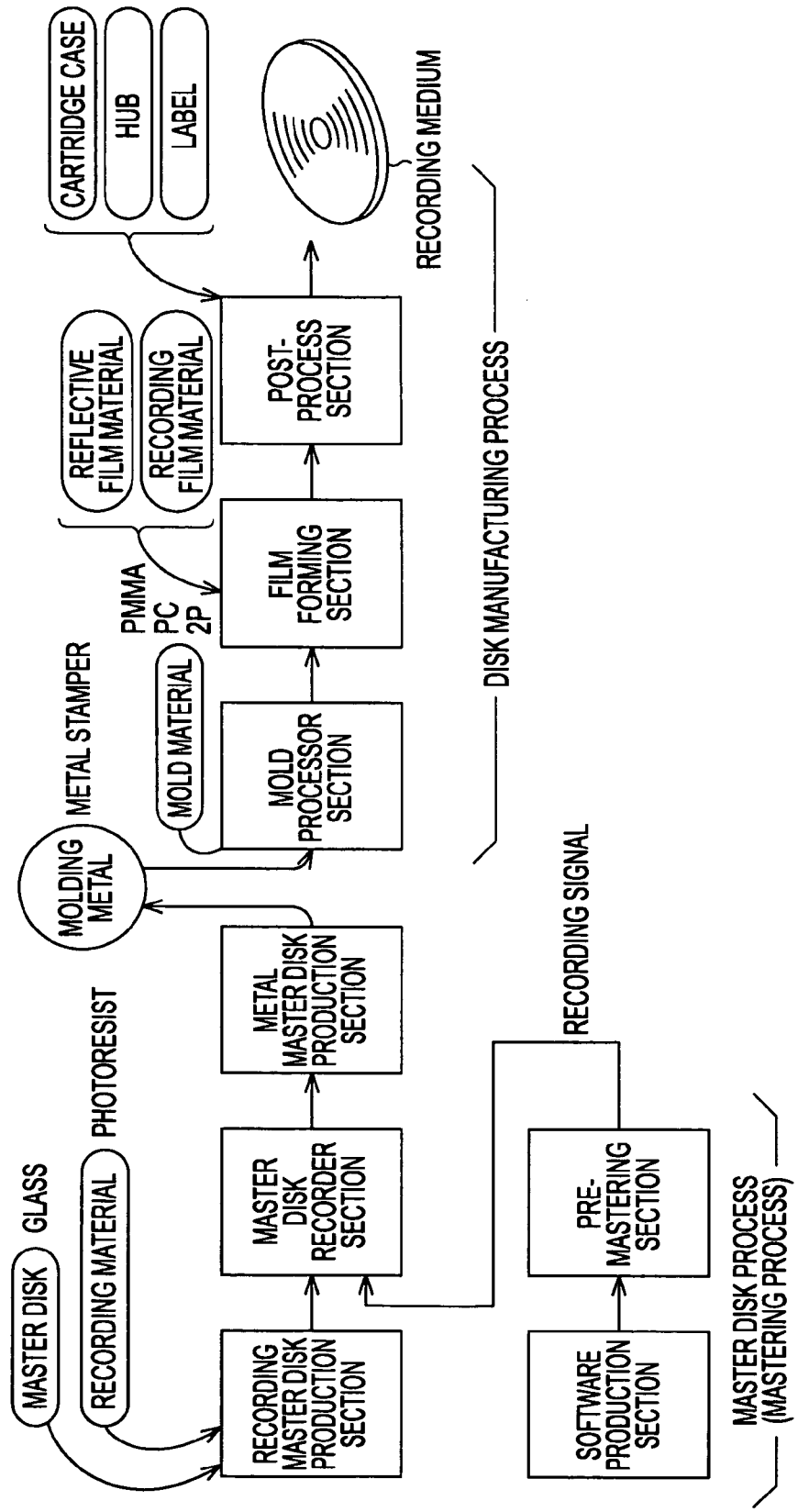
FIG. 46 illustrates manufacturing of a recording medium recording data replayable on the reproducing apparatus.

As shown in FIG. 46, a master disk made of glass is prepared. A recording material made of photoresist or the like is applied on the master disk. The recording master disk thus results.

Figure 47:
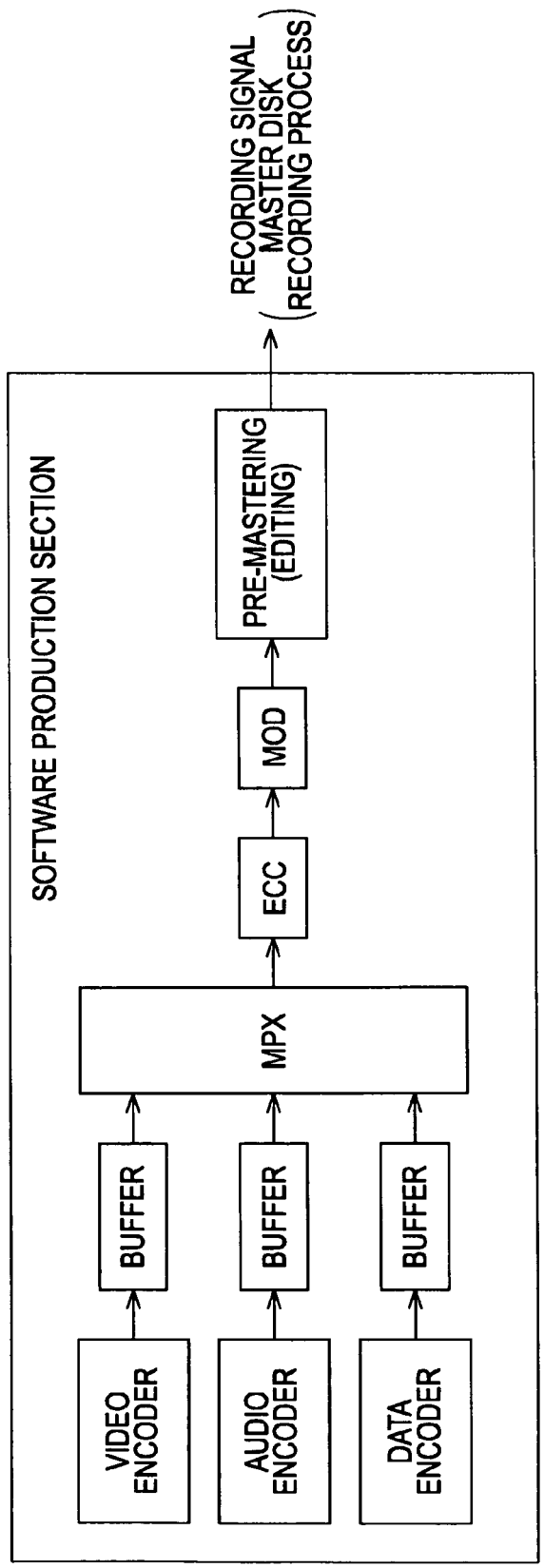
FIG. 47 illustrates the manufacturing of the recording medium recording the data replayable on the reproducing apparatus.

As shown in FIG. 47, video data in a format replayable on the reproducing apparatus 20 encoded by a video encoder in a software production section is stored temporarily on a buffer. Audio data encoded by an audio encoder is temporarily stored on a buffer. Data other than streams (for example, Indexes, Playlist, PlayItem, etc.) encoded by a data encoder is temporarily stored on a buffer. The video data, the audio data, and the data other than the stream stored on the respective buffers are multiplexed by a multiplexer (MPX) in synchronization with a synchronization signal, and an error correction code (ECC) circuit attaches an error correction code to the multiplexed signal. The resulting signal is modulated by a modulator (MOD) circuit, and then stored on a magnetic tape in accordance with a predetermined format. Thus, a software program is manufactured to be recorded onto the recording medium 21 replayable on the reproducing apparatus 20.

The software program is edited (pre-mastered) as necessary, and a signal having a format to be recorded on the optical is thus produced. A laser beam is modulated In accordance with the recording signal, and then directed to the photoresist on the master disk as shown in FIG. 46. The photoresist on the master disk is thus exposed to the laser beam modulated with the recording signal.

The master disk is then developed, and pits are arranged on the master disk. The master disk is then subjected to electroforming to manufacture a metal master disk into which the pits of the glass master disk are transferred. From the metal master disk, a metal stamper is produced and used as a mold.

A material such as PMMA (acryl) or PC (polycarbonate) is injected into the mold and solidified. Alternatively, after applying 2P (ultraviolet curing resin) on the metal stamper, ultraviolet light is directed to the metal stamper for curing. In this way, the pits on the metal stamper are transferred to a replica made of the resin.

A reflective film is formed on thus constructed replica using deposition or sputtering technique. Alternatively, a reflective film is formed on the replica using spin coating technique.

The inner circular edge and the outer circular edge of the disk is then neatly shaped and a process required to bond two disks together is also performed. Further, a label is glued on the disk and a hub is attached to the disk, and the resulting disk is inserted into a cartridge. The recording medium 21 having data replayable on the reproducing apparatus 20 is thus manufactured.

The above-referenced series of process steps may be performed using hardware or software. The above-described process may be performed by a personal computer 500 of FIG. 48.

Referring to FIG. 48, a central processing unit (CPU) 501 performs a variety of processes under the control of a program stored on a read-only memory (ROM) 502 or a program stored on a random-access memory (RAM) 503. The RAM 503 also stores data the CPU 501 requires to perform the variety of processes.

The CPU 501, ROM 502, and RAM 503 are interconnected to each other via an internal bus 504. The internal bus 504 also connects to an input-output interface 505.

The input-output interface 505 is also connected to an input unit 505 including a keyboard, a mouse, etc., an output unit 507 including a display device, such as a cathode-ray tube (CRT) or a liquid-crystal display (LCD), and a loudspeaker, a storage unit 508 including a hard disk, and a communication unit 509 including a modem, a terminal adaptor, etc. The communication unit 509 performs a communication process via a variety of networks including a telephone line or cable television (CATV) line.

The input-output interface 505 is also connected to a drive 510 as necessary. The removable medium 521 such as magnetic disk, an optical disk, an electromagnetic disk, or a semiconductor memory is loaded onto the drive 510. A computer program read from the removable medium 521 is installed onto a storage unit 508 as necessary.

When the series of process steps is performed using software, a program forming the software is installed onto the computer via a network or from a program storage medium.

As shown in FIG. 48, the program storage medium may be a package medium such as the removable medium 521 recording a computer program and distributed separate from the computer to supply a user with the computer program. The program storage medium further may be the ROM 502 storing the computer program and supplied in the apparatus to the user, or a hard disk containing the storage unit 508.

The process steps describing the computer program stored on the recording medium may be performed in the time-series order sequence as previously stated. Alternatively, the process steps may be performed in parallel or separately.

The drive 510 not only reads data recorded on the loaded removable medium 521 but also writes data onto the loaded removable medium 521. The personal computer 500 has the same function as the software production section discussed with reference to FIG. 47 (the personal computer 500 executes a program for performing the same function as the soft production section using the CPU 501).

Through the process of the CPU 501, the personal computer 501 can generate the same data as the data generated by the software production section of FIG. 47. The personal computer 500 can acquire, through the communication unit 509 or from the removable medium 521 loaded on the drive 510, data generated by an external apparatus and similar to the data generated by the software production section of FIG. 47. The personal computer 500 provides the function as a recording device for recording on the removable medium 521 loaded on the drive 510, generated or acquired data similar to the data generated by the software production section of FIG. 47.

It should be understood by those skilled in the art that various modifications, combinations, sub-combinations and alterations may occur depending on design requirements and other factors insofar as they are within the scope of the appended claims or the equivalents thereof.

What is claimed is:
1. A reproducing apparatus comprising:
   playback data acquisition means for acquiring playback audio data containing encoded stream data;
   decoding means for decoding the stream data;
   mixing means for mixing audio data to be mixed, different from the stream data, with stream data decoded by the decode means;

selecting means for selecting between supplying stream data directly without decoding and encoding or applying the decoded stream data having been mixed with additional audio data to the encoder; and control means for controlling the selecting means, wherein the control means acquires, from the playback data acquired by the playback data acquisition means, determination information indicating whether the playback data contains additional audio data to be mixed with the stream data, and automatically controls the selecting means to output the stream data directly if the determination information determines that the playback data contains no additional audio data to be mixed and providing stream data having been mixed with additional audio data if the additional audio data is available, and further wherein a data flag is set in order to enable the control means to automatically acquire the determination information from the playback data.

2. The reproducing apparatus according to claim 1, wherein the playback audio data acquired by the playback data acquisition means comprises one predetermined file containing data corresponding to a title of the playback data, and wherein the control means acquires the determination information from the predetermined file.

3. The reproducing apparatus according to claim 1, wherein the playback audio data acquired by the playback data acquisition means comprises at least one predetermined file containing information indicating a playback order of the playback audio data, and wherein the control means acquires the determination information from the predetermined file.

4. The reproducing apparatus according to claim 1, wherein the playback audio data acquired by the playback data acquisition means comprises at least one unit of first data and at least one unit of second data associated with the first data, the first data being information indicating a playback order of the playback data, and the second data being information indicating a playback period of audio data reproduced in accordance with the playback order controlled by the first data, and wherein the control means acquires the determination information from the second data.

5. A reproducing method of a reproducing apparatus for reproducing audio data and outputting the reproduced audio data, comprising:

acquiring, from playback encoded stream data, determination information indicating whether additional audio data is to be mixed with the stream data;

determining based on the acquired determination information whether there is additional audio data to be mixed with the stream data; and automatically outputting the stream data alone directly without encoding and decoding if the determination information indicates that the playback data does not contain the additional audio data to be mixed with the stream data and otherwise outputting the stream data having been mixed with the additional audio data if the additional audio data is available, and further wherein a data flag is set in order to enable a control means to automatically acquire the determinations information from the playback data.

6. A program for causing a system to perform a playback process for reproducing audio data and outputting the reproduced audio data, the program being stored in an electronic memory and executed by a microprocessor, comprising instructions for implementing steps of:

automatically acquiring, from playback data containing encoded stream data, determination information indicating whether additional audio data is to be mixed with the stream data;

determining based on the acquired determination information whether there is additional audio data to be mixed with the stream data; and automatically outputting the stream data directly without encoding and decoding if the determination information indicates that the playback data does not contain additional audio data to be mixed with the stream data and otherwise mixing the additional audio data with the stream data if the additional audio data is available, and further wherein a data flag is set in order to automatically acquire the determination information from the playback data.

7. A data structure of data reproduced by a reproducing apparatus stored in an electronic memory and executed by a microprocessor, comprising:

first information for managing a playback order of stream data, wherein the first information contains second information, different from the stream data and related to the presence or absence of additional audio data to be mixed with the stream data, the data structure automatically controlling the outputting of the stream data directly without encoding and decoding if the determination information indicates that the playback data does not contain audio data to be mixed with the stream data and otherwise mixing the additional audio data with the stream data if the additional audio data is available, and further wherein a data flag is set in order to enable the system executing the data structure to automatically acquire the determination information from the playback data.

8. A non-transitory recording medium for storing data to be reproduced by a reproducing apparatus that operates under the control of a microprocessor, the recording medium storing data comprising:

first information for managing a playback order of stream data, wherein the first information contains second information, different from the stream data and which when automatically read by the system under control of the microprocessor providing information sufficient to indicate the presence or absence of additional audio data to be mixed with the stream data and thereby automatically controlling the microprocessor controlled system so that it outputs the stream data directly without encoding and decoding if the determination information indicates that there is no additional audio data to be mixed with the stream data and otherwise mixing the additional audio data with the stream data if the additional audio data is available, and further wherein a data flag is set in order to enable the system to automatically acquire the determination information from the playback data.

9. A recording device for recording, onto a recording medium, data replayable on a reproducing apparatus that operates under control of a microprocessor, comprising:

acquisition means for acquiring data having a data structure including first information for managing a playback order of stream data, the first information containing second information, different from the stream data and related to the presence or absence of audio data to be mixed with the stream data; and recording means for recording, onto the recording medium, the data acquired by the acquisition means and the second information, and wherein the second information, which when automatically read by the system under control of the microprocessor provides information sufficient to indicate the presence or absence of additional audio data to be mixed with the stream data and thereby automatically altering control of the microprocessor controlled system so that it outputs the stream data directly without encoding and decoding if the determination information indicates that the playback data does not contain audio data to be mixed with the stream data and otherwise mixing the additional audio data with the stream data if the additional audio data is available, and further wherein a data flag is set in order to enable the control means to automatically acquire the determination information from the playback data.

10. A method of manufacturing a recording medium recording data replayable on a reproducing apparatus, comprising:

generating data having a data structure including first information for managing a playback order of stream data, the first information containing second information, different from the stream data and related to the presence or absence of audio data to be mixed with the stream data; and recording the generated data onto the recording medium and the second information, and wherein the second information, which when automatically read by a system under control of the microprocessor provides information sufficient to indicate the presence or absence of audio data to be mixed with the stream data and thereby automatically altering control of the microprocessor controlled system so that it outputs the stream data directly if the determination information indicates that the playback data does not contain additional audio data to be mixed with the stream data and otherwise mixing the additional audio data with the stream data if the additional audio data is available, and further wherein a data flag is set in order to enable the system to automatically acquire the determination information from the playback data.

11. A reproducing apparatus operating under control of a microprocessor comprising:

a playback data acquisition unit acquiring playback data containing encoded stream data;

a decoding unit decoding the stream data;

a mixing unit mixing audio data to be mixed, different from the stream data, with the stream data decoded by the decoding unit;

a selecting unit selecting between supplying the stream data to an encoding unit and outputting either the stream data directly or the stream data having been mixed with the audio data that is different from the stream data; and a control unit controlling the selecting unit, wherein the control unit automatically acquires, from the playback data acquired by the playback data acquisition unit, determination information indicating whether the playback data contains the audio data to be mixed with the stream data, and controls the selecting unit to output the stream data directly if the determination information determines that the playback data contains no audio data to be mixed and providing stream data having been mixed with additional audio data if the additional audio data is available, and further wherein a data flag is set in order to enable the control unit to automatically acquire the determination information from the playback data.

12. A recording device for recording, onto a recording medium, data replayable on a reproducing apparatus, comprising:

an acquisition unit acquiring data having a data structure including first information for managing a playback order of stream data, the first information containing second information, different from the stream data and related to the presence or absence of audio data to be mixed with the stream data; and a recording unit recording, onto the recording medium, the data acquired by the acquisition unit and means for controlling the outputting of the stream data if the determination information indicates that the playback data does not contain audio data to be mixed with the stream data and otherwise mixing additional audio data with the stream data and wherein the second information, which when automatically read by a system under control of the microprocessor provides information sufficient to indicate the presence or absence of additional audio data to be mixed with the stream data and thereby automatically altering control of the microprocessor controlled system so that it outputs the stream data directly if the determination information indicates that the playback data does not contain audio data to be mixed with the stream data and otherwise mixing additional audio data with the playback data if the additional audio data is available, and further wherein a data flag is set in order to enable the control means to automatically acquire the determination information from the playback data.

* * * * *